US008973023B1

(12) United States Patent
Rao et al.

(10) Patent No.: US 8,973,023 B1
(45) Date of Patent: Mar. 3, 2015

(54) METHODS AND APPARATUS TO DETERMINE AUDIENCE DUPLICATION IN CROSS-MEDIA CAMPAIGNS

(71) Applicants: Kumar Nagaraja Rao, Sunnyvale, CA (US); Peng Fei Yi, Shanghai (CN); Seema Varma Srivastava, Sunnyvale, CA (US); Peter Campbell Doe, Ridgewood, NJ (US); Paul Donato, New York, NY (US); Mainak Mazumdar, Brooklyn, NY (US); David Wong, New York, NY (US)

(72) Inventors: Kumar Nagaraja Rao, Sunnyvale, CA (US); Peng Fei Yi, Shanghai (CN); Seema Varma Srivastava, Sunnyvale, CA (US); Peter Campbell Doe, Ridgewood, NJ (US); Paul Donato, New York, NY (US); Mainak Mazumdar, Brooklyn, NY (US); David Wong, New York, NY (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/779,717

(22) Filed: Feb. 27, 2013

Related U.S. Application Data

(60) Provisional application No. 61/604,952, filed on Feb. 29, 2012, provisional application No. 61/707,925, filed on Sep. 29, 2012.

(51) Int. Cl.
*G06Q 99/00* (2006.01)
*G06Q 30/00* (2012.01)
*H04N 21/442* (2011.01)

(52) U.S. Cl.
CPC .............................. *H04N 21/44222* (2013.01)
USPC ............... 725/14; 725/9; 705/319; 705/14.44

(58) Field of Classification Search
CPC ........................... H04N 21/252; H04N 21/254
USPC ..................................................... 725/14, 35
See application file for complete search history.

(56) References Cited

U.S. PATENT DOCUMENTS

| 5,848,396 A | 12/1998 | Gerace |
| 2008/0228543 A1 | 9/2008 | Doe |

(Continued)

FOREIGN PATENT DOCUMENTS

| WO | 2012040371 | 3/2012 |
| WO | 2012128895 | 9/2012 |

OTHER PUBLICATIONS

Braverman, Samantha, "Are the Online Marketing Efforts of TV Shows and Programs Worthwhile?" Mar. 30, 2011 (5 pages).

(Continued)

*Primary Examiner* — Nasser Goodarzi
*Assistant Examiner* — Tariq Gbond
(74) *Attorney, Agent, or Firm* — Hanley, Flight and Zimmerman, LLC

(57) ABSTRACT

A disclosed example method to determine audience duplication in cross-media campaigns involves determining a first duplicated audience reach between a total television audience and an internet publisher audience for a demographic group. The total television audience is representative of audience members across a plurality of television networks, and the internet publisher audience is representative of audience members across one of a plurality of internet publishers. The example method involves determining a second duplicated audience reach between the total television audience and the internet publisher audience for a media campaign based on the first duplicated audience reach. The example method involves determining a third duplicated audience reach between a television network audience and the internet publisher audience for the media campaign based on the second duplicated audience reach. The television network audience is representative of audience members exposed to the media campaign via one of the plurality of television networks.

9 Claims, 21 Drawing Sheets

TEST FOR MOVIE DVD CAMPAIGN

(56) References Cited

U.S. PATENT DOCUMENTS

2011/0288907 A1* 11/2011 Harvey et al. ............... 705/7.29
2012/0192214 A1* 7/2012 Hunn et al. ...................... 725/9
2012/0215903 A1* 8/2012 Fleischman et al. .......... 709/224

OTHER PUBLICATIONS

Danaher, Peter J., Journal of Marketing Research, vol. XXVIII, "A Canonical Expansion Model for Multivariate Media Exposure Distributions: A Generalization of the 'Duplication of Viewing Law,'" Aug. 1991 (7 pages).

Enoch, Glenn. and Johnson, Kelly. Journal of Advertising Research, "Cracking the Cross-Media Code: How to Use Single-Source Measures to Examine Media Cannibalization and Convergence," Jun. 2010 (13 pages).

Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).

Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).

Nielsen, "How Teens Use Media: A Nielsen Report on the Myths and Realities of Teem Media Trends," Jun. 2009 (17 pages).

Arbitron Inc., Edison Research, "The Infinite Dial 2011: Navigating Digital Platforms," 2011 (83 pages).

Rust, Roland T., Klompmaker, Jay E., Journal for Advertising, vol. 10, No. 3, "A Comparative Study of Television Duplication Models," 1981 (6 pages).

* cited by examiner

| US HH | TV HH | INTERNET HH | CPH SAMPLE | TV EXPOSURE | INTERNET EXPOSURE | DUP |
|---|---|---|---|---|---|---|
| 1 | 1 | | | 1 | | |
| 2 | 1 | | | 0 | | |
| 3 | 1 | | | 1 | | |
| 4 | 1 | | | 1 | | |
| 5 | 1 | 1 | | 1 | 0 | 0 |
| 6 | 1 | 1 | | 0 | 1 | 0 |
| 7 | 1 | 1 | | 1 | 1 | 1 |
| 8 | 1 | 1 | | 1 | 0 | 0 |
| 9 | 1 | 1 | 1 | 1 | 0 | 0 |
| 10 | 1 | 1 | 1 | 0 | 1 | 1 |
| 11 | 1 | 1 | 1 | 1 | 1 | 1 |
| 12 | 1 | 1 | 1 | 1 | 0 | 0 |
| 13 | 1 | 1 | | 1 | 0 | 0 |
| 14 | 1 | 1 | | 0 | 1 | 0 |
| 15 | 1 | 1 | | 1 | 1 | 1 |
| 16 | 1 | 1 | | 1 | 0 | 0 |
| 17 | 1 | | | 0 | 0 | |
| 18 | 1 | | | 1 | 1 | |
| 19 | 1 | | | 1 | 1 | |
| 20 | 1 | | | 0 | 0 | |
| 21 | 1 | | | | | |
| 22 | 1 | | | | | |
| 23 | 1 | | | | | |
| 24 | 1 | | | | | |

TV Reach: 12/24 = 50%
Internet Reach: 8/24 = 33%
Rho: -0.5774
Estimated Dup: 3%
Truth Dup: 3/24 = 12.5%

ADJUSTMENT OF CORRELATION

FIG. 3

ESTIMATED AUDIENCE DUPLICATION FOR MOVIE DVD CAMPAIGN

CONFIDENCE INTERVAL (CI) OF CORRELATION FOR MOVIE CAMPAIGN

| Campaign | Parent | Length in Days | TV Reach | Internet Reach | Dup |
|---|---|---|---|---|---|
| MOVIE A | MEDIA OWNER A | 18 | 70% | 10% | 8% |
| MOVIE B | MEDIA OWNER B | 87 | 72% | 31% | 21% |
| STORE A | MEDIA OWNER C | 16 | 24% | 8% | 2% |
| TELEVISION EVENT A | MEDIA OWNER D | 59 | 50% | 3% | 2% |
| CONSUMER PRODUCT A | MEDIA OWNER E | 51 | 57% | 14% | 9% |
| CONSUMER PRODUCT B | MEDIA OWNER F | 84 | 41% | 19% | 7% |
| CONSUMER PRODUCT C | MEDIA OWNER G | 104 | 7% | 14% | 1% |
| CONSUMER SERVICE A | MEDIA OWNER H | 111 | 55% | 14% | 7% |
| THEATRICAL TRAILER A | MEDIA OWNER I | 109 | 81% | 5% | 4% |
| STORE B | MEDIA OWNER J | 17 | 35% | 4% | 2% |

TEST RESULTS FOR ADDITIONAL CAMPAIGNS

FIG. 8

| Day | Weekday | TV Install | TV Cumulative Week | XCR Cumulative Week | TV Unified Sample CumWeek 1 | TV Unified Sample CumWeek 2 | TV Unified Sample CumWeek 3 |
|---|---|---|---|---|---|---|---|
| D1 | Thursday | 1 | 1 | 1 | 0 | 1 | 1 |
| D2 | Friday | 0 | 1 | 1 | 0 | 1 | 1 |
| D3 | Saturday | 0 | 1 | 1 | 0 | 1 | 1 |
| D4 | Sunday | 1 | 1 | 1 | 0 | 1 | 1 |
| D5 | Monday | 1 | 2 | 2 | | 1 | 1 |
| D6 | Tuesday | 1 | 2 | 2 | | 1 | 1 |
| D7 | Wednesday | 1 | 2 | 2 | | 1 | 1 |
| D8 | Thursday | 1 | 2 | 2 | | 1 | 1 |
| D9 | Friday | 1 | 2 | 2 | | 1 | 1 |
| D10 | Saturday | 1 | 2 | 2 | | 1 | 1 |
| D11 | Sunday | 1 | 3 | 3 | | | 1 |
| D12 | Monday | 0 | 3 | 3 | | | 1 |
| D13 | Tuesday | 0 | | | | | 1 |

FIG. 14

| Day | Weekday | Online Used | Online Compliance Week | PGP Compliance Week | Offline Used Sample 1 | Offline Used Sample 2 | Offline Used Sample 3 |
|---|---|---|---|---|---|---|---|
| D1 | Thursday | 0 | | | | 0 | 1 |
| D2 | Friday | 1 | | 1 | 1 | 0 | 1 |
| D3 | Saturday | 1 | | 1 | 1 | 0 | 1 |
| D4 | Sunday | 1 | | 1 | 1 | 0 | 1 |
| D5 | Monday | 1 | | 1 | 1 | 0 | 1 |
| D6 | Tuesday | 0 | 1 | 2 | | 0 | 1 |
| D7 | Wednesday | 1 | 1 | 2 | | 0 | 1 |
| D8 | Thursday | 1 | 1 | 2 | | 0 | 1 |
| D9 | Friday | 1 | 1 | 2 | | 0 | 1 |
| D10 | Saturday | 0 | 1 | 2 | | 0 | 1 |
| D11 | Sunday | 1 | 1 | 2 | | | 1 |
| D12 | Monday | 1 | 2 | 3 | | | 1 |
| D13 | Tuesday | 1 | 2 | 3 | | | 1 |

FIG. 15

| Day | Weekday | KPI Online Install | GPI Cumulative Week | GPI Unified Sample CumWeek 1 | GPI Unified Sample CumWeek 2 | GPI Unified Sample CumWeek 3 |
|---|---|---|---|---|---|---|
| D1 | Thursday | 1 | 0 | 0 | 0 | 1 |
| D2 | Friday | 0 | 1 | 0 | 0 | 1 |
| D3 | Saturday | 0 | 1 | 0 | 0 | 1 |
| D4 | Sunday | 1 | 1 | 0 | 0 | 1 |
| D5 | Monday | 1 | 1 | | 0 | 1 |
| D6 | Tuesday | 1 | 0 | | 0 | 1 |
| D7 | Wednesday | 1 | 1 | | 0 | 1 |
| D8 | Thursday | 1 | 1 | | 0 | 1 |
| D9 | Friday | 1 | 1 | | 0 | 1 |
| D10 | Saturday | 1 | 0 | | 0 | 1 |
| D11 | Sunday | 0 | 1 | | 0 | 1 |
| D12 | Monday | 0 | 1 | | | 1 |
| D13 | Tuesday | 0 | 1 | | | 1 |

METHODS AND APPARATUS TO DETERMINE AUDIENCE DUPLICATION IN CROSS-MEDIA CAMPAIGNS

RELATED APPLICATIONS

This application claims priority to U.S. Provisional Patent Application No. 61/604,952, filed on Feb. 29, 2012, and U.S. Provisional Patent Application No. 61/707,925, filed on Sep. 29, 2012.

FIELD OF THE DISCLOSURE

The present disclosure relates generally to monitoring media and, more particularly, to methods and apparatus to determine audience duplication in cross-media campaigns.

BACKGROUND

Advertisers, retail establishments, product manufacturers, service providers, and other types of businesses or entities are often interested in consumer exposure and/or consumer reaction to media such as entertainment media, advertising and/or other informational media to better market their products or services. Businesses often use advertising or other informational or promotional material to draw attention and interest to their products or services. Such advertising may be delivered via television, radio, or print media. In addition, web-based technologies also offer the ability to deliver information about products and/or services via Internet advertising. Thus, the average consumer is usually exposed to media via different types of delivery devices.

BRIEF DESCRIPTION OF THE DRAWINGS

FIG. 3 depicts example media exposure data for a cross-platform campaign.

FIG. 8 depicts example test results for different television and online ad campaigns.

FIG. 14 is an example table for determining whether a particular CPH panelist qualifies for a unified sample for a TV portion of a cross-platform campaign ratings (XCR) campaign.

FIG. 15 is an example table for determining whether the same particular CPH panelist from FIG. 14 qualifies for unified sample for online portion of the XCR campaign.

FIG. 16 is an example table for determining whether the same particular CPH panelist from FIGS. 14 and 15 qualifies for a CPH unified sample for the XCR campaign.

DETAILED DESCRIPTION

Examples methods, apparatus, and articles of manufacture disclosed herein enable determining audience duplication in cross-media campaigns. In the examples disclosed herein, cross-media and cross-platform are used interchangeably throughout. Examples disclosed herein may analyze television-based ad campaigns delivered via televisions, and Internet-based ad campaigns delivered via personal computers and/or mobile devices such as mobile phones, smart phones, tablet devices (e.g., an Apple iPad), multi-media phones, etc. Examples disclosed herein may be used to provide advertisers with ad exposure information to enable such advertisers to make more informed decisions about where to spend advertising dollars, and/or how to distribute advertisements. Such examples are beneficial to marketers, product manufacturers, service companies, advertisers, and/or any other individual or entity that pays for advertising opportunities. In addition, consumers benefit from more efficient advertising (e.g., ads more relevant to the consumer interests) and programming that advertisements sponsor.

Figure 1:
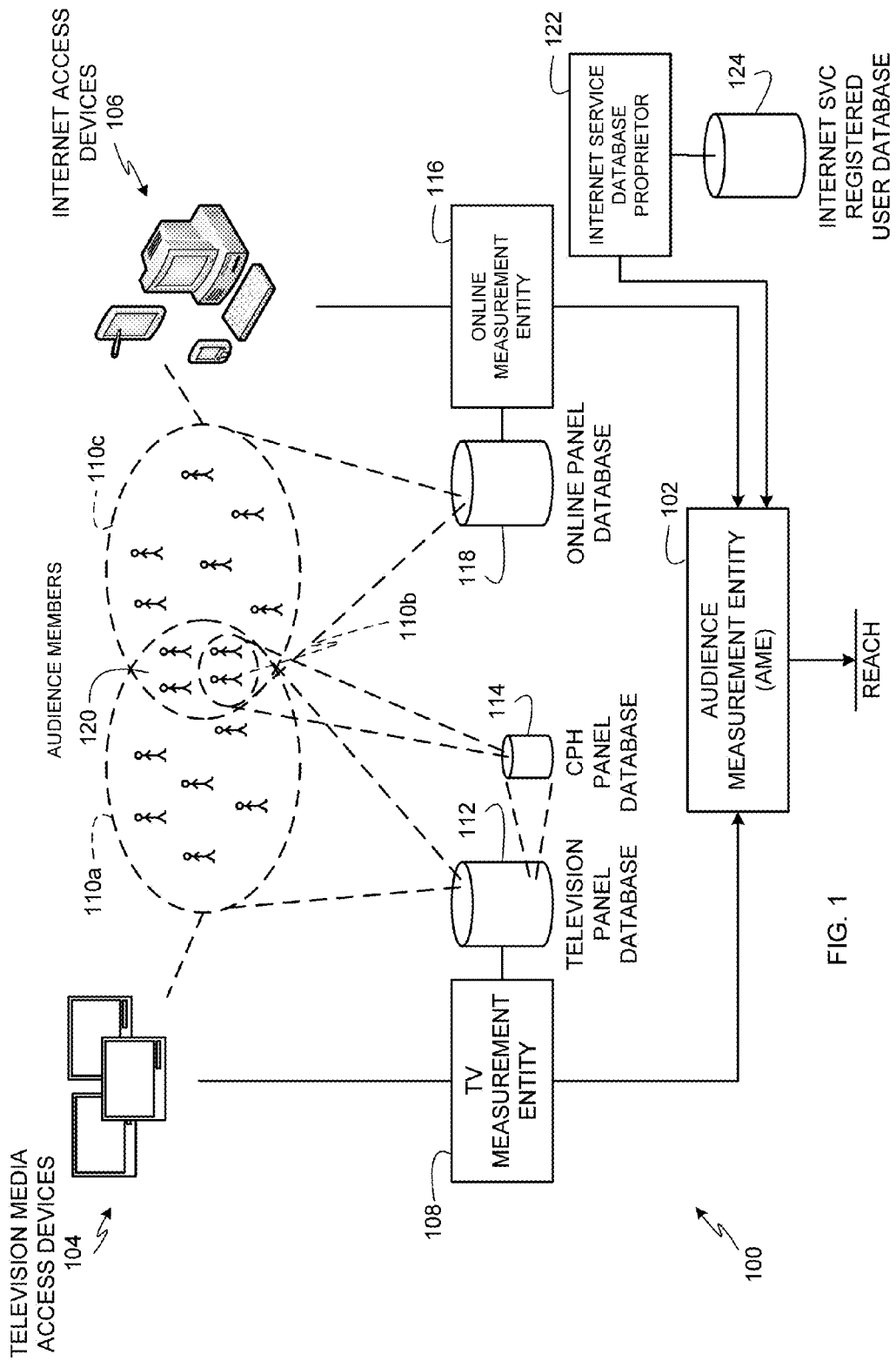
FIG. 1 depicts an example cross-media campaign environment in which exposures of Internet and television media campaigns are monitored for respective television and online audience members.

FIG. 1 depicts an example cross-media campaign environment 100 in which exposures of Internet and television media campaigns are monitored for respective television and online audience members. In the illustrated example, an audience measurement entity (AME) 102 (e.g., The Nielsen Company, LLC) determines cross-media campaign reach for exposures to cross-media ad campaigns. In illustrated examples disclosed herein, cross-media ad campaigns span across television and the Internet to include television-based ad campaigns and online ad campaigns. However examples disclosed herein are similarly applicable to other types of cross-media campaigns (e.g., combinations of two or more of print campaigns, billboard campaigns, radio campaigns, television campaigns, online campaigns, in-store campaigns, mail delivery campaigns, etc.).

As used herein, reach is a measure indicative of unique audience (e.g., based on audience members distinguishable from one another) of media campaigns. That is, one or more impressions of a particular ad campaign attributable to a particular audience member is/are measured as a single unique audience member for purposes of reach. If that particular audience member is exposed multiple times to the same ad campaign, for purposes of reach as used herein, the multiple exposures for the particular audience member to the same ad campaign is still counted as only a single unique audience member. In this manner, impression performance for a particular ad campaign is not disproportionately represented when a small subset of one or more audience members is exposed to the same ad campaign an excessively large number of times while a larger part of the audience member group is exposed fewer times or not at all to that same ad campaign. By tracking unique audience exposure, reach is used to identify how many unique audience members are reached by an ad campaign. Increasing reach is useful for advertisers wishing to reach a larger audience base.

In some examples, reach is measured by tracking ad impressions for known users (e.g., panelists or non-panelists) whose identities can be correlated with their tracked impressions. In some examples, reach can be tied to audience demographic information to measure demographic coverage achieved by an ad campaign (e.g., demographic group(s) and/or demographic population(s) exposed to the ad campaign). For example, an ad campaign reaching a broader demographic base will have a larger demographic reach than an ad campaign that reached a more limited demographic base.

In the illustrated example of FIG. 1, an example cross-media campaign includes a television campaign delivered via television media access devices 104 and a corresponding online campaign delivered via Internet access devices 106. In the illustrated example, the television and online campaigns correspond to the same ad campaign but are delivered via both television media and online media. The television media access devices 104 of the illustrated example include multiple types of devices via which television media is accessible. For example, the television media access devices 104 may include one or more of televisions, smart televisions, and/or any other device that can access television content such as broadcast and/or streaming television media. The Internet access devices 106 of the illustrated example include multiple types of devices that can access online media. For example, the Internet access devices 106 may include one or more of computers, tablet devices, smart phones, smart televisions, and/or any other device that can access online media (e.g., web pages, streaming radio and/or streaming video, pictures, downloadable video, streaming/downloadable music, etc.).

To track television media impressions, a TV measurement entity 108 of the illustrated example recruits audience members to be part of a television (TV) audience member panel 110a by consenting to having their television viewing activities monitored. In some examples, the TV audience member panel 110a is implemented using Nielsen's National People Meter (NPM) panel. The TV measurement entity 108 of the illustrated example maintains a television panel database 112 to store panel member information such as demographics, media preferences, and/or other personal or non-personal information suitable for describing characteristics, preferences, locations, etc. of audience members exposed to television media. To measure impressions of television media (e.g., television media including advertisements and/or programming), the TV measurement entity 102 monitors the viewing habits of members of the television audience member panel 110a and records impressions against different television media to which the television audience members 110a are exposed.

To track online media impressions, an online measurement entity 116 of the illustrated example recruits audience members to be part of an online audience member panel 110c by consenting to having their online activities monitored. The online measurement entity 116 of the illustrated example maintains an online panel database 118 to store panel member information such as demographics, media preferences, and/or other personal or non-personal information suitable for describing characteristics, preferences, locations, etc. of audience members exposed to online media. To measure impressions of online media (e.g., web pages, streaming radio and/or streaming video, pictures, downloadable video, streaming/downloadable music, etc.), the online measurement entity 116 installs personal computer (PC) meters on the Internet access devices 106 of the online audience members 110c to monitor the viewing habits of the online audience members 110c. The online measurement entity 116 uses Internet usage activity data collected by the PC meters in the Internet access devices 106 to log impressions against different online media to which the online audience members 110c were exposed. In the illustrated example, each PC meter in a corresponding panel Internet access device 106 is provided with a unique meter ID that can be used to identify an online panelist and/or an online panel household.

As shown in the illustrated example of FIG. 1, some of the television audience members 110a are also online audience members 110c, resulting in a subset of overlapping audience members 120. In some examples, the overlapping audience members 120 arise when persons in the television audience members 110a also join the online audience member panel 110c. In the illustrated example, the television audience members 110a include a subset of cross-platform home (CPH) audience panel members 110b that are also part of the online audience member panel 110c and access Internet media via the Internet access devices 106. The television panel database 112 of the illustrated example stores panel member information about those CPH audience panel members 110b in a CPH panel database 114 for use in tracking their Internet media viewing habits.

In the illustrated example, the AME 102 operates both the TV measurement entity 108 and the online measurement entity 116. The online audience panel 110c of the illustrated example has a relatively small quantity of online audience members compared to all online users across a country (e.g., the United States (US)). To effectively increase the quantity of online audience members, the AME 102 of the illustrated example partners with one or more Internet service database proprietors having registered users of their services. In the illustrated example, the AME 102 partners with an Internet service database proprietor 122 which may be, for example, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintain(s) user registration records. In some examples, when users register with the Internet service database proprietor 122 to use one or more of its online services, the users agree to a terms of service (ToS) and/or online privacy policy of the Internet service database proprietor 122 stating that some Internet usage information is used to track Internet viewing/usage activities. The Internet service database proprietor 122 of the illustrated example maintains an Internet service registered user database 124 to store user registration information such as demographics, media preferences, and/or other personal or non-personal information suitable for describing characteristics, preferences, locations, etc. of registered users exposed to online media. To measure impressions of online media (e.g., media including advertisements and/or programming), the Internet service database proprietor 122 monitors online activities of its registered users and records impressions against different online media to which the online audience members 110c are exposed.

In the illustrated example, the AME 102 and the Internet service database proprietor 122 use online media tagging techniques to track media impressions. Such online media tagging techniques use ad tags or media tags, which are beacon instructions located in media (e.g., advertisements or content) downloaded to web browsers of client devices (e.g., the Internet access devices 106). When the web browsers execute the beacon instructions, the web browsers send a beacon request to the online measurement entity 116 and/or the Internet service database proprietor 122 to log an impression for the corresponding online media. Examples that may be used to implement online media tagging techniques are disclosed in Blumenau, U.S. Pat. No. 6,108,637, which is hereby incorporated herein by reference in its entirety, and in international patent application no. PCT/US11/52623, filed on Sep. 21, 2011, which is hereby incorporated herein by reference in its entirety.

Advertisers interested in reach measures of their cross-media campaigns may obtain television impression information or television reach measures from the TV measurement entity 108 and separately obtain online impression information or online reach measures from the online measurement entity 116 and/or the Internet service database proprietor 122. However, such separately collected measures contain overlapping audience members 120 and/or any audience members of the panels 110*a-c* that overlap with registered users of the Internet service database proprietor 122. In such examples, the TV measurement entity 108 tracks television campaign impressions for the panel audience members 110*a*, and the Internet service database proprietor 122 separately tracks online campaign impressions for its registered users, some of which overlap with the panel audience members 110*a*. As such, when the TV measurement entity 108 logs a television-based impression for an TV audience panel member 110*a* in connection with a particular media campaign, and the Internet service database proprietor 122 logs an online-based impression in connection with the same media campaign for the same TV audience panel member 110*a* that happens to also be a registered user of the Internet service database proprietor 122, the resulting television reach measure generated by the TV measurement entity 108 and the resulting Internet reach measure generated by the Internet service database proprietor 122 are based on duplicate impressions for the same audience members exposed to the same media campaigns, albeit via different media delivery types (e.g., television and online media).

In the illustrated example, the TV measurement entity 108 and the online measurement entity 110 are operated by the AME 102, and the Internet service database proprietor 122 is a separate entity from the AME 102. In the illustrated example, the Internet service database proprietor 122 does not share identities and/or person-level information of its registered users represented in the Internet service registered user database 124 with the AME 102, and the AME 102 does not share identities and/or person-level information of its panel members represented in the databases 112, 114, and 118 with the Internet service database proprietor 122. In some examples, the AME 102 and the Internet service database proprietor 122 do not share identities and/or person-level information about their audience members or registered users to honor privacy policies. As such, the television panel database 112 (including the CPH panel database 114) and the online panel database 118 are maintained separately from the Internet service registered user database 124, and the databases 112 and 118 are not linked to the Internet service registered user database 124. Because the databases 112 and 118 are not linked to the Internet service registered user database 124 and the AME 102 and the Internet service database proprietor 122 do not share audience member information and/or registered user information, traditional techniques for generating cross-media reach metrics do not eliminate duplicate audience member impression resulting from the same audience members tracked for different media delivery types.

Examples disclosed herein can be used to provide advertisers of cross-media campaigns (e.g., television and online campaigns) with reach measures of their campaigns to unique television audience members 110*a* exposed to the television campaigns via the television media access devices 104, and to unique Internet audience members exposed to the online campaigns as measured using impressions collected by the Internet service database proprietor 122. To improve the accuracy of reach measures, examples disclosed herein eliminate or substantially reduce overlapping audience members that are exposed to the same campaign via television media access devices and Internet access devices. That is, examples disclosed herein facilitate the detection of double counting a particular overlapping audience member that was exposed to the same campaign via television and the Internet. As such, when an overlapping audience member is exposed to both television and online instances of the same campaign, examples disclosed herein may be used to count such duplicate audience member collected by separate entities as only a single unique audience.

Although disclosed examples are described herein in connection with the AME 102 being the implementing entity of disclosed techniques, such disclosed examples may be implemented by the AME 102, by an entity implementing the TV measurement entity 108 separate from the AME 102, by an entity implementing the online measurement entity 116 separate from the AME 102, by the Internet service database proprietor 122, and/or by any other entity interested in generating media impression reports and/or reach metrics. In some examples, the TV measurement entity 108 and the online measurement entity 116 may be implemented by respective entities separate from the AME 102. In other examples, the AME 102 may implement one of the TV measurement entity 108 or the online measurement entity 116. In yet other examples, the AME 102 may include or be part of the Internet service database proprietor 122.

In some examples, the AME 102 uses reach metrics to determine adjusted gross ratings points (GRPs) for cross-media ad campaigns. A GRP measure is a unit of measurement of audience size that has traditionally been used in the television ratings context. It is used to measure exposure to one or more programs, advertisements, and/or commercials. In terms of some television (TV) ratings systems, one GRP is equal to 1% of TV households. While GRPs have traditionally been used as a measure of television viewership, example methods, apparatus, and articles of manufacture disclosed herein develop adjusted GRPs that measure the performance of cross-media advertising to provide a standardized metric that can be used to accurately reflect performance of campaigns across different types of media. Unlike traditional GRPs, which are indicative only of TV advertisement performance, adjusted GRPs reflect the performance of ad campaigns based on their TV and online exposures. Such standardized adjusted GRP measurements can provide greater certainty to advertisers that their cross-media advertisement money is well spent. It can also facilitate cross-media comparisons such as between viewership of TV advertisements and online advertisements.

Figure 2:
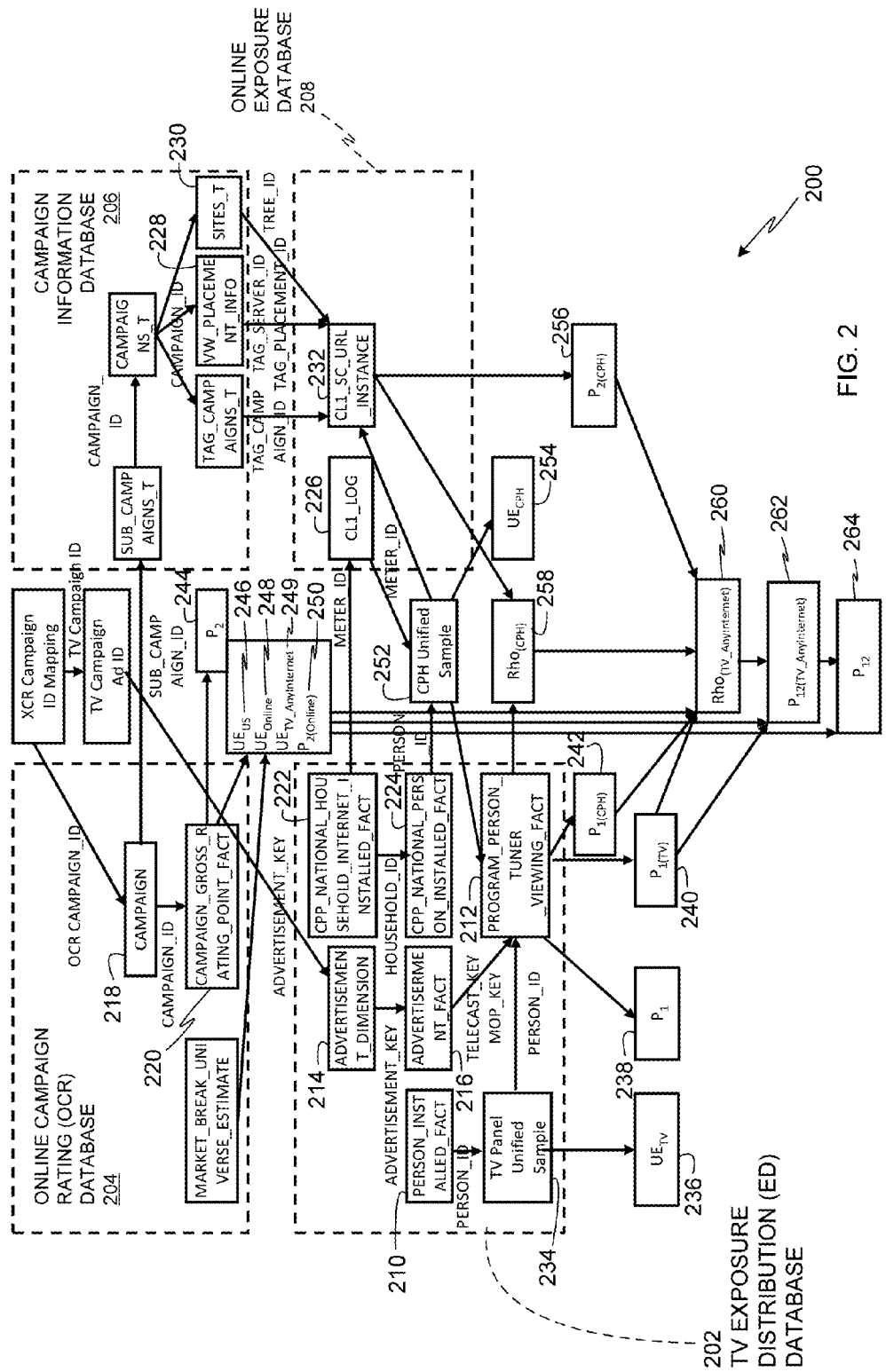
FIG. 2 depicts an example system to measure audience duplication in the cross-media campaign environment of FIG. 1.

FIG. 2 depicts an example system 200 to measure audience duplication in the cross-media campaign environment 100 of FIG. 1. The system 200 of the illustrated example uses impression data corresponding to impressions collected for the television audience member panel 110*a*, the CPH audience member panel 110*b*, and the online audience member panel 110c. Example techniques are disclosed below for use by the TV measurement entity 108 of FIG. 1 to collect television campaign metrics (e.g., impressions, reach, etc.) associated with the television audience member panel 110a, television+online campaign metrics associated with the CPH audience member panel 110b, and online campaign metrics associated with the online audience member panel 110c. Example techniques are also described below for collecting online campaign metrics associated with registered users of the Internet service database proprietor 122.

TV campaign metrics may be collected using known techniques used in generating traditional TV ratings, such as, using in-house panel data (e.g., impression data corresponding to the television audience member panel 110a) to project impression, unique audience, reach, etc. To report the collected metrics for a particular TV campaign at a campaign level, a unique TV campaign identifier (ID) is created for the particular TV campaign and is used to identify all commercials associated with that TV campaign. The TV measurement entity 108 (FIG. 1) overlays viewing behavior of the TV audience members 110a onto the campaign airing schedule to determine which ones of the TV audience members 110a are exposed to the TV campaign. The TV measurement entity 108 uses this overlaying technique to determine impressions, unique audience metrics, and/or other metrics for the TV campaign. Thus, to determine such metrics for different TV campaigns, the TV measurement entity 108 uses campaign identifiers and TV viewing data of the TV audience members 110a. In some examples, to generate the metrics by day, demographics, TV network, and rating streams (e.g., Live viewings, Same-Day-delay (Live+SD) recorded viewings, 3-day-delay (Live+3) recorded viewings, 7-day-delay (Live+7) recorded viewings), the TV measurement entity 108 generates and/or receives TV viewing data by date, demographics, network, and viewing delay.

Section 1—Data Sources

In the illustrated example of FIG. 2, the system 200 is shown using information from four databases, namely a TV exposure distribution (ED) database 202, an online campaign rating (OCR) database 204, a campaign information database 206, and an online exposure database 208. In the illustrated example, the TV measurement entity 108 maintains and operates the TV exposure distribution (ED) database 202 to track TV campaign metrics associated with the TV audience members 110a, and maintains and operates the OCR database 204 stores online campaign impressions from the partner database proprietors. Some of those impressions reflected in the OCR database 204 are attributable to some of the CPH audience member panel 110b, and are used to analyze audience duplication as disclosed herein. Also in the illustrated example, the campaign information database 206 is also operated and maintained by the TV measurement entity 108 to store characteristics about ad campaigns, such as, campaign IDs, airing schedules, airing TV networks, airing website, etc. The online exposure database 208 of the illustrated example is maintained and operated by the online measurement entity 116 to track online campaign metrics associated with its registered users. In some examples, in which the TV measurement entity 108 and the online measurement entity 116 are part of the AME 102, the AME 102 operates and maintains the exposure distribution (ED) database 202, the OCR database 204, the campaign information database 206, and the online exposure database 208. The following describes parameters stored in and obtained from respective ones of the TV exposure distribution (ED) database 202, the online campaign rating (OCR) database 204, the campaign information database 206, and the online exposure database 208 to implement example techniques disclosed herein to identify and measure audience duplication in cross-media campaigns.

Sub-Section 1.1—Television Data Sources

In some examples, the TV measurement entity 108 uses some or all of the following parameters to generate TV campaign metrics representative of television viewing data collected for the TV audience members 110a.

Unique TV campaign ID—A campaign identifier used to uniquely specify a TV campaign. Preferably, but not necessarily, the unique TV campaign ID is mapped to all ad IDs associated with the same TV campaign. In some examples, supplemental campaign monitoring data (e.g., Monitor+ data) is also used in connection with the Unique TV campaign ID to identify the ads associated with the same TV campaign. Example supplemental monitoring data includes one or more identifier(s) of one or more commercial parent company(ies), one or more identifier(s) of commercial brand variant(s), and one or more ad airing date(s).

By-minute viewing data at person level—Represents by-minute viewing behavior for each TV audience member 110a to determine their exposure to TV campaign ads.

Viewing delay data at person level—TV viewing delay for each TV audience member 110a to generate/report different ratings based on different types of recorded/delayed viewings (e.g., Live, Live+SD, Live+3, Live+7).

By-TV network viewing data at person level—Each minute's viewing data is mapped to its respective TV network for each TV audience member 110a so that by-network metrics can be reported.

Panelist demographics—Demographics (e.g., age, gender, etc.) for each TV audience member 110a.

In some examples, to generate TV viewership metrics representative of television viewing data collected for the TV audience members 110a, the TV measurement entity 102 uses one or more of the following parameters available from the TV exposure distribution database 202.

An example PERSON_INSTALLED_FACT data structure 210 of FIG. 2 stores PERSON_KEY values, HOUSEHOLD_ID values, CONCAT_HOUSEHOLD_PERSON_ID values, and PERSON_INTAB_FLAG values.

PERSON_KEY—This is a TV person key that uniquely identifies each TV audience member 110a within their household.

HOUSEHOLD_ID—This is an identifier that uniquely identifies a household among all the households of the TV audience member panel 110a.

CONCAT_HOUSEHOLD_PERSON_ID—This is a concatenation of the HOUSEHOLD_ID and the PERSON_KEY.

PERSON_INTAB_FLAG—This is a TV panelist intab flag to indicate whether viewing data was valid or usable (e.g., properly tabulated) on a particular day for a person associated with a particular PERSON_KEY in the TV audience member panel 110a (FIG. 1).

An example PERSON_DIMENSION data structure (not shown) stores AGE values and GENDER_CODE values to indicate age and gender demographics of the TV audience members 110a. In other examples, other types of demographic information may also be stored instead of or in addition to one or both of the AGE values and the GENDER_CODE VALUES.

An example PROGRAM_PERSON_TUNER_VIEWING_FACT data structure 212 of FIG. 2 receives the PERSON_KEY values and stores PERSON_AA_MINUTE values for audience members associated with the PERSON_KEY values. In the illustrated example, the PER- SON_AA_MINUTE values are TV by-minute viewing indicators that identify TV by-minute viewing information.

An example ADVERTISEMENT_DIMENSION data structure 214 of FIG. 2 stores ADVERTISEMENT_KEY values, ULTIMATE_PARENT_DESC values, and BRAND_DESC values.

ADVERTISEMENT_KEY—A TV ad key or TV ad ID for a particular advertisement that is part of a larger campaign.

ULTIMATE_PARENT_DESC—A parent name or ID of a TV campaign advertiser.

BRAND_DESC—A brand name of a TV campaign.

An example ADVERTISEMENT_FACT data structure 216 of FIG. 2 stores TELECAST_KEY values and MOP_KEY values.

TELECAST_KEY—A key or ID of a TV telecast that airs an advertisement.

MOP_KEY—An identifier of a minute during which an advertisement was aired.

An example PLAY_DELAY_DIMENSION data structure (not shown) stores PLAY_DELAY_HOURS values, PLAY_DELAY_MINUTES values, and PLAY_DELAY_SAME_DAY_FLAG values.

PLAY_DELAY_HOURS—A delay in hours for a viewing of a recorded TV ad.

PLAY_DELAY_MINUTES—A delay in minutes for a viewing of a recorded TV ad.

PLAY_DELAY_SAME_DAY_FLAG—A flag indicative of whether a viewing of a recorded TV ad occurred on the same day that the TV ad was recorded.

An example TELECAST_DIMENSION data structure (not shown) stores TELECAST_BROADCAST_DATE values and PROGRAM_DISTRIBUTOR_NAME values.

TELECAST_BROADCAST_DATE—A date on which a TV ad was aired.

PROGRAM_DISTRIBUTOR_NAME—A name or ID of a TV network that aired the telecast in which the TV ad was located.

Sub-Section 1.2—Online Data Sources

In the illustrated example, online campaign metrics for an Internet audience (e.g., registered users of partner Internet service database proprietors) are reported based on a full census methodology using audience behavior tracking information collected in the OCR database 204 of FIG. 2. In some examples, projections are not used to generate the online campaign metrics. Such example techniques are useful for counting every impression regardless the internet access locations. Similar to collecting TV campaign metrics, identifiers are used to uniquely identify internet campaigns. Using such unique Internet campaign IDs, metrics such as GRP, frequency, impression, reach, unique audience, etc. can be extracted by date, by demographic, and/or by publisher from the OCR database 204. In some examples, the TV measurement entity 108 uses, collects, and/or generates some or all of the following parameters to generate online campaign metrics representative of online viewing data collected for the subset CPH audience members 110*b*.

Unique online campaign ID—A campaign identifier used to uniquely specify an online campaign.

Campaign metrics—Online campaign metrics (e.g., unique audience, frequency, impression, reach, GRP).

Campaign publisher—An online campaign publisher site.

Demographics—Demographics such as age, gender, etc. of the CPH audience members 110*b*.

Campaign data date—A date on which an online campaign ran.

In some examples, to generate online metrics representative of online viewing data collected for the CPH audience members 110*b*, the online measurement entity 116 uses one or more of the following parameters available from the OCR database 204.

An example CAMPAIGN data structure 218 stores CAMPAIGN_ID values, CAMPAIGN_TAG_ID values, CAMPAIGN_NAME values, CAMPAIGN_START_DATE values, and CAMPAIGN_END_DATE values.

CAMPAIGN_ID—An OCR Internet campaign ID.

CAMPAIGN_TAG_ID—An Internet campaign tag ID.

CAMPAIGN_NAME—An Internet campaign name.

CAMPAIGN_START_DATE—A start date of an Internet campaign.

CAMPAIGN_END_DATE—An end date of an Internet campaign.

An example CAMPAIGN_ADVERTISER_BRAND data structure (not shown) stores BRAND_NAME values and PARENT_NAME values.

BRAND_NAME—A brand name associated with an Internet campaign.

PARENT_NAME—A parent name of an Internet campaign advertiser.

An example CAMPAIGN_GROSS_RATING_POINT_FACT data structure 220 stores DEMOGRAPHIC_ID values, SITE_NAME values, IMPRESSIONS values, REACH values, FREQUENCY values, ONLINE_REACH_PERCENT values, TOTAL_US_REACH_PERCENT values, ONLINE_UNIVERSE_ESTIMATE values, TOTAL_UNIVERSE_ESTIMATE values, and DATA_DATE values.

DEMOGRAPHIC_ID—A demographic ID representing certain demographic group.

SITE_NAME—A name of an Internet campaign publisher.

IMPRESSIONS—A measured impression value for an Internet campaign.

REACH—A measured reach value for an Internet campaign.

FREQUENCY—A measured frequency (of unique and non-unique impressions) of an Internet campaign.

ONLINE_REACH_PERCENT—A measure of total Internet reach based on the total Internet universe (e.g., Internet population) across the United States (is interchangeable with any other country, territory, state, or other geographic/governmental boundaries).

TOTAL_US_REACH_PERCENT—A measure of total Internet reach based on the total universe (e.g., population) across the United States (is interchangeable with any other country, territory, state, or other geographic/governmental boundaries).

ONLINE_UNIVERSE_ESTIMATE—An estimate of the size of the total Internet universe (e.g., Internet population) across the United States (is interchangeable with any other country, territory, state, or other geographic/governmental boundaries).

TOTAL_UNIVERSE_ESTIMATE—An estimate of the size of the total universe (e.g., population) across the United States (is interchangeable with any other country, territory, state, or other geographic/governmental boundaries).

DATA_DATE—A date on which report data is generated.

Sub-Section 1.3—Cross-Platform Data Sources

Some examples generate cross-platform campaign ratings (XCR) using inputs computed based on the data collected in connection with the CPH audience member panel 110*b* of FIG. 1. To compute such inputs for a particular campaign, a mapping is created between the TV campaign ID and the corresponding online campaign ID so that a cross-media campaign can be identified. Also, a single-source panelist identifier is used to map the same panelist (e.g., a potentially duplicate audience member) between the TV audience member panel 110*a* and the online audience member panel 110*c*. In addition, for the CPH audience member panel 110*b*, 'respondent-level TV viewing behavior by date', 'viewing delay', 'network and demographics and internet URL (Uniform Resource Locator) viewing behavior by date', tree, and demographics are used to understand cross-media activities. Because the CPH audience member panel 110b is a subset of the TV audience member panel 110a, the TV viewing data of the CPH audience members 110b is a subset of the TV viewing data of the TV audience member panel 110a. In some examples, the TV measurement entity 108 uses, collects, and/or generates some or all of the following parameters to generate TV-online cross-media campaign metrics representative of TV-online viewing data collected for the TV audience members 110a and the subset CPH audience members 110b.

Unique TV campaign ID—A campaign identifier used to uniquely specify a TV campaign. This unique campaign ID maps to all advertisement IDs associated with a particular TV campaign.

Unique online campaign ID—A campaign identifier used to uniquely specify an online campaign.

Map between TV campaign ID and online campaign ID—A one-to-one ID map between a TV campaign ID and a corresponding online campaign ID so that a corresponding cross-media campaign can be identified.

Single-source panelist identifiers—Panelist identifiers of audience members that can be associated with FOLDER_NUMBER (e.g., an intermediate field) and HOUSEHOLD_ID (e.g., an ID used to identify a household in the TV audience member panel 110a).

Single-source panelist identifiers—Panelist identifiers which can be associated with FOLDER_NUMBER and METER_ID (e.g., an ID used to identify a household in the online audience member panel 110c).

By minute TV viewing data at person level—By minute viewing behavior for each audience member of the CPH audience member panel 110b so that each member's exposure to campaign advertisements can be determined.

TV Viewing delay data at person level—TV viewing delay for each audience member of the CPH audience member panel 110b so that different ratings can be reported for respective delayed viewing types (e.g., Live, Live+SD, Live+3, Live+7).

By TV network viewing data at person level—Each minute's viewing is mapped to its respective TV network for each audience member of the CPH audience member panel 110b so that metrics by network can be reported.

Panelist demographics—Demographics information such as age, gender, etc. for each audience member of the CPH audience member panel 110b.

By URL viewing data at person level—By URL viewing behavior for each audience member of the CPH audience member panel 110b so that each member's exposure to an internet campaign tag can be determined.

By internet tree viewing data at person level—Each URL's viewing is mapped to its respective tree for each audience member of the CPH audience member panel 110b so that metrics by tree/publisher can be reported.

Internet viewing date—The date when the internet viewing occurs for each audience member of the CPH audience member panel 110b.

The following parameters are used to:

(1) map HOUSEHOLD_ID and FOLDER_NUMBER for CPH panelists (e.g., the CPH audience member panel 110b) across the TV audience member panel 110a and the online audience member panel 110c in an example CPP_NATIONAL_HOUSEHOLD_INTERNET_INSTALLED_FACT data structure 222 of the TV exposure distribution database 202 of FIG. 2;

(2) compute and store unified samples in an example CPP_NATIONAL_PERSON_INSTALLED_FACT data structure 224 of the TV exposure distribution database 202 of FIG. 2 and an example CL1_LOG data structure 226 of the online exposure database 208 of FIG. 2 (in the illustrated examples, unified samples are determined using daily person TV intab information stored in the example CPP_NATIONAL_PERSON_INSTALLED_FACT data structure 224 and internet intab information stored in the example CL1_LOG data structure 226;

(3) Identify internet campaign tags using the campaign information database 206 of FIG. 2;

(4) Identify ad level exposures via the Internet using impression data collected in the Online exposure database 208 of FIG. 2; and (5) Identify ad level exposures via TV using impression data collected in the TV exposure distribution database 202 of FIG. 2.

The example CPP_NATIONAL_HOUSEHOLD_INTERNET_INSTALLED_FACT data structure 222 of the TV exposure distribution database 202 of FIG. 2 stores the following cross-platform parameters: HOUSEHOLD_ID values and FOLDER NUMBERS.

HOUSEHOLD_ID—A TV household ID of a household that participates in the TV audience member panel 110a.

FOLDER NUMBER—An Internet folder ID.

In the illustrated example, the CPP_NATIONAL_HOUSEHOLD_INTERNET_INSTALLED_FACT data structure 222 also stores a HOUSEHOLD_ID to FOLDER NUMBER mapping between the TV audience panel 110b and the online audience panel 110c. These mapped households become panel households in the CPH audience panel 110b. In addition, a same person in a mapped household would have the same value for both PERSON_ID and MEMBER_ID. As such, once HOUSEHOLD_ID is mapped to FOLDER NUMBER, all audience members in that household are also mapped between the TV audience panel 110b and the online audience panel 110c. In the illustrated example, an ONLINE_METER_TO_MEDIA_DEVICE data structure (not shown) stores mappings between FOLDER_NUMBER and METER_ID. Using the CPP_NATIONAL_HOUSEHOLD_INTERNET_INSTALLED_FACT data structure 222 and the ONLINE_METER_TO_MEDIA_DEVICE data structure, HOUSEHOLD_ID and METER_ID can be mapped to one another (e.g., a household in the TV panel 110a can be mapped to a household in the online panel 110c). Resulting mapped households are households in the CPH panel 110b. In the illustrated example, HOUSEHOLD_ID+PERSON_ID is used to identify a person in the TV panel 110a, and METER_ID+MEMBER_ID is used to identify a person in online panel. In addition, the same person would have the same value of PERSON_ID and MEMBER_ID. For example, if a household has two persons and this household has HOUSEHOLD_ID 123 and METER_ID 456, then PERSON_ID=1 in HOUSEHOLD_ID 123 and MEMBER_ID=1 in METER_ID 456 both refer to the same panelist. Similarly, the second person in this household would have PERSON_ID=MEMBER_ID=2.

The example CPP_NATIONAL_PERSON_INSTALLED_FACT data structure 224 of the TV exposure distribution database 202 of FIG. 2 stores the following cross-platform parameters: PERSON_KEY values, HOUSEHOLD_ID values, CONCAT_HOUSEHOLD_PERSON_ID values, DATE_KEY values, and PERSON_INTAB_FLAG values.

DATE_KEY—A TV date on which one or more TV impressions were collected.

The example CL1_LOG data structure 226 of the online exposure database 208 of FIG. 2 stores the following cross-platform parameters: METER_ID values and RECEIVE_TIME values.

METER_ID—An Internet meter ID used to identify a unique household in the online audience member panel 110c (FIG. 1).

RECEIVE_TIME—Identifies an Internet log receive date at which a log was received from a meter.

An example VW_PLACEMENT_INFO data structure 228 of the campaign information database 206 of FIG. 2 stores the following cross-platform parameters: MKT_TREE_ID values and PLC_COLLECTION_START_DATE values.

MKT_TREE_ID—IDs of Internet trees that display the ads through independent sites.

PLC_COLLECTION_START_DATE—The first day when each tree starts collecting ads impression.

An example SITES_T data structure 230 of the campaign information database 206 of FIG. 2 stores Internet trees that display the ads through one or more ad networks.

An example CL1_SC_URL_INSTANCE data structure 232 of the online exposure database 208 of FIG. 2 stores the following cross-platform parameters: METER_ID values, COMPUTER_ID values, PCSES_ID values, LOCAL_TIME values, URL_NAME values, and TAG_CLIENT_ID values.

METER_ID—An Internet meter ID of a meter installed on personal computers or other computing devices (e.g., tablet devices, smart phones, etc.) of the CPH audience member panel 110b.

COMPUTER_ID—An identifier of a computer of a member of the online audience panel 110c of FIG. 1.

PCSES_ID—An identifier of an Internet PC session.

LOCAL_TIME—A view/impression date of an Internet ad.

URL_NAME—A URL of a website responsible for causing an Internet ad view/impression. The URL_NAME contains 'ca.', 'am, and 'pc' parameters.

An example CL1_PC_SESSION data structure (not shown) associated with the online audience member panel 110c stores mappings between MEMBER_ID and PCSES_ID for use in identifying which audience members of the CPH audience panel 110b are exposed to online campaigns.

The example PROGRAM_PERSON_TUNER_VIEWING_FACT data structure 212 of the TV exposure distribution database 202 of FIG. 2 stores the PERSON_KEY values and the PERSON_AA_MINUTE values for use as cross-platform parameters.

The example ADVERTISEMENT_DIMENSION data structure 214 of the TV exposure distribution database 202 of FIG. 2 stores the ADVERTISEMENT_KEY values for use as a cross-platform parameter.

The example ADVERTISEMENT_FACT data structure 216 of the TV exposure distribution database 202 of FIG. 2 stores the TELECAST_KEY values for use as a cross-platform parameter.

An example TELECAST_DIMENSION data structure (not shown) of the TV exposure distribution database 202 of FIG. 2 stores the TELECAST_KEY values and the PROGRAM_DISTRIBUTOR_NAME values.

Sub-Section 1.4—Overview of Data Schema

In the example system 200 of FIG. 2, the white boxes represent data structures, some of which are described above in detail. Also in the illustrated example of FIG. 2, calculated data includes a TV Panel Unified Sample 234, a TV universe ($UE_{TV}$) value 236, a TV advertisement (media) reach ($P_1$) 238, a TV universe advertisement (media) reach ($P_{1(TV)}$) 240, a CPH universe based TV reach ($P_{1(CPH)}$) 242, an internet/online advertisement (media) reach ($P_2$) 244, a US population universe ($UE_{US}$) data 246, an internet/online universe ($UE_{online}$) data 248, a TV_AnyInternet universe ($UE_{TV\_AnyInternet}$) 249, an internet/online universe advertisement (media) reach ($P_{2(online)}$) 250, a CPH unified sample 252, a CPH universe ($UE_{CPH}$) value 254, a CPH universe based internet/online reach ($P_{2(CPH)}$) 256, a CPH audience universe based television-internet media exposure correlation value ($Rho_{(CPH)}$ ($\rho_{(CPH)}$)) 258, a TV_AnyInternet universe based exposure correlation value ($Rho_{(TV\_AnyInternet)}$($\rho_{(TV\_AnyInternet)}$)) 260, a TV_AnyInternet universe based audience duplication probability ($P_{12(TV\_AnyInternet)}$) 262, and a US universe based audience duplication probability between TV and internet ($P_{12}$) 264. These values are described in detail below.

Section 2—Overview of Calculation Process

Example cross-media campaign duplication techniques disclosed herein are based on Danaher's two-vehicle duplication model shown in Equation 1 below.

$$p_{12(TV\_AnyInternet)} = p_{1(TV)}p_{2(Online)}\left(1 + \rho_{(TV\_AnyInternet)}\frac{[1 - p_{1(TV)}][1 - p_{2(Online)}]}{\left(\sqrt{p_{1(TV)}[1 - p_{1(TV)}]p_{2(Online)}[1 - p_{2(Online)}]}\right)}\right) \quad \text{Equation 1}$$

In Equation 1 above, the reach parameter ($p_{12(TV\_AnyInternet)}$) is the audience duplication probability between TV and internet reach ($P_{12(TV\_AnyInternet)}$) 262 of FIG. 2; the reach parameters ($p_{1(TV)}$) and ($p_{2(Online)}$) are the TV advertisement reach ($P_{1(TV)}$) 240 and the online advertisement reach ($P_{2(Online)}$) 250, respectively, of FIG. 2; and the exposure correlation parameter ($\rho_{(TV\_AnyInternet)}$) is the TV-to-online exposure correlation value ($Rho_{(TV\_AnyInternet)}$) 260 of FIG. 2 which represents the correlation between TV and internet ad exposures. In the illustrated example, the TV advertisement reach ($p_{1(TV)}$) 240, the online advertisement reach ($p_{2(Online)}$) 250, and the TV-to-online exposure correlation value ($Rho_{(TV\_AnyInternet)}$) 260 are inputs to the Danaher two-vehicle duplication model of Equation 1. The TV advertisement reach ($p_{1(TV)}$) 240 is obtained from the TV exposure distribution database 202, the online advertisement reach ($p_{2(Online)}$) 250 is obtained from the OCR database 204, and the TV-to-online exposure correlation value ($Rho_{(TV\_AnyInternet)}$) 260 is calculated from CPH panel samples initially, then adjusted and input to the model of Equation 1.

A cross-platform campaign rating (XCR) process involves obtaining/determining the three inputs (the TV advertisement reach ($p_{1(TV)}$) 240, the online advertisement reach ($p_{2(Online)}$) 250, and the TV-to-online exposure correlation value ($Rho_{(TV\_AnyInternet)}$) 260), then calculating the audience duplication probability between TV and internet ($p_{12(TV\_AnyInternet)}$) 262. In particular, campaign information such as internet tags are obtained (e.g., from the OCR database 204 and/or the campaign information database 206), TV metrics (e.g., the TV advertisement reach ($p_{1(TV)}$) 240) are calculated from exposures collected for the TV audience member panel 110a (FIG. 1), and Internet metrics (e.g., the online advertisement reach ($p_{2(Online)}$) 250) are extracted from the OCR database 204. The TV-to-online exposure correlation value ($Rho_{(TV\_AnyInternet)}$) 260 is calculated based on exposures collected for the CPH audience member panel 110b. The Danaher two-vehicle duplication model of Equation 1 is then used with these values to determine the audience duplication probability between TV and internet ($p_{12(TV\_AnyInternet)}$) 262.

As used herein, a subscript '1' (e.g., the subscript '1' in ($p_1$)) represents TV media, and a subscript '2' (e.g., the subscript '2' in ($p_2$)) represents Internet/online media. As also used herein, a metric having "(TV)" in its subscript is computed based on a TV universe; a metric having "(online)" in its subscript is computed based on an Internet universe, a metric having "(TV_AnyInternet)" in its subscript is computed based on a TV_AnyInternet universe, a metric having "(CPH)" in its subscript is computed based on a CPH panel universe, and a metric having "(US)" in its subscript is computed based on a United States (or other country, territory, etc.) universe.

Section 2.1—Obtaining Advertisement Data

To calculate XCR metrics, cross-media campaign information including online campaign information and TV campaign information is obtained. In some examples, online campaign information is obtained from the OCR database 204 by identifying (e.g., matching) online OCR campaign IDs of interest in the OCR database 204. In some examples, TV campaign information is obtained from the campaign information database 206 by identifying (e.g., matching) TV campaign IDs of interest in the campaign information database 206. In the illustrated example, a TV campaign ID of a TV campaign maps to all advertisements associated with that corresponding TV campaign in the campaign information database 206.

Cross-platform campaign mappings are generated by matching TV campaigns to corresponding Internet/online campaigns. To perform the cross-campaign mappings, the information in Table 1 below is first obtained from the OCR database 204.

In the illustrated examples, the above internet campaign name, parent name, and brand name are used to perform a search of a Monitor+ database (proprietary to the Nielsen Company) to find campaigns with similar parent company names and brand variant names. In the illustrated example, the Monitor+ database stores supplemental campaign monitoring data used in connection with unique campaign IDs to identify the ads associated with the same campaign. Based on the campaign name, the internet campaign period, each brand variant's airing period and the number of TV spots for each brand variant, a brand variant that is a relatively best or substantially best match for a searched campaign is selected. In some examples, a client also provides a creative description, and the Monitor+ database is also searched based on the creative description. In the illustrated example, to perform the search on the Monitor+ database, Monitor+ fields shown in Table 2 below are used.

TABLE 2

| Monitor + Database Fields |
| --- |
| Data Description |
| TV commercial parent name |
| TV commercial brand variant name |
| TV commercial creative description |
| Number of TV spots |
| First day when the brand variant is aired |
| Last day when the brand variant is aired |

Once all ads associated with a TV campaign are identified through searching Monitor+ database, anyone who is exposed to any one of these ads is considered an audience to the TV campaign of interest.

In some examples, using a unique TV campaign ID that maps to all ad IDs associated with a particular campaign, the parent and brand name can be used to identify the TV campaign. In some examples, mappings between TV campaign IDs and OCR campaign IDs can be used to match TV campaigns to corresponding internet campaigns.

TABLE 1

| OCR Campaign Information | | |
| --- | --- | --- |
| Data Description | Data Structure | Data Field |
| OCR Internet campaign id | CAMPAIGN 218 (FIG. 2) | CAMPAIGN_ID |
| Internet campaign tag id | CAMPAIGN 218 (FIG. 2) | CAMPAIGN_TAG_ID |
| Internet campaign name | CAMPAIGN 218 (FIG. 2) | CAMPAIGN_NAME |
| Internet campaign brand name | CAMPAIGN_ADVERTISER_BRAND | BRAND_NAME |
| Internet campaign advertiser parent name | CAMPAIGN_ADVERTISER_BRAND | PARENT_NAME |
| Internet campaign start date | CAMPAIGN 218 (FIG. 2) | CAMPAIGN_START_DATE |
| Internet campaign end date | CAMPAIGN 218 (FIG. 2) | CAMPAIGN_END_DATE |

For an Internet/online campaign, anyone who is exposed to a specific ad tag is considered as an audience to the Internet/online campaign. In the illustrated example, the ad tag includes specific tag parameters "ca" and "am" which are unique to each Internet/online campaign. In addition, tag parameters "ca", "am", and "pc" are used to identify placements and publisher. In the illustrated example, only tags that contain valid "ca", "am", and "pc" parameters are considered as valid exposure. If a placement is cancelled during the middle of the campaign, the corresponding combination of "ca", "am", and "pc" parameters is no longer valid for that campaign. In the illustrated example, these three parameters "ca", "am", and "pc" are obtained from the campaign information database 206. Data fields of the campaign information database 206 used to obtain the parameters "ca", "am", and "pc" are shown in Table 3 below.

TABLE 3

Campaign Information Database Fields to Retrieve "ca", "am", and "pc"

| Data Description | Data Structure | Data Field |
|---|---|---|
| Trackstar Internet campaign ID | CAMPAIGNS_T | CAMPAIGN_ID |
| Internet sub campaign ID, used to match OCR campaign tag ID | SUB_CAMPAIGNS_T | SUB_CAMPAIGN_ID |
| Internet campaign name | CAMPAIGNS_T | CAMPAIGN_NAME |
| Internet tag parameter "ca" | TAG_CAMPAIGNS_T | TAG_CAMPAIGN_ID |
| Internet tag parameter "am" | VW_PLACEMENT_INFO 228 (FIG. 2) | TAG_SERVER_ID |
| Internet tag parameter "pc" | VW_PLACEMENT_INFO 228 (FIG. 2) | TAG_PLACEMENT_ID |
| Internet trees that display the ads through independent sites | VW_PLACEMENT_INFO 228 (FIG. 2) | MKT_TREE_ID |
| Internet trees that display the ads through ad network | SITES_T 230 (FIG. 2) | MKT_TREE_ID |

Sub-Section 2.2—Calculate TV Metrics from the TV Panel 110*a*

In the illustrated examples disclosed herein, TV advertisement IDs associated with a campaign are used to determine TV metrics from the TV audience member panel 110*a* (FIG. 1). Data fields shown below in Table 4 are from the TV exposure distribution database 202 and are used to determine unified samples and to reassign weights by cumulative week using example rules described below in sub-section 5.3.

TABLE 4

Data Fields to Compute TV Unification

| Data Description | Data Structure | Data Field |
|---|---|---|
| TV person key | PERSON_INSTALLED_FACT 210 (FIG. 2) | PERSON_KEY |
| TV household id | PERSON_INSTALLED_FACT 210 (FIG. 2) | HOUSEHOLD_ID |
| TV household id + person id | PERSON_INSTALLED_FACT 210 (FIG. 2) | CONCAT_HOUSEHOLD_PERSON_ID |
| TV date | PERSON_INSTALLED_FACT 210 (FIG. 2) | DATE_KEY |
| TV panelist intab flag | PERSON_INSTALLED_FACT 210 (FIG. 2) | PERSON_INTAB_FLAG |
| TV panelist age | PERSON_DIMENSION | AGE |
| TV panelist gender | PERSON_DIMENSION | GENDER_CODE |

In Table 4 above of the illustrated example, age and gender may be omitted in some examples when determining unified samples. In some examples, age and gender information is used to bucket each TV panelist 110*a* into a reporting demographic group (e.g., one of 24 reporting demographic groups). In some examples, 24 reporting demographic groups are defined the same for TV and Internet/online campaigns (e.g., 12 age groups multiplied by 2 genders). In some examples, the 12 age groups include the age ranges: 2-11, 12-17, 18-20, 21-24, 25-29, 30-34, 35-39, 40-44, 45-49, 50-54, 55-64, and 65+.

In some examples, calculations described in sub-sections 2.2-2.5 are performed separately for each demographic group (e.g., each demographic bucket). In some examples, to simplify the formulae, the superscript "(d)" (which represents a demographic group d) is ignored in all notations in section 2.2-2.6. For example, instead of $p_1^{(d)}$, $p_1$ is used to represent TV reach within demographic group d.

In some examples, TV advertisement IDs (e.g., advertisement keys) to determine which minute of which telecast airs the TV advertisements from the ADVERTISEMENT_DIMENSION data structure 214 and the ADVERTISEMENT_FACT data structure 216 of the TV exposure distribution database 202 of FIG. 2. In such examples, panelists' by minute viewing behavior is overlaid onto TV advertisement airing schedules to calculate TV advertisement impressions ($IMP_1$) using a definition described below in sub-section 3.1. Data fields used for this process are located in the TV exposure distribution database 202 and shown below in Table 5.

TABLE 5

TV Advertisement Data Fields to Determine TV Impressions

| Data Description | Data Structure | Data Field |
|---|---|---|
| TV person key | PROGRAM_PERSON_TUNER_VIEWING_FACT 212 (FIG. 2) | PERSON_KEY |
| TV by minute viewing indicator | PROGRAM_PERSON_TUNER_VIEWING_FACT 212 (FIG. 2) | PERSON_AA_MINUTE |
| TV ad key | ADVERTISEMENT_DIMENSION 214 (FIG. 2) | ADVERTISEMENT_KEY |
| TV campaign advertiser parent name | ADVERTISEMENT_DIMENSION 214 (FIG. 2) | ULTIMATE_PARENT_DESC |
| TV campaign brand name | ADVERTISEMENT_DIMENSION 214 (FIG. 2) | BRAND_DESC |
| TV telecasts that air the commercials | ADVERTISEMENT_FACT 216 (FIG. 2) | TELECAST_KEY |
| Minute of the telecast when the commercial is aired | ADVERTISEMENT_FACT 216 (FIG. 2) | MOP_KEY |
| TV viewing delay hours | PLAY_DELAY_DIMENSION | PLAY_DELAY_HOURS |
| TV viewing delay minutes | PLAY_DELAY_DIMENSION | PLAY_DELAY_MINUTES |
| TV viewing same day delay flag | PLAY_DELAY_DIMENSION | PLAY_DELAY_SAME_DAY_FLAG |
| TV commercial airing date | TELECAST_DIMENSION | TELECAST_BROADCAST_DATE |
| TV networks that air the telecasts | TELECAST_DIMENSION | PROGRAM_DISTRIBUTOR_NAME |

After calculating TV advertisement impressions ($IMP_1$), a TV advertisement unique audience ($UA_1$) defined in sub-section 3.1 below is calculated, a TV advertisement average frequency ($FREQ_1$) defined in sub-section 3.3 below is calculated, and a TV advertisement reach based on the TV universe ($p_{1(TV)}$) is calculated, then TV advertisement reach based on U.S. universe ($p_1$) is calculated as defined in sub-section 3.2 below.

Sub-Section 2.3—Obtaining Internet Metrics from the OCR Database 204

In some examples, the Internet campaign name or ID is used to extract online campaign metrics from the OCR database 204 of FIG. 2. Data fields of the OCR database 204 used to perform this extraction are shown below in Table 6.

TABLE 6

Data Fields to Obtain Internet Metrics

| Data Description | Data Structure | Data Field |
|---|---|---|
| NOCR Internet campaign id | CAMPAIGN 218 (FIG. 2) | CAMPAIGN_ID |
| Internet campaign tag id | CAMPAIGN 218 (FIG. 2) | CAMPAIGN_TAG_ID |
| Internet campaign name | CAMPAIGN 218 (FIG. 2) | CAMPAIGN_NAME |
| Demo ID | CAMPAIGN_GROSS_RATING_POINT_FACT 220 (FIG. 2) | DEMOGRAPHIC_ID |
| Internet campaign publisher (tree) | CAMPAIGN_GROSS_RATING_POINT_FACT 220 (FIG. 2) | SITE_NAME |
| Internet impression ($IMP_2$) | CAMPAIGN_GROSS_RATING_POINT_FACT 220 (FIG. 2) | IMPRESSIONS |
| Internet unique audience ($UA_2$) | CAMPAIGN_GROSS_RATING_POINT_FACT 220 (FIG. 2) | REACH |
| Internet average frequency ($FREQ_2$) | CAMPAIGN_GROSS_RATING_POINT_FACT 220 (FIG. 2) | FREQUENCY |
| Internet reach based on Internet universe ($p_{2(Online)}$) | CAMPAIGN_GROSS_RATING_POINT_FACT 220 (FIG. 2) | ONLINE_REACH_PERCENT |
| Internet reach based on US universe ($p_2$) | CAMPAIGN_GROSS_RATING_POINT_FACT 220 (FIG. 2) | TOTAL_US_REACH_PERCENT |
| Internet universe ($UE_{Online}$) | CAMPAIGN_GROSS_RATING_POINT_FACT 220 (FIG. 2) | ONLINE_UNIVERSE_ESTIMATE |
| US universe ($UE_{US}$) | CAMPAIGN_GROSS_RATING_POINT_FACT 220 (FIG. 2) | TOTAL_UNIVERSE_ESTIMATE |
| TV AnyInternet universe ($UE_{TV\_AnyInternet}$) | MARKET_BREAK_UNIVERSE_ESTIMATE | UNIVERSE_ESTIMATE |
| Report data date | CAMPAIGN_GROSS_RATING_POINT_FACT 220 (FIG. 2) | DATA_DATE |

Sub-Section 2.4—Calculate TV-Internet Ad Exposure Correlation from CPH Panel 110b In the illustrated examples disclosed herein, determining audience duplication in cross-media campaigns involves estimating the inter-vehicle non-ignorable correlation between Internet and Television ad exposures observed in the CPH panel 110b.

To determine such TV-Internet ad exposure correlation, household-level mappings between the TV audience panel 110a and the online audience panel 110c are obtained. These mapped homes are considered CPH homes of the CPH audience panel 110b of FIG. 1. Data fields of the TV exposure database 202 used to perform such mapping are shown in Table 7 below.

In some examples, after a CPH panelist enters a unified sample for the first time, the panelist's demographic group is locked during the course of the campaign. In the illustrated example, this prevents or substantially reduces the likelihood of fluctuation of correlation calculations due to demographic swaps. In some examples, such as when computing TV metrics as disclosed in section 2.2, the panelist's demographic group need not be locked down to be consistent with TV reporting currency.

In the illustrated example, the CPH unified samples are used to calculate a TV advertisement unique audience based

TABLE 7

Data Fields to Identify Members of Both the TV Panel 110a and the Online Panel 110c

| Data Description | Data Structure | Data Field |
| --- | --- | --- |
| TV household id | CPP_NATIONAL_HOUSEHOLD_INTERNET_INSTALLED_FACT 222 (FIG. 2) | HOUSEHOLD_ID |
| Online folder number | CPP_NATIONAL_HOUSEHOLD_INTERNET_INSTALLED_FACT 222 (FIG. 2) | FOLDER_NUMBER |

In the illustrated example, an ONLINE_METER-to-MEDIA_DEVICE table stored in the OCR database 204 (FIG. 2) may be used to map FOLDER_NUMBER to METER_ID. In the illustrated example, CPH homes are identified by mapping HOUSEHOLD_ID and METER_ID through the use of FOLDER_NUMBER. Once CPH homes are identified, the respondent-level mapping between the TV audience panel 110b and the online audience panel 110c is established automatically because the same person shares the same PERSON_ID and MEMBER_ID in both of the TV audience panel 110b and the online audience panel 110c. In this manner, members of the CPH audience member panel 110b are identified.

Determining the correlation also involves determining unified samples and reassigning weights by cumulative week. In the illustrated example, data fields shown below in Table 8 are from the TV exposure distribution database 202 and online panel database 118 and are used to determine such unified samples and to reassign weights by cumulative week using example rules described below in sub-section 5.3.

on the CPH panel universe ($UA_{1(CPH)}$) (defined in section 3.1 below) and to calculate TV advertisement reach based on the CPH panel universe ($p_{1(CPH)}$) (defined in section 3.2 below).

In the illustrated example, the tag parameters "ca", "am", and "pc" from sub-section 2.1 above are used to determine which URL contains the online ad placements of interest. In the illustrated example, only valid "ca", "am", and "pc" parameters are used during this operation, because some ad placements get cancelled during their corresponding campaigns. URL viewing behaviors of the CPH panel 110b is overlaid onto the tag parameters "ca", "am", and "pc" data to determine online ad unique audience ($UA_{2(CPH)}$) (defined in section 3.1 below), and online ad reach ($p_{2(CPH)}$) (defined in section 3.2 below). In the illustrated example, data fields shown below in Table 9 are from the online exposure database 208 and are used to determine the online ad unique audience ($UA_{2(CPH)}$).

TABLE 8

Data Fields to Compute CPH Unification

| Data Description | Data Structure | Data Field |
| --- | --- | --- |
| TV person key | CPP_NATIONAL_PERSON_INSTALLED_FACT 224 (FIG. 2) | PERSON_KEY |
| TV household id | CPP_NATIONAL_PERSON_INSTALLED_FACT 224 (FIG. 2) | HOUSEHOLD_ID |
| TV household id + person id | CPP_NATIONAL_PERSON_INSTALLED_FACT 224 (FIG. 2) | CONCAT_HOUSEHOLD_PERSON_ID |
| TV date | CPP_NATIONAL_PERSON_INSTALLED_FACT 224 (FIG. 2) | DATE_KEY |
| TV panelist intab flag | CPP_NATIONAL_PERSON_INSTALLED_FACT 224 (FIG. 2) | PERSON_INTAB_FLAG |
| Internet meter id | CL1_LOG 226 (FIG. 2) | METER_ID |
| Internet log receive date | CL1_LOG 226 (FIG. 2) | RECEIVE_TIME |

TABLE 9

Data Fields to Determine the Online Ad Unique Audience ($UA_{2(CPH)}$)

| Data Description | Data Structure | Data Field |
| --- | --- | --- |
| Internet meter id | CL1_SC_URL_INSTANCE 232 (FIG. 2) | METER_ID |
| Internet computer id | CL1_SC_URL_INSTANCE 232 (FIG. 2) | COMPUTER_ID |
| Internet member id | CL1_PC_SESSION | MEMBER_ID |
| Internet pc session | CL1_SC_URL_INSTANCE 232 (FIG. 2) | PCSES_ID |
| Internet ad view date | CL1_SC_URL_INSTANCE 232 (FIG. 2) | LOCAL_TIME |
| Internet ad view URL (it contains "ca", "am", and "pc" parameters) | CL1_SC_URL_INSTANCE 232 (FIG. 2) | URL_NAME |

In the illustrated examples disclosed herein, the TV-Internet ad exposure correlation ($\rho_{(CPH)}$) is determined using Equation 2 below.

$$\rho_{(CPH)} = \frac{ad - bc}{\sqrt{(a+b)(a+c)(b+d)(c+d)}} \quad \text{Equation 2}$$

Using Equation 2 above, the TV-Internet ad exposure correlation ($\rho_{(CPH)}$) is calculated by each cumulative day. In Equation 2 above, the value (a) is the sum of weight of unique audience members who are exposed to neither the Internet ad nor the corresponding TV ad; the value (b) is the sum of weight of unique audience members who are exposed to the Internet ad but not the corresponding TV ad; the value (c) is the sum of weight of unique audience members who are exposed to the TV ad but not the corresponding Internet ad; and the value (d) is the sum of weight of unique audience members who are exposed to both the Internet ad and the corresponding TV ad. In the illustrated example, the values (a), (b), (c), and (d) are computed by cumulative day. For example, to report duplications up to day 'X' of the campaign, the value (a) is determined to be the sum of weight of those panelists who have never been exposed to an ad from the beginning of the campaign to the day 'X'. Further information on determining the TV-Internet ad exposure correlation ($\rho_{(CPH)}$) of Equation 2 is described below in section 4.

After determining the TV-Internet ad exposure correlation ($\rho_{(CPH)}$), the correlation is adjusted to account for data source differences using Equation 3 below.

$$\rho_{(TV\_AnyInternet)} = \quad \text{Equation 3}$$

$$\begin{cases} \rho_{(CPH)} \sqrt{\dfrac{p_{1(CPH)}p_{2(CPH)}[1-p_{1(TV)}][1-p_{2(Online)}]}{[1-p_{1(CPH)}][1-p_{2(CPH)}]p_{1(TV)}p_{2(Online)}}} & \begin{array}{l} p_{1(CPH)} \le p_{1(TV)} \\ p_{2(CPH)} \le p_{2(Online)} \end{array} \\[2em] \rho_{(CPH)} \sqrt{\dfrac{p_{1(CPH)}[1-p_{2(CPH)}][1-p_{1(TV)}p_{2(Online)}]}{[1-p_{1(CPH)}]p_{2(CPH)}p_{1(TV)}[1-p_{2(Online)}]}} & \begin{array}{l} p_{1(CPH)} \le p_{1(TV)} \\ p_{2(CPH)} > p_{2(Online)} \end{array} \\[2em] \rho_{(CPH)} \sqrt{\dfrac{[1-p_{1(CPH)}]p_{2(CPH)}p_{1(TV)}[1-p_{2(Online)}]}{p_{1(CPH)}[1-p_{2(CPH)}][1-p_{1(TV)}]p_{2(Online)}}} & \begin{array}{l} p_{1(CPH)} > p_{1(TV)} \\ p_{2(CPH)} \le p_{2(Online)} \end{array} \\[2em] \rho_{(CPH)} \sqrt{\dfrac{[1-p_{1(CPH)}][1-p_{2(CPH)}]p_{1(TV)}p_{2(Online)}}{p_{1(CPH)}p_{2(CPH)}[1-p_{1(TV)}][1-p_{2(Online)}]}} & \begin{array}{l} p_{1(CPH)} > p_{1(TV)} \\ p_{2(CPH)} > p_{2(Online)} \end{array} \end{cases}$$

Sub-Section 2.5—Calculating Duplication

Danahar's formula of Equation 1 above is used to calculate the duplicated audience members who are exposed to both TV and Internet campaigns. In the illustrated example, the calculation is performed daily.

When minimum requirements specified in section 4 below are met, duplicated reach is calculated based on TV_AnyInternet UE using Equation 4 below.

$$p_{12(TV\_AnyInternet)} = p_{1(TV)}p_{2(Online)}\left(1 + \rho_{(TV\_AnyInternet)} \frac{[1-p_{1(TV)}][1-p_{2(Online)}]}{\sqrt{p_{1(TV)}[1-p_{1(TV)}]p_{2(Online)}[1-p_{2(Online)}]}}\right) \quad \text{Equation 4}$$

Otherwise, when the minimum requirements specified in section 4 below are not met, the duplicated reach is calculated using Equation 5 below.

$$p_{12(TV\_AnyInternet)} = p_{1(TV)}p_{2(Online)} \quad \text{Equation 5}$$

The duplicated audience is calculated using Equation 6 below.

$$UA_{12} = p_{12(TV\_AnyInternet)}UE_{TV\_AnyInternet} \quad \text{Equation 6}$$

The duplicated reach based on US population is calculated using Equation 7 below.

$$p_{12} = \frac{UA_{12}}{UE_{US}} = p_{12(TV\_AnyInternet)} \frac{UE_{TV\_AnyInternet}}{UE_{US}} \quad \text{Equation 7}$$

In some examples, the duplicated reach should preferably, but not necessarily, monotonically increase if no media placement (e.g., an advertisement, a television show, a radio show, broadcast media, web media or other Internet-delivered media, etc.) is cancelled during the course of a campaign. In such examples, if the estimated duplication on day 'X' is less than the estimation on day 'X−1', it should preferably, but not necessarily, be replaced by the estimation of the prior day when both TV reach and online reach are greater than or equal to the prior day's TV reach and online reach, respectively.

Sub-Section 2.6—Aggregate Campaign Duplication

As noted above, the calculations of sub-sections 2.2-2.5 disclosed above are computed within each demographic group. After the duplication within each demographic group is computed, the resulting duplications are aggregated to the total campaign-level duplication. In the illustrated example, the aggregation is performed daily. The following parameters are used to aggregate the by-demographic-group duplications to the total campaign-level duplication.

($p_{12}^{(d)}$)—represents duplicated reach based on US universe for demographic group (d) between TV and internet.
($UE_{US}^{(d)}$)—represent total population for demo group (d) in the US
($UE_{US}$)—represent total population in the US The duplicated reach for the campaign is determined using Equation 8 below.

$$\sum_{d=1}^{24} UE_{US}^{(d)} p_{12}^{(d)} / UE_{US} \qquad \text{Equation 8}$$

Sub-Section 2.7—Calculate Duplication by TV Network

To compute duplication between each TV network and total Internet, each individual TV network is treated as if it were a separate media type, and then processes described above in section 2.2 to 2.5 are used. In the illustrated examples, the duplications between TV network and total internet is determined at the campaign level (e.g., all persons with 2+ age) rather than at the demographic level. Therefore, if 'M' TV networks aired campaign commercials, the XCR process is run 'M' times each day at the total campaign level to estimate duplication between each TV network and total Internet.

Let $p_{1(m)2}$ be the duplication between TV network 'm' and total Internet. In the illustrated example, these estimations must meet the following two conditions:

Condition 1: The sum of duplications between each individual TV network and total Internet should be greater than the duplication between total TV and total Internet $$\left(i.e., \sum_{m=1}^{M} p_{1(m)2} \geq p_{12}\right).$$

Condition 2: The duplication between each individual TV network and total Internet should be smaller than the duplication between total TV and total Internet (i.e., $p_{1(m)2} \leq p_{12}$ for all $1 \leq m \leq M$).

In some examples, the nature of the above two conditions prevents them from being unmet at the same time. However, when either of them is not met (e.g., violated), adjustments should preferably, but not necessarily, be made to increase or ensure the consistency of estimated duplications. In such examples, let ($p_{1(m)}$) be the US UE based TV reach for TV network 'm'; let ($MAXp_{1(m)2}$) be the maximum possible duplication between the TV network 'm' and total internet, where $MAXp_{1(m)2}=Min[p_{1(m)}, p_2]$; and let ($DIFp_{1(m)2}$) be the difference between the estimated duplication and the maximum duplication for the TV network 'm' and total internet (i.e., $DIFp_{1(m)2}=MAXp_{1(m)2}-p_{1(m)2}$).

When Condition 1 above is not met, the duplication is adjusted for all 'm' estimations using Equation 9 below.

$$p_{1(m)1} = p_{1(m)2} + \frac{DIFp_{1(m)2}}{\sum_{m=1}^{M} DIFp_{1(m)2}}\left[p_{12} - \sum_{m=1}^{M} p_{1(m)2}\right] \qquad \text{Equation 9}$$

When Condition 2 above is not met, the duplication is adjusted only for those estimations that do not meet Condition 2 using Equation 10 below.

$$p_{1(m)2} = p_{12} \qquad \text{Equation 10}$$

Sub-Section 2.8—Calculate Duplication Filtered by Internet Publisher

In some examples, XCR reports may include an internet publisher filter. In other words, all duplications computed as disclosed in sections 2.1 to 2.7 can be calculated by internet publisher as well. To compute duplications filtered by a publisher, each individual internet publisher is handled as a separate media, and then the processes disclosed in section 2.1 to 2.7 are used to calculate duplications for each internet publisher. In such examples, the demographic level duplication filtered by publisher are computed at the demographic level, and then aggregated to the total campaign-level duplication. In the illustrated examples, the by-network duplication filtered by publisher is computed at the campaign level rather than the demographic level as disclosed in section 2.7. If 'N' internet publishers displayed campaign ads, an XCR process (section 2.1 to 2.7) is performed 'N' times so that each publisher can be filtered. In the illustrated examples, the calculations performed daily.

Sub-Section 2.8.1—Calculate Duplication Between Total TV and Internet Publisher

In the illustrated examples, the duplication calculation and adjustment between total TV and each individual internet publisher are performed at the demographic group level. In the illustrated examples, the parameter ($p_{12(n)}$) is the duplication between TV and internet publisher 'n'. In the illustrated examples, the duplication must meet the following two conditions.

Condition 1: The sum of duplications between total TV and each individual publisher should be greater than the duplication between total TV and total internet $$\left(i.e., \sum_{n=1}^{N} p_{12(n)} \geq p_{12}\right).$$

Condition 2: The duplication between total TV and each individual publisher should be smaller than duplication between total TV and total internet (i.e., $p_{12(n)} \leq p_{12}$ for all $1 \leq n \leq N$).

In some examples, the nature of the above two conditions prevents them from being unmet at the same time. However when either of them is not met (e.g., violated), adjustments should preferably, but not necessarily, be made to increase or ensure the consistency of estimated duplications. In such examples, let ($p_{2(n)}$) be the US UE based internet reach for publisher 'n'; let ($MAXp_{12(n)}$) be the maximum possible duplication between the total TV and internet publisher 'n', where $MAXp_{2(n)}=Min[p_1, p_{2(n)}]$; and let ($DIFp_{12(n)}$) be the difference between the estimated duplication and the maximum duplication for the total TV and publisher 'n' (i.e., $DIFp_{12(n)}=MAXp_{12(n)}-p_{12(n)}$).

When Condition 1 is not met, the duplications is adjusted for all 'n' estimations using Equation 11 below.

$$p_{12(n)} = p_{12(n)} + \frac{DIFp_{12(n)}}{\sum_{n=1}^{N} DIFp_{12(n)}} \left[ p_{12} - \sum_{n=1}^{N} p_{12(n)} \right]$$ Equation 11

When Condition 2 is not met, the duplication is adjusted only for those estimations that do not meet Condition 2 using Equation 12 below.

$$p_{12(n)} = p_{12}$$ Equation 12

Sub-Section 2.8.2—Calculate Duplication Between TV Network and Internet Publisher In the illustrated examples, the duplication calculation and adjustment between each individual TV network and each individual internet publisher is performed at the campaign level (e.g., all persons with 2+ age) rather than at the demographic level, due to the limited size of the CPH panel. In the illustrated examples, let $(p_{1(m)2(n)})$ be the duplication between TV network 'm' and internet publisher 'n'. In the illustrated example, these estimations must meet the following four conditions:

Condition 1: The sum of duplications between each TV network and a specific publisher should be greater than the duplication between total TV and that publisher (i.e., $$\left( i.e., \sum_{m=1}^{M} p_{1(m)2(n)} \geq p_{12(n)} \right)$$

for all $1 \leq n \leq N$.

Condition 2: The duplication between each TV network and a specific publisher should be smaller than the duplication between total TV and that publisher (i.e., $p_{1(m)2(n)} \leq p_{12(n)}$) for all $1 \leq m \leq M$ and $1 \leq n \leq N$.

Condition 3: The sum of duplications between each publisher and a specific TV network should be greater than duplication between total internet and that network (i.e., $$\left( i.e., \sum_{n=1}^{N} p_{1(m)2(n)} \geq p_{1(m)2} \right)$$

for all $1 \leq m \leq M$.

Condition 4: The duplication between each publisher and a specific TV network should be smaller than the duplication between total internet and that network (i.e., $p_{1(m)2(n)} \leq p_{1(m)2}$) for all $1 \leq m \leq M$ and $1 \leq n \leq N$.

The following applies the same methodology as disclosed in section 2.7 to adjust the duplication between each TV network and each internet publisher, with total internet being replaced by individual internet publisher. This adjustment ensures that Conditions 1 and 2 are met. In some examples, Conditions 3 and 4 may be allowed to be violated so long as Conditions 1 and 2 are met. In the illustrated examples, let $(p_{12(n)})$ be the duplication between total TV and internet publisher 'n' computed in section 2.8.1; let $(p_{1(m)2(n)})$ be the estimated duplication between network 'm' and publisher 'n'; let $(MAXp_{1(m)2(n)})$ be the maximum possible duplication between network 'm' and publisher 'n', wherein $(MAXp_{1(m)2(n)} = \text{Min}[p_{1(m)}, p_{2(n)}]$; and let $(DIFp_{1(m)2(n)})$ be the difference between estimated duplication and maximum duplication for TV network 'm' and publisher 'n' (i.e., $DIFp_{1(m)2(n)} = MAXp_{1(m)2(n)} - p_{1(m)2(n)}$).

When Condition 1 is not met, the duplication for all 'm' estimations using Equation 13 below.

$$p_{1(m)2(n)} = p_{1(m)2(n)} + \frac{DIFp_{1(m)2(n)}}{\sum_{m=1}^{M} DIFp_{1(m)2(n)}} \left[ p_{12(n)} - \sum_{m=1}^{m} p_{1(m)2(n)} \right]$$ Equation 13

When Condition 2 is not met, the duplication is adjusted only for those estimations that do not meet Condition 2 using Equation 14 below.

$$p_{1(m)2(n)} = p_{12(n)}$$ Equation 14

Sub-Section 2.9—Order of Duplication Calculation

This section discloses the order of calculations for determining duplicated reach. FIG. 11 is a flow diagram of an example method to calculate duplicated reach. The example method of FIG. 11 may be implemented using a processor system (e.g., the processor platform 1000 described below in connection with FIG. 10).

Initially, a processor (e.g., the processor 1012 of FIG. 10) determines a duplicated audience reach between a total TV audience and a total internet audience at the demographic level for different demographic groups (d) $(p_{12}^{(d)})$ (block 1101). For example, the processor 1012 can calculate the duplicated audience reach values of block 1101 using the example method disclosed in sections 2.4 and 2.5. In examples disclosed herein, the total TV audience represents audience members exposed to a TV media campaign across a plurality of TV networks 'm' that run the media campaign. In examples disclosed herein, the total internet audience represents audience members exposed to an internet/online media campaign across a plurality of internet publishers 'n' that run the media campaign. In the illustrated example, there are 24 different demographic groups (d) numbered d=1 (DEMO 1) through d=24 (DEMO 24). In the illustrated example, the subscript 1 represents TV audience reach, the subscript 2 represents online audience reach, and the subscript 12 represents a duplicate audience reach.

The processor 1012 determines a duplicated audience reach between the total TV audience and the total internet audience at the campaign level $(p_{12})$ (block 1102). For example, the processor 1012 can calculate the duplicated audience reach of block 1102 by summing the values $p_{12}^{(d)}$, which represent duplicated audience reach between the total TV audience and the total internet audience at the demographic level determined at block 1101. The summation of block 1102 can be performed using the example method disclosed in section 2.6. In the illustrated example, the campaign level involves one or more media campaigns for which corresponding media is presented as TV media via one or more television networks 'm' and internet/online media via one or more internet publishers 'n'. For example, a media campaign can have both TV ads (and/or other TV media) and internet/online ads (and/or other internet/online media). As such, audience reach at a campaign level for such a media campaign can be determined using TV audience reach metrics for the TV media of the media campaign, using internet/online audience reach metrics for the internet/online media of the media campaign, and duplicate reach metrics for audience members exposed to both the TV media and internet/online media of the media campaign.

The processor 1012 determines a duplicated audience reach between an individual TV network 'm' audience and the total internet audience at the campaign level ($p_{1(m)2}$) (block 1103). For example, the processor 1012 can calculate the duplicated audience reach of block 1103 by locking the value $p_{12}$ (duplicated audience reach between a total TV audience and a total internet audience at the campaign level determined at block 1102) and adjusting the values $p_{1(m)2}$ for 'M' TV networks 'm' using the example method disclosed in section 2.7. In examples disclosed herein, an individual TV network audience represents audience members exposed to a TV media campaign via a particular TV network 'm'.

The processor 1012 determines a duplicated audience reach between the total TV audience and an individual internet publisher 'n' audience at the demographic level ($p_{12(n)}^{(d)}$) (block 1104). For example, the processor 1012 can calculate the duplicated audience reach of block 1104 by locking the values $p_{12}^{(d)}$ (duplicated audience reach between the total TV audience and the total internet audience at the demographic level determined at block 1101) and adjusting the values $p_{12(n)}^{(d)}$ for 'N' internet publishers 'n' audiences using the example method disclosed in section 2.8.1. In examples disclosed herein, an individual internet publisher 'n' audience represents audience members exposed to an internet/online media campaign via a particular internet publisher 'n'.

The processor 1012 determines a duplicated audience reach between the total TV audience and an individual internet publisher 'n' audience at the campaign level ($p_{12(n)}$) (block 1105). For example, the processor 1012 can calculate the duplicated audience reach of block 1105 by summing the values $p_{12(n)}^{(d)}$ (duplicated audience reach between the total TV audience and the individual internet publisher n' audience at the demographic level determined at block 1104) using the example method disclosed in section 2.6.

The processor 1012 determines a duplicated audience reach between an individual TV network 'm' audience and an individual internet publisher 'n' audience at the campaign ($p_{1(m)2(n)}$) (block 1106). For example, the processor 1012 can calculate the duplicated audience reach of block 1106 by locking the values p (duplicated audience reach between the total TV audience and the individual internet publisher 'n' audience at the campaign level determined at block 1105) and adjusting the values $p_{1(m)2(n)}$ for 'M' TV networks 'm' and 'N' internet publishers 'n' using the example method disclosed in section 2.8.2.

In the illustrated example operations of blocks 1101, 1103, 1104, and 1106 above, the duplicated audience reach on day 'x' is compared with the duplicated audience reach on day 'x–1'. If the duplicated audience reach on day 'x' is less than the duplicated audience reach of the previous day 'x–1', and if the TV audience reach and online audience reach are greater than or equal to the previous day's TV audience reach and online audience reach, respectively, the duplicated audience reach of day 'x' should be replaced by the duplicated audience reach of the previous day 'x–1'. Then, the adjusted duplicated audience reach calculated in the operations of blocks 1101, 1103, 1104, and 1106 should be used as the base to perform the next operation (e.g., the adjusted duplicated audience reach from block 1101 should be used as the base for performing block 1102, the adjusted duplicated audience reach of block 1103 should be used as the base for performing block 1104, etc.). For example, using (x) to denote day x's metric, the adjustment formula used in the operations of blocks 1101 and 1104 are $p_{12}^{(d)}(x) = p_{12}^{(d)}(x-1)$ and $p_{12(n)}^{(d)}(x) = p_{12(n)}^{(d)}(x-1)$.

In some examples, at block 1103, when day x's duplicated audience reach between a total TV audience and a total internet audience is less than day x–1's duplicated audience reach between one network 'm' and total internet (i.e., $p_{12}(x) < p_{1(m)2}(x-1)$) a similar adjustment as used at blocks 1101 and 1104 results in day x's duplicated audience reach between one network 'm' audience and a total internet audience being greater than the duplicated audience reach between the total TV audience and the total internet audience. In some examples, at block 1106, a similar outcome may occur. In some examples, such an inconsistency is acceptable. In such examples, the adjustment operations of blocks 1103 and 1106 are implemented using $p_{1(m)2}(x) = p_{1(m)2}(x-1)$ and $p_{1(m)2(n)}(x) = p_{1(m)2(n)}(x-1)$.

Figure 12:
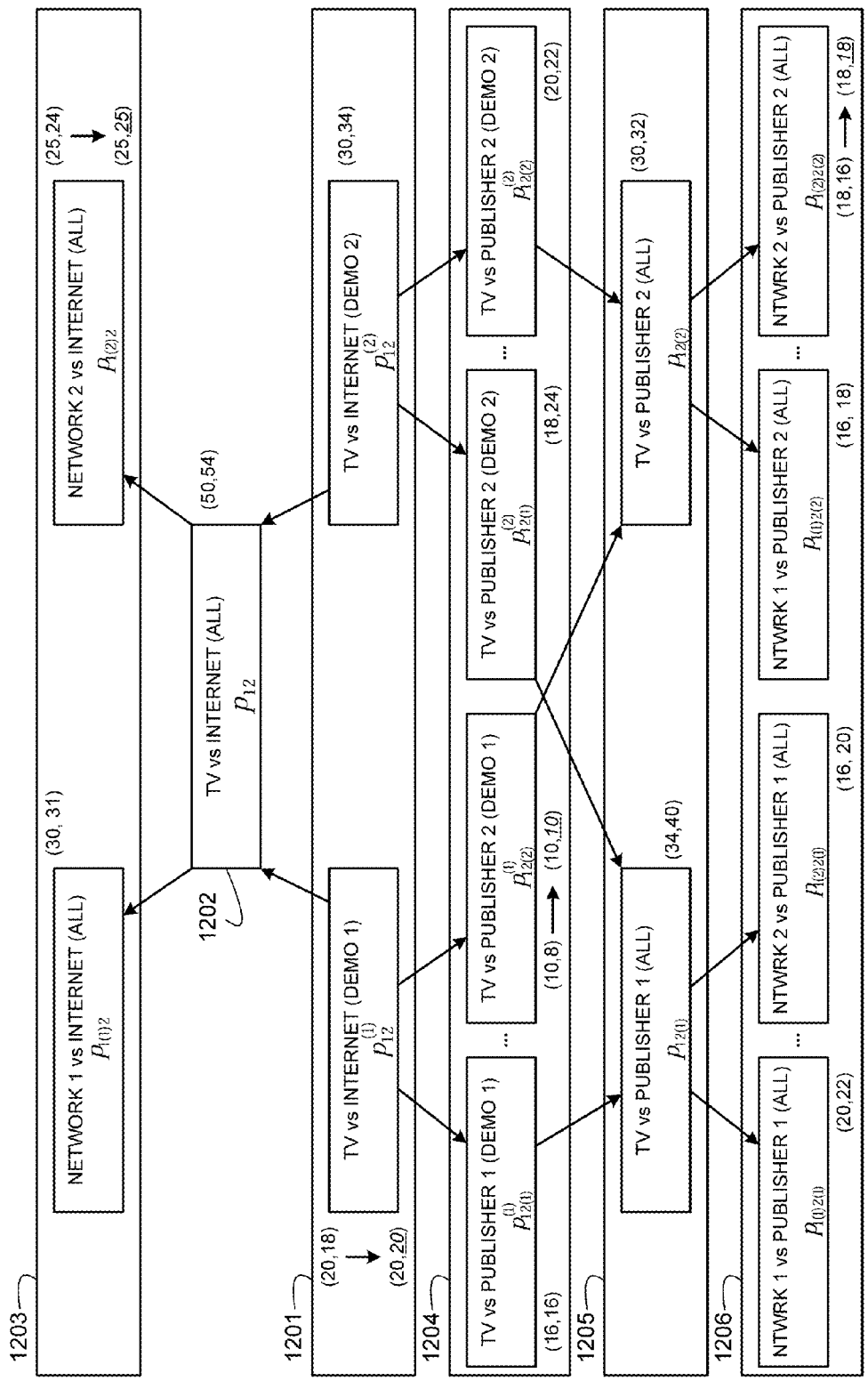
FIG. 12 is a flow diagram representative of example machine readable instructions that may be executed to determine duplicated unique audience for two demographic groups, two publishers, and two television networks.

FIG. 12 is a flow diagram of an example method that may be used to determine duplicated unique audience for two demographic groups 'd', two internet publishers 'n', and two television networks 'm'. The example method of FIG. 12 may be implemented using a processor system (e.g., the processor platform 1000 described below in connection with FIG. 10). In the illustrated example of FIG. 12, two values are located within parentheses shown next to each box. In each value pair, the left-most value (i.e., before the comma) denotes the duplicate audience on day 'x–1', and the right-most value (i.e., after the comma) denotes duplicated audience on day 'x'. The example flow diagram of FIG. 12 may be used to compute a duplicated unique audience for day 'x'. In the illustrated example, the TV reach and online reach on day 'x' is higher than the TV reach and online reach on day 'x–1' for all levels of duplicated unique audience calculations (e.g., a demographic level, network level, demographic by publisher level, and network by publisher level).

Initially, the processor 1012 determines demographic level audience duplication between a total TV audience and a total internet audience ($p_{12}^{(d)}$) (block 1201). For a first demographic group (DEMO 1 (d=1)) of the illustrated example, the initial computed demographic level audience duplication for day 'x' is 18 (right-most value in the value pair (20,18)), which is less than the previous day's 'x–1' computed demographic level audience duplication value of 20 (left-most value in the value pair (20,18)). Thus, 18 is replaced by 20 in the illustrated example (denoted with an arrow and underlined and italic font). For a second demographic group (DEMO 2 (d=2)) of the illustrated example, no change needs to be made on the computed demographic level audience duplication 34 for day 'x' because the computed demographic level audience duplication 34 for day 'x' is greater than the computed demographic level audience duplication 30 for the previous day 'x–1'.

The processor 1012 determines campaign level audience duplication between a total TV audience and a total internet audience ($p_{12}$) (block 1202). For example, the processor 1012 can calculate the campaign level audience duplication of block 1202 by summing the demographic level audience duplication (e.g., 20+34=54). In the illustrated example, at block 1202, the resulting campaign level audience duplication of day 'x' need not be compared with the campaign level audience duplication of the previous day 'x–1'.

The processor 1012 determines campaign level audience duplication between a TV network 'm' audience and a total internet audience ($p_{1(m)2}$) (block 1203). In the illustrated example, the initial campaign level audience duplication between a Network 2 audience and an internet audience for day 'x' is 24. After comparing with the previous day's 'x–1' campaign level audience duplication value 25 with the campaign level audience duplication 24 of day 'x', the campaign level audience duplication value of 24 is adjusted to 25 because the computed campaign level audience duplication value 24 of day 'x' is less than the previous day's 'x–1' campaign level audience duplication value 25.

The processor 1012 determines demographic level audience duplication between a total TV audience and an internet publisher 'n' audience ($p_{12(n)}^{(d)}$) (block 1204). In the illustrated example, the demographic level audience duplication between the total TV audience and the total internet audience for the first demographic group (DEMO 1 (d=1)) is maintained at 20 (the demographic level audience duplication value of day 'x' updated at block 1101). After comparing the demographic level audience duplication of day 'x' with the previous day's 'x−1' demographic level audience duplication value, the demographic level audience duplication between total TV and Publisher 2 for the first demographic group (DEMO 1) is updated from 8 to 10 because the previous day's 'x−1' demographic level audience duplication value 10 is greater than the demographic level audience duplication value 8 of day 'x'.

The processor 1012 determines aggregate campaign level audience duplication between a total TV audience and each internet publisher 'n' audience ($p_{12(n)}$) (block 1205). Therefore, in the illustrated example, the aggregate campaign level audience duplication between the total TV audience and a Publisher 2 audience is 10+22=32, which is the sum of the demographic level audience duplication value 10 of the total TV audience and the Publisher 2 audience for the first demographic group (DEMO 1) of block 1204 and the demographic level audience duplication value 22 of the total TV audience and the Publisher 2 audience for the second demographic group (DEMO 2) of block 1204. In the illustrated example, there is no need to compare with the previous day's value at block 1205.

The processor 1012 determines a campaign level audience duplication between a TV network 'm' audience and an internet publisher 'n' audience ($p_{1(m)2(n)}$) (block 1206). In the illustrated example, when comparing the initial campaign level audience duplication value 16 of day 'x' with the previous day's 'x−1' campaign level audience duplication value 18 for the campaign level audience duplication between the Network 2 audience and the Publisher 2 audience, the campaign level audience duplication value of 16 is replaced with 18 because the previous day's 'x−1' campaign level audience duplication value 18 is greater than the initial campaign level audience duplication value 16 of day 'x'.

In some examples, to minimize or decrease rounding error, calculations performed in the flow diagrams of FIGS. 11 and 12 may be conducted using decimal values without rounding in intermediate calculations. In such examples, duplicated audience values can be rounded to nearest integer values when reporting a final value for displaying via a user interface.

Section 3—Detailed Description for Calculating Each Metric

Sub-Section 3.1—Determining Unique Audience (TV, Online, and TV+Online)

To calculate unique audience, impression is defined first. For TV impressions of the examples disclosed herein, a minute-level viewing record is used to count impressions. In disclosed examples, one impression is counted when a person watches a commercial airing network during a commercial airing minute. For example, if a commercial runs for 20 seconds on a TV network "TVNW", one impression will be counted if a person watches the TVNW during the minute when the commercial is aired on the TVNW. For Internet impressions, one impression of the examples disclosed herein is defined as one URL view which contains the campaign ad tag.

In the illustrated examples, TV impressions are determined based on the TV audience panel 110a (FIG. 1), and Internet impressions are extracted from the OCR database 204 (FIG. 2). In particular, TV Impressions are determined based on the TV audience panel 110a, and are preferably, but not necessarily, reported in XCR as a final TV impression (e.g., $IMP_1$=sum of weighted impressions for all audience members of the TV audience panel 110a). An Internet Impressions are extracted from the OCR database 204, and preferably, but not necessarily, serve as the final Internet impression in XCR (e.g., $IMP_2$=count of Internet impressions from the OCR database 204).

If a person has more than one TV impression, that person is counted as a unique audience to the TV campaign. Therefore, a TV unique audience ($UA_1$) is the total number of people, each of which has at least one TV impression. Similarly, an online unique audience ($UA_2$) is the total number of people, each of which has at least one Internet impression. In addition, a duplicate (TV+online) unique audience ($UA_{12}$) is the total number of people, each of which has at least one TV impression and one Internet impression. Accordingly, in the disclosed examples, $UA_{12}$<=min($UA_1$, $UA_2$).

In the illustrated examples, unique audiences are determined using different sources. A TV unique audience ($UA_1$) of the illustrated examples is determined using the TV audience panel 110a and is used as the final TV unique audience reported in XCR (e.g., $UA_1$=the sum of the weights for all panelists of the TV audience panel 110a that have at least one TV impression). An Internet/online unique audience ($UA_2$) of the illustrated examples is extracted from the OCR database 204 and serves as the final Internet/online unique audience ($UA_2$) reported in XCR (e.g., $UA_2$=count of unique persons who have at least one Internet/online impression). A duplicated unique audience ($UA_{12}$) of the illustrated examples is determined based on Equation 15 below and serves as the final duplicated unique audience ($UA_{12}$) reported in XCR.

$$UA_{12} = p_{12} UE_{US} \qquad \text{Equation 15}$$

The values ($p_{12}$) and ($UE_{US}$) are described in detail below.

Also in the illustrated examples, unique CPH audiences are determined based on the CPH audience panel 110b (FIG. 1) and are used to calculate duplication. In examples disclosed herein, unique CPH audiences include a TV-CPH unique audience ($UA_{1(CPH)}$), an online-CPH unique audience ($UA_{2(CPH)}$), and a duplicated-CPH unique audience ($UA_{12(CPH)}$). The TV-CPH unique audience ($UA_{1(CPH)}$) of the illustrated example is a sum of weights for all panelists of the CPH audience panel 110b having at least one TV impression. The online-CPH unique audience ($UA_{2(CPH)}$) of the illustrated example is a sum of weights for all panelists of the CPH audience panel 110b having at least one internet impression. The duplicated-CPH unique audience ($UA_{12(CPH)}$) is a sum of weights for all panelists of the CPH audience panel 110b having at least one TV impression and one internet impression.

Section 3.2—Reach

As used herein, reach is a unique audience divided by a universe. In examples disclosed herein, multiple universes are used.

TV universe ($UE_{TV}$): Total number of people who have access to TV (at home) (e.g., $UE_{TV}$=sum of weights of TV audience members 110a). This is the universe that is preferably, but not necessarily, used in TV reporting.

Online universe ($UE_{Online}$): Total number of people who have access to the Internet (from all locations). This is the universe that is preferably, but not necessarily, used in internet reporting. In the examples disclosed herein, the source for the online universe ($UE_{Online}$) is the OCR database 204 (FIG. 2).

U.S. population universe ($UE_{US}$): In the cross-media context, this is used as a common base (universe) to compare TV reach and internet reach and to compute duplication. In the examples disclosed herein the U.S. universe ($UE_{US}$) as the common base is the total population in the United States (but may be any other country, state, territory, etc.). In the examples disclosed herein, the source for the U.S. population universe ($UE_{US}$) is the OCR database 204 (FIG. 2).

TV_AnyInternet universe ($UE_{TV\_AnyInternet}$): Total number of people who have access to TV from home and internet from all locations. In the illustrated examples, the cross platform duplication occurs within this universe.

Cross platform home (CPH) panel universe ($UE_{CPH}$): Total number of people who have access to TV from home and internet from home (e.g., $UE_{CPH}$=sum of weight of CPH panelists 110b (FIG. 1)). This universe is a subset of the TV_AnyInternet universe ($UE_{TV\_AnyInternet}$). In some examples, a cross platform home panel is also called a TVPC panel. As used herein, the term CPH refers to the CPH panel (e.g., stored in the CPH panel database 114 of FIG. 1) of the AME 102 of FIG. 1, and the term TV_AnyInternet refers to the cross platform universe space that is measured using examples disclosed herein.

Based on the above descriptions of the universes, the following inequalities hold true, where $UE_{CPH}$=sum of weight of CPH panelists 110b:

$$UE_{US} > UE_{TV} > UE_{TV\_AnyInternet} > UE_{CPH}$$

$$UE_{US} > UE_{Online} > UE_{TV\_AnyInternet} > UE_{CPH}$$

$$UE_{US} > UE_{TV} + UE_{Online} - UE_{TV\_AnyInternet}$$

Using the universe definitions disclosed above, TV reach ($p_{1(TV)}$) is determined based on the TV universe ($UE_{TV}$) using Equation 16 below.

$$p_{1(TV)} = \frac{UA_1}{UE_{TV}} \qquad \text{Equation 16}$$

Since the CPH panel 110b is a subset of the TV panel 110a, the TV reach computed from the CPH panel 110b ($p_{1(CPH)}$) is close to the reach from the TV panel 110a. The reach for the CPH panel 110b ($p_{1(CPH)}$) is determined using Equation 17 below.

$$p_{1(CPH)} = \frac{UA_{1(CPH)}}{\text{sum of weight of all CPH panelists}} \qquad \text{Equation 17}$$

A TV reach based on the US universe ($p_1$) is determined using Equation 18 below. This is the final TV reach reported in XCR.

$$p_1 = \frac{UA_1}{UE_{US}} = p_{1(TV)} \frac{UE_{TV}}{UE_{US}} \qquad \text{Equation 18}$$

An Internet/online reach ($p_{2(Online)}$) based on the Internet universe is determined using Equation 19 below. In the illustrated examples, this is reported in the OCR database 204.

$$p_{2(Online)} = \frac{UA_2}{UE_{Online}} \qquad \text{Equation 19}$$

An Internet/online reach is computed from the CPH universe ($p_{2(CPH)}$) determined using Equation 20 below.

$$p_{2(CPH)} = \frac{UA_{2(CPH)}}{\text{sum of weight of all CPH panelists}} \qquad \text{Equation 20}$$

An Internet/online reach based on the US universe ($p_2$) is determined using Equation 21 below. In the illustrated examples, this is reported in the OCR database 204, and it preferably, but not necessarily, serves as the final Internet/online reach in XCR.

$$p_2 = \frac{UA_2}{UE_{US}} = p_{2(Online)} \frac{UE_{Online}}{UE_{US}} \qquad \text{Equation 21}$$

Sub-Section 3.3—Average Frequency

As used herein, frequency is a number of impressions divided by a quantity of unique audience members. In the examples disclosed herein, the TV average frequency for people who are exposed only to TV would be the same as that for people who are exposed to both TV and internet campaign within each demographic group. This applies similarly for the internet average frequency.

Sub-Section 3.3.1—Average Frequency by Demographic Groups

Examples disclosed herein use the same or similar example methods to calculate TV impression frequency and internet impression frequency. The below process disclosed in this sub-section uses TV average impression frequency ($FREQ_1^{(d)}$) for purposes of illustration to show an example process for determining average impression frequency by demographic group. A similar process may be used to determine internet average impression frequency. As disclosed above, the average TV impression frequency for a demographic group 'd' for both TV only and duplicated audience are the same, which may be calculated using Equation 22 below.

$$FREQ_1^{(d)} = \frac{IMP_1^{(d)}}{UA_1^{(d)}}, \qquad \text{Equation 22}$$

where
   $IMP_1^{(d)}$ is TV impression for demographic group 'd'
   $UA_1^{(d)}$ is TV unique audience for demographic group 'd'
The campaign level TV average impression frequency ($FREQ_1$) is determined using Equation 23 below.

$$FREQ_1 = \frac{\sum_{d=1}^{24} FREQ_1^{(d)} UA_1^{(d)}}{\sum_{d=1}^{24} UA_1^{(d)}} = \frac{IMP_1}{UA_1} \qquad \text{Equation 23}$$

In Equation 23 above, the campaign level TV average impression frequency ($FREQ_1$) is determined by determining a summation of products of the average television impression frequencies ($FREQ_1^{(d)}$) and corresponding quantities of unique television audience members ($UA_1^{(d)}$) of the plurality of demographic groups $$\left(\text{i.e.,} \sum_{d=1}^{24} FREQ_1^{(d)} UA_1^{(d)}\right).$$

The summation $$\left(\sum_{d=1}^{24} FREQ_1^{(d)} UA_1^{(d)}\right)$$

is then divided by a summation of the quantities of unique television audience members of the plurality of demographic groups $$\left(\sum_{d=1}^{24} UA_1^{(d)}\right).$$

The campaign level average TV impression frequency for the duplicated audience ($TVFREQ_{12}$) is determined using Equation 24 below.

$$TVFREQ_{12} = \frac{\sum_{d=1}^{24} FREQ_1^{(d)} UA_{12}^{(d)}}{\sum_{d=1}^{24} UA_{12}^{(d)}}, \qquad \text{Equation 24}$$

where $UA_{12}^{(d)}$ is estimated duplicated audience for demo group 'd'

In Equation 24 above, campaign level average TV impression frequency for the duplicated audience ($TVFREQ_{12}$) is determined by determining a summation of products of the average television impression frequencies ($FREQ_1^{(d)}$) and corresponding quantities of duplicated audience members ($UA_{12}^{(d)}$) of the plurality of demographic groups $$\left(\text{i.e.,} \sum_{d=1}^{24} FREQ_1^{(d)} UA_{12}^{(d)}\right).$$

The summation $$\left(\sum_{d=1}^{24} FREQ_1^{(d)} UA_{12}^{(d)}\right)$$

is then divided by a second summation of the quantities of duplicated audience members ($UA_{12}^{(d)}$) of the plurality of demographic groups.

The campaign level TV average impression frequency for the TV only audience ($TVFREQ_{1only}$) is determined using Equation 25 below.

$$TVFREQ_{1only} = \frac{\sum_{d=1}^{24} FREQ_1^{(d)}(UA_1^{(d)} - UA_{12}^{(d)})}{\sum_{d=1}^{24} (UA_1^{(d)} - UA_{12}^{(d)})} \qquad \text{Equation 25}$$

In Equation 25 above, the campaign level TV average impression frequency for the TV only audience ($TVFREQ_{1only}$) is determined by determining a summation of products of the average television impression frequencies ($FREQ_1^{(d)}$) and corresponding differences between quantities of unique television audience members and duplicated audience members ($UA_1^{(d)} - UA_{12}^{(d)}$) of the plurality of demographic groups $$\left(\text{i.e.,} \sum_{d=1}^{24} FREQ_1^{(d)}(UA_1^{(d)} - UA_{12}^{(d)})\right).$$

The summation $$\left(\sum_{d=1}^{24} FREQ_1^{(d)}(UA_1^{(d)} - UA_{12}^{(d)})\right)$$

is then divided by a second summation of the differences between quantities of unique television audience members and duplicated audience members ($UA_1^{(d)} - UA_{12}^{(d)}$) of the plurality of demographic groups $$\left(\text{i.e.,} \sum_{d=1}^{24} (UA_1^{(d)} - UA_{12}^{(d)})\right).$$

Sub-Section 3.3.2—Average TV Frequency by TV Network

In the illustrated examples, the TV frequency by TV network is computed at the campaign level rather than at the demographic level. The overall average TV frequency for TV network 'm' ($FREQ_{1(m)}$) is shown in Equation 26 below.

$$FREQ_{1(m)} = \frac{IMP_{1(m)}}{UA_{1(m)}} \qquad \text{Equation 26}$$

In Equation 26 above, $IMP_{1(m)}$ represents TV impressions for TV network 'm', and $UA_{1(m)}$ represents TV unique audience for TV network 'm'.

Initially, the TV frequency for TV only audience and duplicated audience are both set to be equal to the overall average TV frequency ($FREQ_{1(m)}$) using Equation 27 below.

$$TVFREQ_{11(m)only} = TVFREQ_{1(m)2} = FREQ_{1(m)} \text{ for all } 1 \leq m \leq M \qquad \text{Equation 27}$$

In Equation 27 above, $TVFREQ_{1(m)only}$ represents average TV frequency for TV network only audience on TV network 'm', and $TVFREQ_{1(m)2}$ represents average TV frequency for duplicated audience between TV network 'm' and total internet. Accordingly, the initial TV impression measures for TV only audience and for duplicated audience are computed using Equations 28 and 29 below.

$$TVIMP_{1(m)only} = TVFREQ_{1(m)only} \cdot (UA_{1(m)} - UA_{1(m)2}) \quad \text{Equation 28}$$

$$TVIMP_{1(m)2} = TVFREQ_{1(m)2} \cdot UA_{1(m)2} \quad \text{Equation 29}$$

In Equations 28 and 29 above, $TVIMP_{1(m)only}$ represents a TV impression measure for TV network only audience on TV network 'm', and $TVIMP_{1(m)2}$ represents a TV impression measure for duplicated audience between TV network 'm' and total internet.

In Equations 30 and 31 below, $TVIMP_{1only}$ represents a TV impression measure for TV only audience, and $TVIMP_{12}$ represents a TV impression measure for duplicated audience between total TV and total internet. These TV impression measures may be calculated as follows.

$$TVIMP_{1only} = \sum_{d=1}^{24} TVIMP_{1only}^{(d)} = \sum_{d=1}^{24} FREQ_1^{(d)}(UA_1^{(d)} - UA_{12}^{(d)}) \quad \text{Equation 30}$$

$$TVIMP_{12} = \sum_{d=1}^{24} TVIMP_{12}^{(d)} = \sum_{d=1}^{24} FREQ_1^{(d)} UA_{12}^{(d)} \quad \text{Equation 31}$$

In some examples, the following conditions hold true for Equations 28, 29, 30, and 31.

Condition 1—$TVIMP_{1(m)2} + TVIMP_{1(m)only} = IMP_{1(m)}$ for all $1 \leq m \leq M$ Condition 2 - $\sum_{m=1}^{M} TVIMP_{1(m)only} = TVIMP_{1only}$ Condition 3 - $\sum_{m=1}^{M} TVIMP_{1(m)2} = TVIMP_{12}$ In some examples, Equations 28, 29, 30, and 31 meet condition 1 above, but do not always meet conditions 2 and 3 above. In such examples, adjustments may be used so that calculations performed using Equations 28, 29, 30, and 31 meet all three of the above conditions.

FIGS. 17A-17E depict a flow diagram of an example method that may be used to adjust TV frequency so that Equations 28, 29, 30, and 31 meet conditions 1-3 above. The example method of FIG. 17 may be implemented using a processor system (e.g., the processor platform 1000 described below in connection with FIG. 10). In the illustrated example of FIGS. 17A-17E, matrices are used to represent metrics. For example, an M×2 matrix IMP{M,2} represents a TV impression metric, an M×2 matrix UA{M,2} represents a TV unique audience, and an M×2 matrix FREQ{M,2} represents an average TV frequency metric. In all three matrices, a quantity of 'M' rows represent a quantity of 'M' TV networks, the first column represents impression or unique audience or frequency (e.g., impression/unique audience/frequency) for TV only audience and the second column represents impression or unique audience or frequency (e.g., impression/unique audience/frequency) for a duplicated audience. For example, an impressions matrix value (IMP(m, 1)) represents the TV impression measure for TV network only audience on TV network 'm' ($TVIMP_{1(m)only}$) of Equation 28 above, a TV unique audience matrix value (UA(m,1)) represents TV network only audience on TV network 'm' ($UA_{1(m)} - UA_{1(m)2}$) of Equation 28 above, and an average TV frequency matrix value (FREQ(m,2)) represents the average TV frequency for duplicated audience between TV network 'm' and total internet ($TVFREQ_{1(m)2}$) of Equations 27 and 29 above. In addition, an M+2 element array CONST{M+2} represents M+2 constraints $IMP_{1(1)}, \ldots, IMP_{1(M)}, TVIMP_{1only}, TVIMP_{12}$.

Figure 17A:
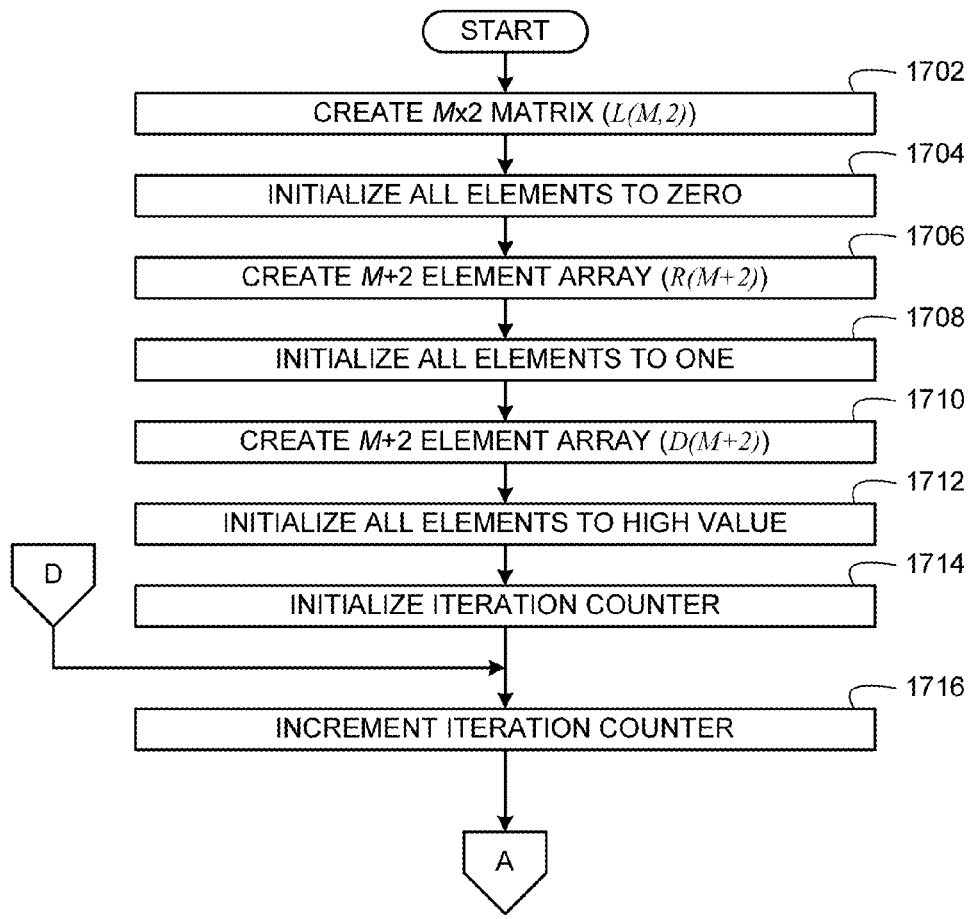
FIGS. 17A-17E depict a flow diagram of example machine readable instructions that may be executed to adjust television frequency.

Initially in FIG. 17A, the processor 1012 creates an M×2 matrix L(M,2) (block 1702). The processor 1012 initializes all the elements of the matrix L(M,2) to zero (block 1704). The processor 1012 creates an M+2 element array R(M+2) (block 1706). The processor 1012 initializes all the elements of the array R(M+2) to one (block 1708). The processor 1012 creates an M+2 element array D(M+2) (block 1710). The processor 1012 initializes all the elements of the array D(M+2) to a relatively high value (block 1712). For example, the processor 1012 may initialize the elements of the array D(M+2) to 9999. The processor 1012 initializes an iteration counter (ITER_CNT) to zero (block 1714). The processor 1012 increments the iteration counter (ITER_CNT) by one (block 1716). In the illustrated example, control advances to block 1718 of FIG. 17B.

Figure 17B:
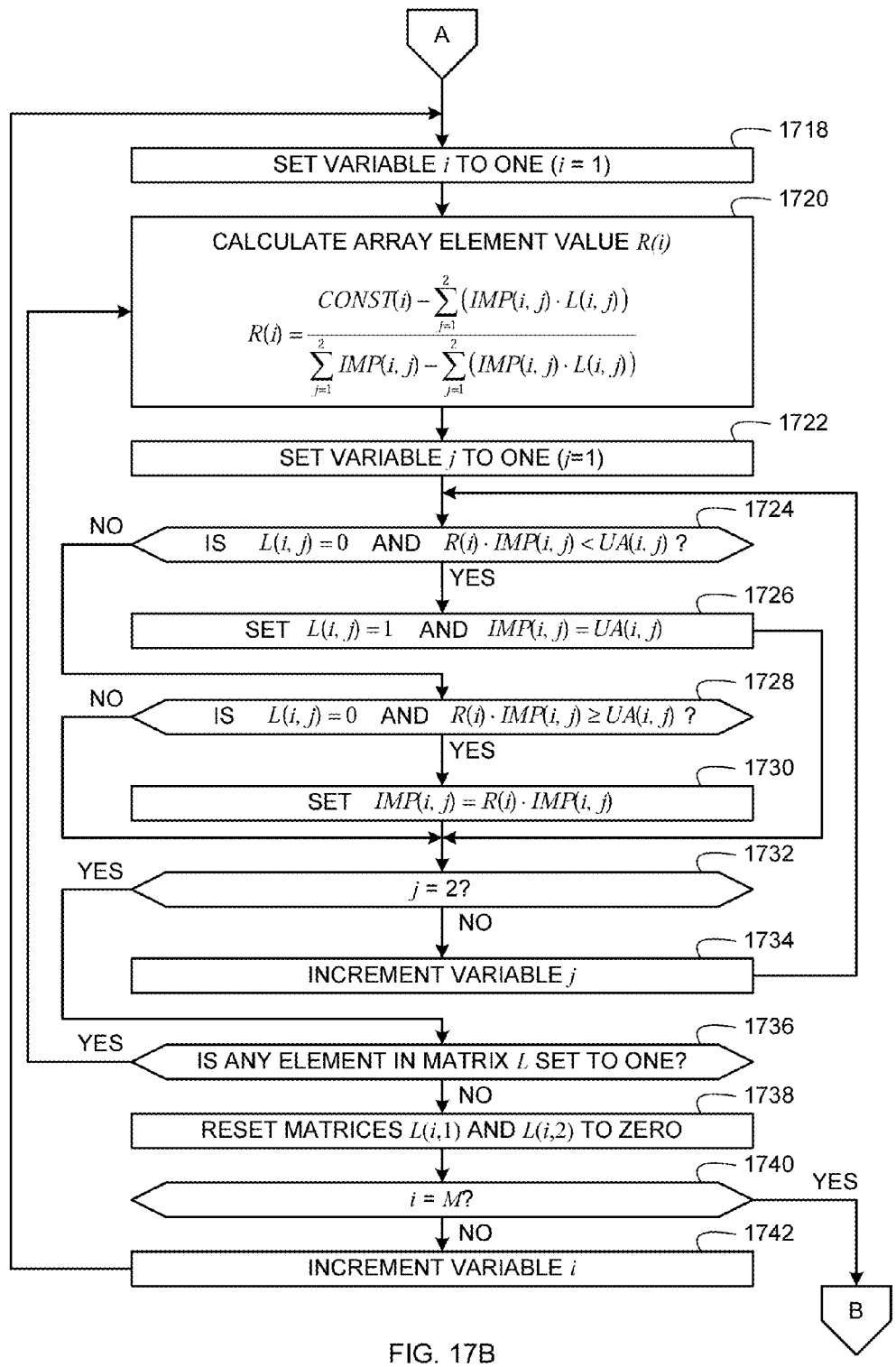

At FIG. 17B, the processor 1012 sets a variable i to one (i=1) (block 1718). The processor 1012 calculates an array element value R(i) using Equation 32 (block 1720).

$$R(i) = \frac{CONST(i) - \sum_{j=1}^{2}(IMP(i,j) \cdot L(i,j))}{\sum_{j=1}^{2} IMP(i,j) - \sum_{j=1}^{2}(IMP(i,j) \cdot L(i,j))} \quad \text{Equation 32}$$

The processor 1012 sets a variable j to one (j=1) (block 1722). If the matrix element value L(i,j) is equal to zero (L(i,j)=0), and if the dot product of the array element value R(i) and the impression matrix value IMP(i,j) is less than the unique audience matrix value UA(i,j) (i.e., R(i)·IMP(i,j)<UA(i,j)) (block 1724), the processor 1012 sets the matrix element value L(i,j) equal to one (L(i,j)=1) and sets the impression matrix value IMP(i,j) equal to the unique audience matrix value UA(i,j) (i.e., IMP(i,j)=UA(i,j)) (block 1726). Control then advances to block 1732. Otherwise, control advances to block 1728. At block 1728, if the processor 1012 determines that the matrix element value L(i,j) is equal to zero (L(i,j)=0), and that the dot product of the array element value R(i) and the impression matrix value IMP(i,j) is greater than or equal to the unique audience matrix value UA(i,j) (i.e., R(i)·IMP(i,j)≥UA(i,j)), the processor 1012 sets the impression matrix value IMP(i,j) equal to the dot product of the array element value R(i) and the impression matrix value IMP(i,j) (i.e., IMP(i,j)=R(i)·IMP(i,j)) (block 1730). Otherwise, control advances to block 1732.

If the processor 1012 determines that the variable j is not equal to two (block 1732), the processor 1012 increments the variable j (block 1734), and control returns to block 1724. If the processor 1012 determines that the variable j is equal to two (block 1732), the processor 1012 determines whether any element in the matrix L is set to one (block 1736). For example, if the processor 1012 set any matrix element value L(i,j) equal to one at block 1726, then the processor 1012 determines at block 1736 that at least one element in the matrix L is set to one. If any element in the matrix L is set to one (block 1736), control returns to block 1720. Otherwise, the processor 1012 resets the matrices L(i,1) and L(i,2) to zero (block 1738). The processor 1012 determines whether the variable i is equal to the 'M' quantity of TV networks (block 1740). If the variable i is not equal to the 'M' quantity of TV networks (block 1740), the processor 1012 increments the variable i (block 1742), and control returns to block 1718. Otherwise, if the variable i is equal to the quantity of 'M' TV networks (block 1740), control advances to block 1744 of FIG. 17C.

Figure 17C:
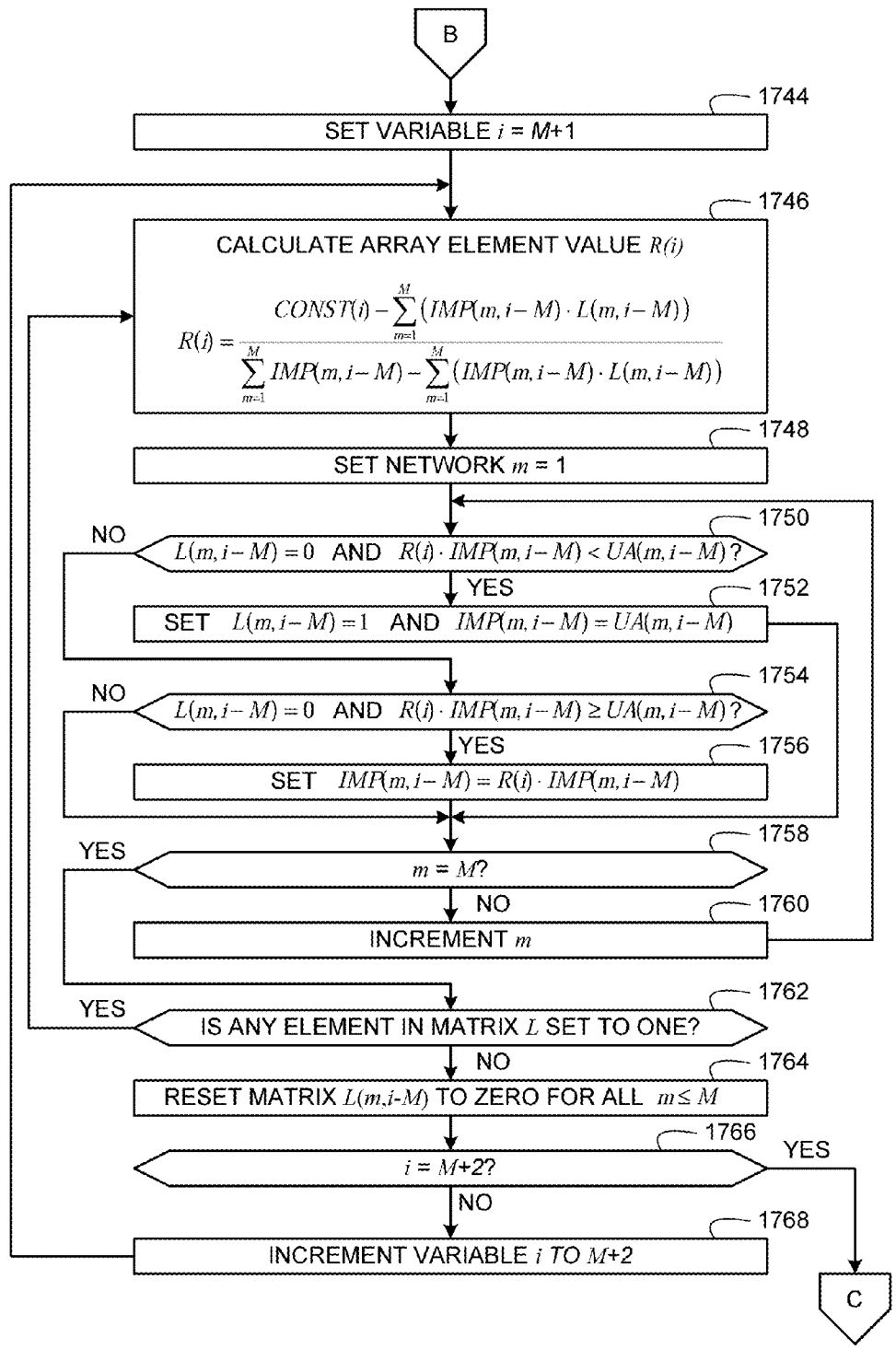

At block 1744 of FIG. 17C, the processor 1012 sets the variable i equal to M+1. The processor 1012 calculates an array element value R(i) using Equation 33 (block 1746).

$$R(i) = \frac{\text{CONST}(i) - \sum_{m=1}^{M}(\text{IMP}(m, i-M) \cdot L(m, i-M))}{\sum_{m=1}^{M} \text{IMP}(m, i-M) - \sum_{m=1}^{M}(\text{IMP}(m, i-M) \cdot L(m, i-M))} \quad \text{Equation 33}$$

The processor 1012 sets a network 'm' to one (m=1) (block 1748). If the matrix element value L(m,i−M) is equal to zero (L(m,i−M)=0), and if the dot product of the array element value R(i) and the impression matrix value IMP(m,i−M) is less than the unique audience matrix value UA(m,i−M) (i.e., R(i)·IMP(m,i−M)<UA(m,i−M)) (block 1750), the processor 1012 sets the matrix element value L(m,i−M) equal to one (L(m,i−M)=1) and sets the impression matrix value IMP(m, i−M) equal to the unique audience matrix value UA(m,i−M) (i.e., IMP(m,i−M)=UA(m,i−M)) (block 1752). Control then advances to block 1758. Otherwise, control advances to block 1754. At block 1754, if the processor 1012 determines that the matrix element value L(m,i−M) is equal to zero (L(m,i−M)=0), and that the dot product of the array element value R(i) and the impression matrix value IMP(m,i−M) is greater than or equal to the unique audience matrix value UA(m,i−M) (i.e., R(i)·IMP(m, i−M)≥UA(m,i−M)), the processor 1012 sets the impression matrix value IMP(m,i−M) equal to the dot product of the array element value R(i) and the impression matrix value IMP(m,i−M) (i.e., IMP(m,i−M)=R(i)·IMP(m,i−M)) (block 1756). Otherwise, control advances to block 1758.

If the processor 1012 determines that the network 'm' is not equal to the 'M' quantity of TV networks (block 1758), the processor 1012 increments the network 'm' (block 1760), and control returns to block 1750. If the processor 1012 determines that the network 'm' is equal to the 'M' quantity of TV networks (block 1758), the processor 1012 determines whether any element in the matrix L is set to one (block 1762). For example, if the processor 1012 set any matrix element value L(m,i−M) equal to one at block 1752, then the processor 1012 determines at block 1762 that at least one element in the matrix L is set to one. If any element in the matrix L is set to one (block 1762), control returns to block 1746. Otherwise, the processor 1012 resets the matrices L(m,i−M) to zero for all networks 'm' less than or equal to the 'M' quantity of TV networks (m≤M) (block 1764). The processor 1012 determines whether the variable i is equal to two plus the 'M' quantity of TV networks (i=M+2) (block 1766). If the variable i is not equal to two plus the 'M' quantity of TV networks (block 1766), the processor 1012 increments the variable i to two plus the 'M' quantity of TV networks (i=M+2) (block 1768), and control returns to block 1746. Otherwise, if the variable i is equal to two plus the 'M' quantity of TV networks (block 1766), control advances to block 1770 of FIG. 17D.

Figure 17D:
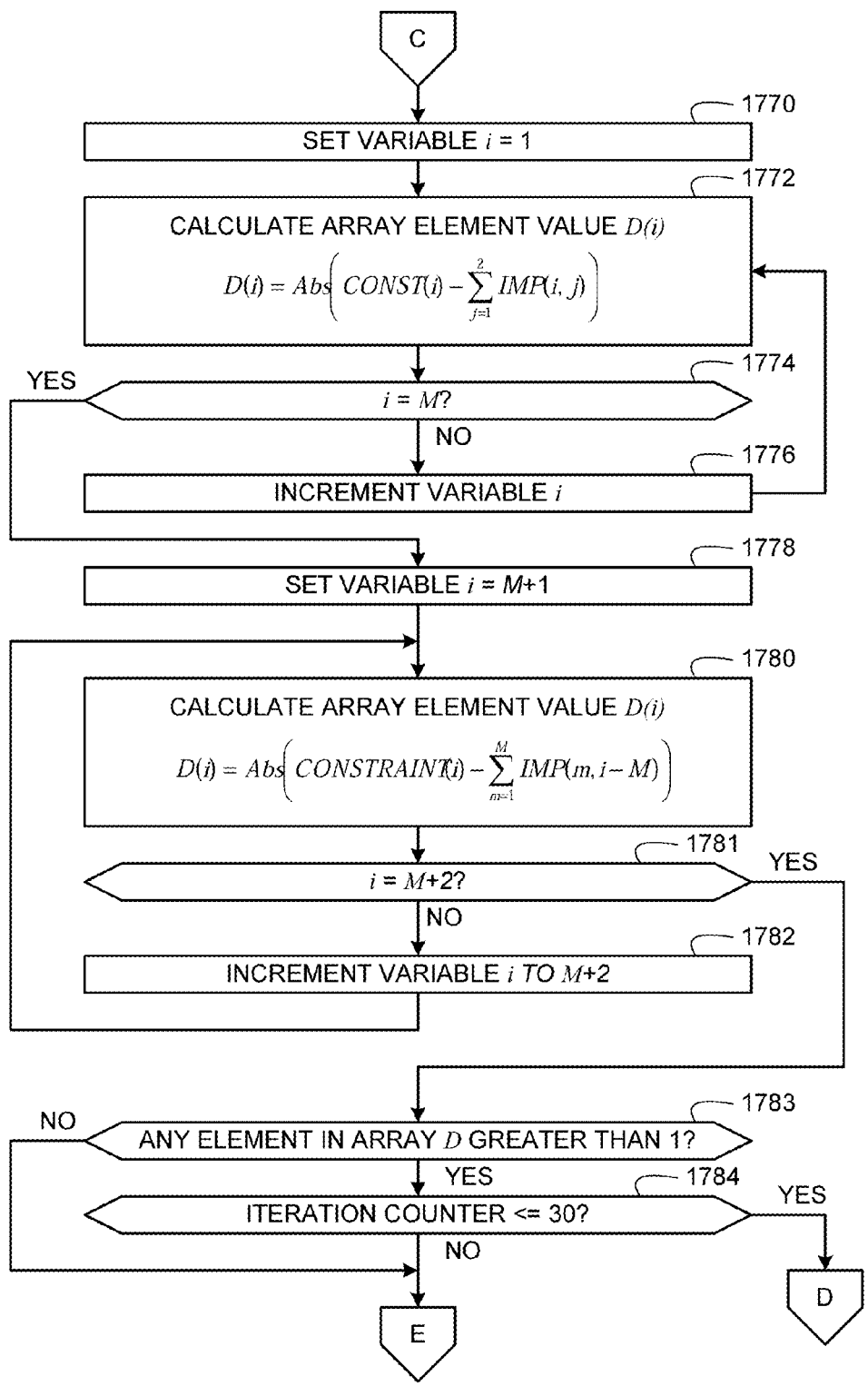

At block 1770 of FIG. 17D, the processor 1012 sets the variable i equal to one. The processor 1012 calculates an array element value D(i) using Equation 34 (block 1772).

$$D(i) = \text{Abs}\left(\text{CONST}(i) - \sum_{j=1}^{2} \text{IMP}(i, j)\right) \quad \text{Equation 34}$$

The processor 1012 then determines whether the variable i is equal to the 'M' quantity of TV networks (block 1774). If the variable i is not equal to the 'M' quantity of TV networks (block 1774), the processor 1012 increments the variable i (block 1776), and control returns to block 1772. Otherwise, if the variable i is equal to the 'M' quantity of TV networks (block 1774), the processor 1012 sets the variable equal to one plus the 'M' quantity of TV networks (i=M+1) (block 1778). The processor 1012 calculates an array element value D(i) using Equation 35 (block 1780).

$$D(i) = \text{Abs}\left(\text{CONSTRAINT}(i) - \sum_{m=1}^{M} \text{IMP}(m, i-M)\right) \quad \text{Equation 35}$$

The processor 1012 determines whether the variable i is equal to two plus the 'M' quantity of TV networks (i=M+2) (block 1781). If the variable i is not equal to two plus the 'M' quantity of TV networks (block 1781), the processor 1012 increments the variable i to two plus the 'M' quantity of TV networks (i=M+2) (block 1782), and control returns to block 1780. Otherwise, if the variable i is equal to two plus the 'M' quantity of TV networks (block 1781), control advances to block 1783.

The processor 1012 determines whether any element in the array D is greater than one (block 1783). If any element in the array D is not greater than one (block 1783), control advances to block 1786 of FIG. 17E. Otherwise, if any element in the array D is greater than one (block 1783), the processor 1012 determines whether the iteration counter (ITER_CNT) is less than or equal to 30 (block 1784). If the iteration counter (ITER_CNT) is less than or equal to 30 (block 1784), control returns to block 1716 of FIG. 17A. Otherwise, if the iteration counter (ITER_CNT) is not less than or equal to 30 (block 1784), control advances to block 1786 of FIG. 17E.

Figure 17E:
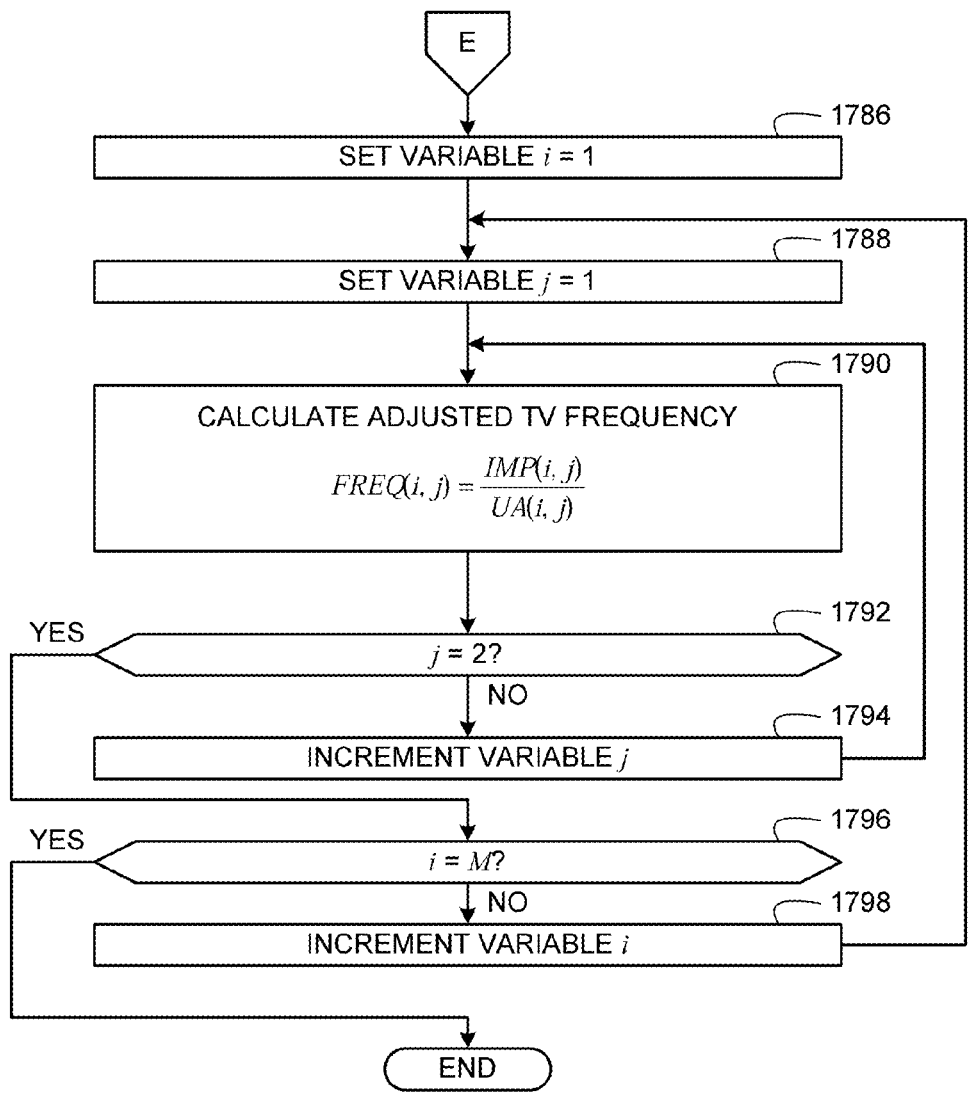

At block 1786 of FIG. 17E, the processor 1012 sets the variable i equal to one. The processor 1012 sets the variable j equal to one (block 1788). The processor 1012 calculates the adjusted TV frequency FREQ(i,j) using Equation 36 (block 1790).

$$FREQ(i, j) = \frac{IMP(i, j)}{UA(i, j)} \quad \text{Equation 36}$$

The processor 1012 determines whether the variable j is equal to two (block 1792). If the variable j is not equal to two (block 1792), the processor 1012 increments the variable j (block 1794), and control returns to block 1790. Otherwise, if the variable j is equal to two (block 1792), the processor 1012 determines whether the variable i is equal to the 'M' quantity of TV networks (block 1796). If the variable is not equal to the 'M' quantity of TV networks (block 1796), the processor 1012 increments the variable i (block 1798), and control returns to block 1788. Otherwise, if the variable i is equal to the 'M' quantity of TV networks (block 1796), the example method of FIG. 17E ends.

Sub-Section 3.3.3—Average Internet Frequency by TV Network

In the illustrated examples, the below process is used at the campaign level to compute average internet frequency by TV network. To determine average internet frequency, $NETIMP_{1(m)2(CPH)}$ is equal to the sum of weighted internet impressions for observed duplications between total internet and TV network 'm' in the CPH panel 110b; $UA_{1(m)2(CPH)}$ is the sum of weights of observed duplications between internet and TV network 'm' in the CPH panel 110b; $NETIMP_{12(CHP)}$ is the sum of weighted internet impressions for observed duplications between internet and TV in the CPH panel 110b; and $UA_{12(CPH)}$ is the sum of weights of observed duplications between internet and TV in the CPH panel 110b. The average internet frequency for the TV network 'm' is determined using Equation 37 below.

$$NETFREQ_{1(m)2} = \begin{cases} \frac{NETIMP_{1(m)2(CPH)}}{UA_{1(m)2(CPH)}} & UA_{1(m)2(CPH)} > 0 \\ \frac{NETIMP_{12(CPH)}}{UA_{12(CPH)}} & UA_{1(m)2(CPH)} = 0 \\ & UA_{12(CPH)} > 0 \\ NETFREQ_{12} & UA_{1(m)2(CPH)} = 0 \\ & UA_{12(CPH)} = 0 \end{cases} \quad \text{Equation 37}$$

The average internet frequency by TV network 'm' is determined as observed internet frequency for the CPH panelists 110b who are exposed to both internet and TV network 'm'. If there is no observed CPH duplicate between internet and TV network 'm', the observed internet frequency for CPH duplicate between internet and total TV is used. If there is no observed CPH duplicate between internet and total TV, the campaign level average online frequency for duplicated audience calculated in section 3.3.1 is used.

In the illustrated examples, $NETIMP_{12}$ is the internet impression for a duplicated audience. In the illustrated example, the following two conditions must be met.

Condition 1: The sum of internet impressions by each individual TV network should be greater than the total internet impressions for all of the duplicated audience (i.e., $$\text{(i.e., } \sum_{m=1}^{M} NETIMP_{1(m)2} \geq NETIMP_{12}).$$

Condition 2: The internet impressions for each individual TV network should be smaller than the total internet impressions for all of the duplicated audience (i.e., $NETIMP_{1(m)2} \leq NETIMP_{12}$) for all $1 \leq m \leq M$.

In Conditions 1 and 2 above, $NETIMP_{1(m)2} = NETFREQ_{1(m)2} \cdot UA_{1(m)2}$. In the illustrated examples, the nature of the above two conditions prevents them from being unmet (e.g., violated) at the same time. However, when either of the conditions is unmet, adjustments are used in some examples as disclosed below to improve or ensure consistency of the estimated frequency and impression values.

When condition 1 is not met, the average internet frequency is adjusted for all 'm' estimations using Equation 38 below.

$$NETFREQ_{1(m)2} = \qquad \text{Equation 38}$$

$$NETFREQ_{1(m)2} + \frac{NETIMP_{12} - \sum_{m=1}^{M} NETIMP_{1(m)2}}{\sum_{m=1}^{M} UA_{1(m)2}}$$

When Condition 2 is not met, the average internet frequency is adjusted only for those estimations that do not meet Condition 2 using Equation 39 below.

$$NETFREQ_{1(m)2} = \frac{NETIMP_{12}}{UA_{1(m)2}} \qquad \text{Equation 39}$$

Sub-Section 3.3.4—Average Frequency Filtered by Internet Publisher 3.3.4.1. Average Frequency by Demographic Group In the illustrated examples, the method disclosed in sub-section 3.3.1 is used to determine the average TV frequency by demographic group. In the illustrated examples, the filter on a particular internet publisher does not affect average TV frequency calculation. Therefore, the demographic level TV average frequency should be the same as what is computed in sub-section 3.3.1.

The average internet frequency by demographic group is computed similarly, except that the calculation is done only for the filtered publisher instead of total internet.

3.3.4.2. Average TV Frequency by TV Network

In the illustrated examples, the example method disclosed in sub-section 3.3.2 is used to determine the average TV frequency by TV network. In such examples, the calculation is performed by treating the filtered publisher as the internet media.

3.3.4.3. Average Internet Frequency by TV Network

In the illustrated examples, the following example process is used to determine average internet frequency by TV network. In the example process, $NETIMP_{1(m)2(n)(CPH)}$ is the sum of weighted internet impressions for observed duplications between publisher 'n' and TV network 'm' in the CPH panel 110b; $UA_{1(m)2(n)(CPH)}$ is the sum of weights of observed duplications between publisher 'n' and TV network 'm' in the CPH panel 110b; $NETIMP_{12(n)(CPH)}$ is the sum of weighted internet impressions for observed duplications between publisher 'n' and total TV in the CPH panel 110b; $UA_{12(n)(CPH)}$ is the sum of weights of observed duplications between publisher 'n' and total TV in the CPH panel 110b.

The average internet frequency for duplicates between publisher 'n' and TV network 'm' is determined using Equation 40 below.

$$NETFREQ_{1(m)2(n)} = \begin{cases} \dfrac{NETIMP_{1(m)2(n)(CPH)}}{UA_{1(m)2(n)(CPH)}} & UA_{1(m)2(n)(CPH)} > 0 \\[6pt] \dfrac{NETIMP_{12(n)(CPH)}}{UA_{12(n)(CPH)}} & \begin{array}{l} UA_{1(m)2(n)(CPH)} = 0 \\ UA_{12(n)(CPH)} > 0 \end{array} \\[10pt] \dfrac{NETIMP_{12(CPH)}}{UA_{12(CPH)}} & \begin{array}{l} UA_{1(m)2(n)(CPH)} = 0 \\ UA_{12(n)(CPH)} = 0 \\ UA_{12(CPH)} > 0 \end{array} \\[14pt] NETFREQ_{12(n)} & \begin{array}{l} UA_{1(m)2(n)(CPH)} = 0 \\ UA_{12(n)(CPH)} = 0 \\ UA_{12(CPH)} = 0 \end{array} \end{cases} \quad \text{Equation 40}$$

In the illustrated example, the average internet frequency by TV network 'm' is determined as observed internet frequency for the CPH panelists 110b (FIG. 1) who are exposed to both publisher 'n' and TV network 'm'. If there is no observed CPH duplicate between publisher 'n' and TV network 'm', but there is observed CPH duplicate between publisher 'n' and total TV, the observed internet frequency for duplicated CPH panelists between publisher 'n' and total TV is used in the illustrated example. If there is no observed CPH duplicate between publisher 'n' and total TV, the observed internet frequency for duplicated CPH panelists between total internet and total TV is used. If there is no observed CPH duplicate between total internet and total TV, the campaign level average online frequency for duplicated audience between publisher 'n' and total TV calculated in section 3.3.4.1 is used in the illustrated example.

In the illustrated example, $NETIMP_{12(n)}$ is the internet impressions for duplicated audience between publisher 'n' and total TV. In the illustrated example, the following two conditions must be met.

Condition 1: The sum of internet impression by each individual TV network for publisher 'n' should be greater than the internet impression for duplicated audience between publisher 'n' and total TV (i.e., $$\text{i.e., } \sum_{m=1}^{M} NETIMP_{1(m)2(n)} \geq NETIMP_{12(n)}).$$

Condition 2: The internet impression by each individual TV network for publisher 'n' should be smaller than the internet impression for duplicated audience between publisher 'n' and total TV (i.e., $NETIMP_{1(m)2(n)} \leq NETIMP_{12(n)}$ for all $1 \leq m \leq M$ and $1 \leq n \leq N$).

In the illustrated example, $NETIMP_{1(m)2(n)} = NETFREQ_{1(m)2(n)} \cdot UA_{1(m)2(n)}$. The nature of the above two conditions prevents them from being unmet (e.g., violated) at the same time. However, when either of them is unmet, adjustments as disclosed below are made to improve or ensure the consistency of estimated frequency and impression values.

When Condition 1 is not met, the average internet frequency is adjusted for all 'm' estimations using Equation 41 below.

$$NETFREQ_{1(m)2(n)} = NETFREQ_{1(m)2(n)} + \dfrac{NETIMP_{12(n)} - \sum_{m=1}^{M} NETIMP_{1(m)2(n)}}{\sum_{m=1}^{M} UA_{1(m)2(n)}} \quad \text{Equation 41}$$

When Condition 2 is not met, the average internet frequency is adjusted using Equation 42 below only for those estimations that do not meet Condition 2.

$$NETFREQ_{1(m)2(n)} = \dfrac{NETIMP_{12(n)}}{UA_{1(m)2(n)}} \quad \text{Equation 42}$$

Sub-Section 3.3.5—Order of Average Frequency Calculation

Figure 13:
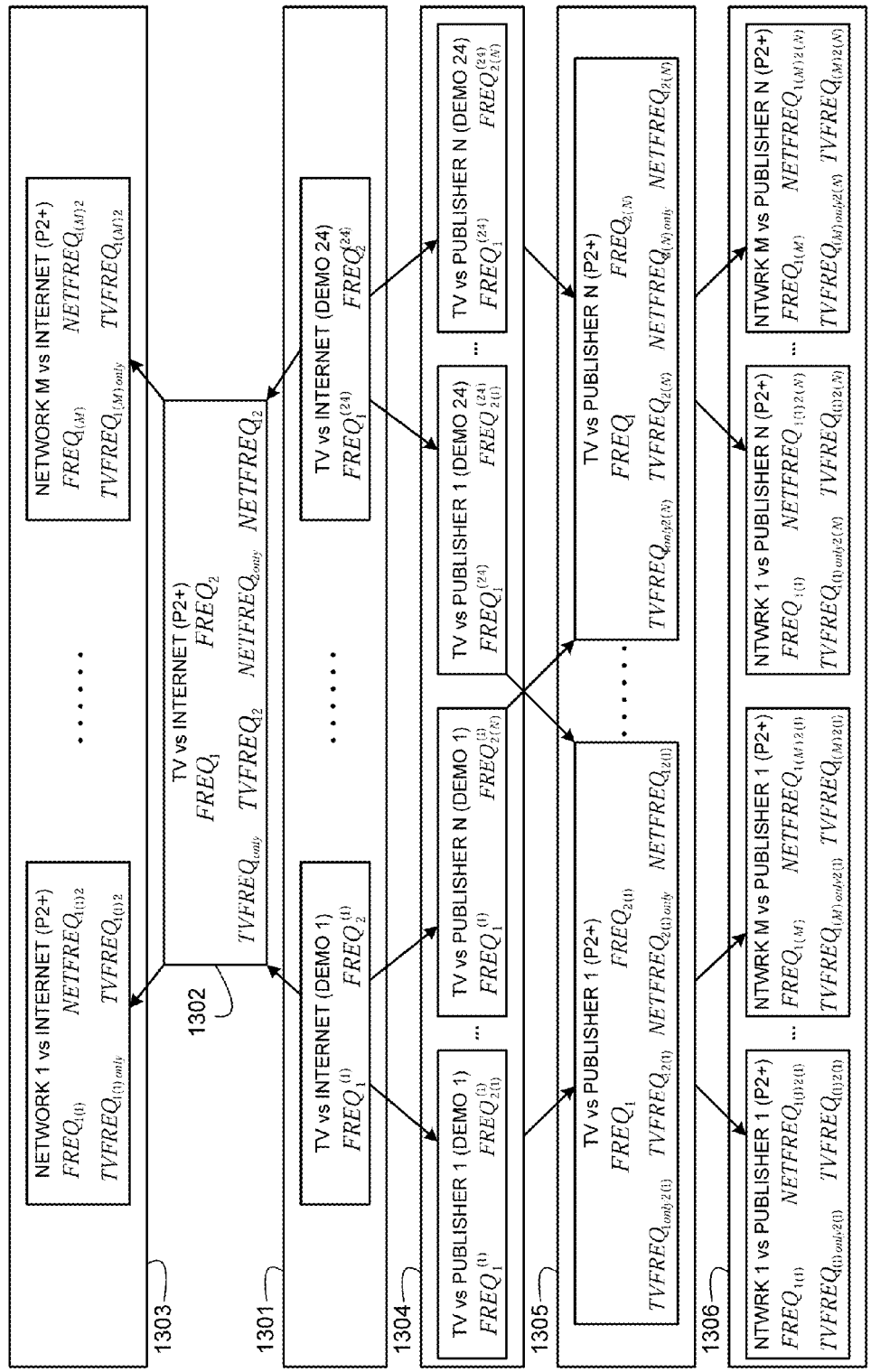
FIG. 13 is a flow diagram representative of example machine readable instructions that may be executed to determine average impression frequencies.

FIG. 13 is a flow diagram of an example method that may be used to determine average impression frequencies. The example method of FIG. 13 may be implemented using a processor system (e.g., the processor platform 1000 described below in connection with FIG. 10). In the illustrated examples, to calculate average impression frequency, the duplicated reach is calculated first. Once the duplicated reach is determined, an average impression frequency is calculated following a similar order as used for duplicated audience reach. For example, the following operations may be used to determine average impression frequencies.

Initially, the processor 1012 determines the average TV impression frequency ($FREQ_1^{(d)}$) for a total TV audience and average internet impression frequency ($FREQ_2^{(d)}$) for a total internet audience at the demographic level for different demographic groups (d) (block 1301). For example, the processor 1012 can calculate the average TV impression frequency ($FREQ_1^{(d)}$) and average internet impression frequency ($FREQ_2^{(d)}$) using the example method disclosed in sub-section 3.3.1. In the illustrated example, there are 24 different demographic groups (d) numbered d=1 (DEMO 1) through d=24 (DEMO 24). In the illustrated example, the subscript 1 represents a TV metric (e.g., $FREQ_1^{(d)}$ represents the average TV impression frequency for a demographic group (d)), and the subscript 2 represents an online metric (e.g., $FREQ_2^{(d)}$ represents the average internet impression frequency for a demographic group (d)).

The processor 1012 determines the average TV impression frequency and the average internet impression frequency at the campaign level for a total TV audience ($FREQ_1$), a total internet audience ($FREQ_2$), a duplicated audience (TVFREQ$_{12}$, NETFREQ$_{12}$), a TV-only audience (TVFREQ$_{1only}$), and an internet-only audience (NETFREQ$_{2only}$) (block 1302) using, for example, the example method disclosed in sub-section 3.3.1. For example, the processor 1012 may use the average TV impression frequency ($FREQ_1^{(d)}$) of block 1301 to determine the TV impression frequency for the total TV audience ($FREQ_1$) using Equation 23 above, to determine the TV impression frequency for the duplicated audience (TVFREQ$_{12}$) using Equation 24 above, and the TV impression frequency for the TV-only audience (TVFREQ$_{1only}$) using Equation 25 above. In the illustrated example, the processor 1012 may also use the average internet impression frequency ($FREQ_2^{(d)}$) of block 1301 to determine the internet impression frequency for the total internet audience ($FREQ_2$) using Equation 23 above, to determine the internet impression frequency for the duplicated audience (NETFREQ$_{12}$) using Equation 24 above, and the internet impression frequency for the internet-only audience (NETFREQ$_{2only}$) using Equation 25 above. In the illustrated example, a total TV audience metric (FREQ$_1$) refers to the metric for people who have been exposed to TV media of a media campaign (e.g., a media campaign having both a TV media campaign portion and an internet/online media campaign portion), and is the sum of (1) a TV-only audience that is exposed to the TV media campaign but not the online/internet media campaign, and (2) a duplicated audience that is exposed to both the TV media campaign and the online/internet media campaign. In the illustrated example, a total internet audience metric (FREQ$_2$) refers to the metric for people who have been exposed to online/internet media of a media campaign (e.g., a media campaign having both a TV media campaign portion and an internet/online media campaign portion), and is the sum of (1) an internet-only audience that is exposed to the online/internet media campaign but not the TV media campaign, and (2) a duplicated audience that is exposed to both the TV media campaign and the online/internet media campaign. In the illustrated example, the subscript 12 represents a duplicated audience metric (e.g., TVFREQ$_{12}$ represents a TV impression frequency for a duplicated audience, and NETFREQ$_{12}$ represents an online impression frequency for a duplicated audience). In the illustrated example, the subscript '1only' represents a TV-only audience metric (e.g., TVFREQ$_{1only}$ represents a TV impression frequency for a TV-only audience). In the illustrated example, the subscript '2only' represents an online-only audience metric (e.g., NETFREQ$_{2only}$ represents an online impression frequency for an online-only audience).

The processor 1012 determines the average TV impression frequency by individual TV network 'm' at the campaign level for a total TV audience, TV-only audience, and duplicated audience (FREQ$_{1(m)}$, TVFREQ$_{1(m)only}$, TVFREQ$_{1(m)2}$) (block 1303) using, for example, the example method disclosed in sub-section 3.3.2. At block 1303, the processor 1012 also determines the average internet impression frequency by individual TV network 'm' at the campaign level (NETFREQ$_{1(m)2}$) using, for example, the example method disclosed in sub-section 3.3.3.

The processor 1012 determines the average TV impression frequency (FREQ$_1^{(d)}$) and the average internet impression frequency (FREQ$_{2(n)}^{(d)}$) at the demographic level filtered by individual internet publisher (block 1304) using, for example, the example method disclosed in sub-section 3.3.4.1. In the illustrated example, the TV impression frequency (FREQ$_1^{(d)}$) is the same as in block 1301.

The processor 1012 determines the average TV impression frequency and the average internet impression frequency at the campaign level filtered by individual internet publisher for total TV audience (FREQ$_1$), total internet audience (FREQ$_{2(n)}$), a duplicate audience (TVFREQ$_{12(n)}$ and NETFREQ$_{12(n)}$), a TV-only audience (TVFREQ$_{1only2(n)}$), and for an internet-only audience (NETFREQ$_{2(n)only}$) (block 1305) using, for example, the example method disclosed in sub-section 3.3.4.1. In the illustrated example, the TV frequency is the same as in block 1302.

The processor 1012 determines the average TV impression frequency by TV network at the campaign level filtered by individual internet publisher for a total TV audience, a TV-only audience, and a duplicated audience (FREQ$_{1(m)}$, TVFREQ$_{1(m)only2(n)}$, TVFREQ$_{1(m)2(n)}$) (block 1306) using, for example, the example method disclosed in sub-section 3.3.4.2. In the illustrated example, the total TV audience impression frequency (FREQ$_{1(m)}$) is the same as determined at block 1304. At block 1306 of the illustrated example, the processor 1012 also determines the average internet impression frequency by TV network at the campaign level filtered by individual internet publisher (NETFREQ$_{1(m)2(n)}$) using, for example, the example method disclosed in sub-section 3.3.4.3.

In some examples, to minimize or decrease rounding error, calculations performed in the flow diagram of FIG. 13 may be conducted using decimal values without rounding in intermediate calculations. In such examples, duplicated audience values can be rounded to a suitable format when reporting a final value for displaying via a user interface. For example, unique audience and impressions can be rounded to nearest integers.

Section 4—Uncertainty and Confidence Limits

As discussed above, Equation 1, as used to determine audience duplication, has three inputs: TV reach, Internet/online reach, and correlation of exposures between the two media types (TV and Internet). To have a complete picture of the uncertainty of estimated duplication, the uncertainty of each component (TV reach, Internet/online reach, and correlation) would need to be determined. However, since the TV reach and Internet/online reach come from existing systems (the TV audience panel 110a and the OCR database 204 (based on the online audience panel 110c)), their uncertainties are not controlled by the example XCR duplication techniques disclosed herein. Therefore, this section only considers the uncertainty contributed by the correlation, which is measured using variance or standard deviation. The approach described in this section treats TV reach ($p_{1(TV)}$) and Internet/online reach ($p_{2(Online)}$) as constant with no variance.

Sub-Section 4.1—Uncertainty of Duplicated Reach at Demographic Level

This sub-section discloses example processes that may be used to compute the variance and standard deviation for duplicated reach at the demographic level. In the illustrated examples, for ease of illustration, the superscript "(d)" (which represents the demographic group 'd') is ignored in all notations in this sub-section.

Initially, the below parameters are determined from the CPH panel 110b for a specific demographic group.

a=sum of weights of unique audience who are exposed to neither internet nor TV ad b=sum of weights of unique audience who are exposed to internet ad but not TV ad c=sum of weights of unique audience who are exposed to TV ad but not internet ad d=sum of weights of unique audience who are exposed to both internet and TV ad In the below equations, $\alpha$, $\beta$, $\gamma$, and $\delta$ represent the above metrics a, b, c, and d, respectively, in percentage terms (e.g., $$\left(e.g., \alpha = \frac{a}{a+b+c+d}, \beta = \frac{b}{a+b+c+d}, \gamma = \frac{c}{a+b+c+d}, \delta = \frac{d}{a+b+c+d}\right).$$

In the illustrated example, Equation 43 below is used to determine the variance of duplicated reach.

$$Var[p_{12}] = \begin{cases} FV_1\left(\dfrac{UE_{TV\_AnyInternet}}{UE_{US}}\right)^2 & p_{1(CPH)} \leq p_{1(TV)} \\ & p_{2(CPH)} \leq p_{2(Online)} \\ FV_2\left(\dfrac{UE_{TV\_AnyInternet}}{UE_{US}}\right)^2 & p_{1(CPH)} \leq p_{1(TV)} \\ & p_{2(CPH)} > p_{2(Online)} \\ FV_3\left(\dfrac{UE_{TV\_AnyInternet}}{UE_{US}}\right)^2 & p_{1(CPH)} > p_{1(TV)} \\ & p_{2(CPH)} \leq p_{2(Online)} \\ FV_4\left(\dfrac{UE_{TV\_AnyInternet}}{UE_{US}}\right)^2 & p_{1(CPH)} > p_{1(TV)} \\ & p_{2(CPH)} > p_{2(Online)} \end{cases}$$ Equation 43 where, $FV_1$ $= V_1 + V_{p1}V_{p2} + V_{p1}V_1 + V_{p2}V_1 + V_{p1}V_{p2}V_1 + 2V_{p1}V_{p2}w_1 - 2V_{p1}p_{2(Online)}V_1 - 2p_{1(TV)}V_{p2}V_1$ $+ V_{p1}V_{p2}w_1^2 + V_{p1}p_{2(Online)}^2 V_1 + p_{1(TV)}^2 V_{p2} V_1 - 2V_{p1}p_{2(Online)}w_1 - 2p_{1(TV)}V_{p2}w_1 + 4p_{1(TV)}p_{2(Online)}V_1$ $- 2V_{p1}p_{2(Online)}w_1^2 - 2p_{1(TV)}V_{p2}w_1^2 + 2V_{p1}p_{2(Online)}^2 w_1 + 2p_{1(TV)}^2 V_{p2}w_1 - 2p_{1(TV)}p_{2(Online)}V_1 - 2p_{1(TV)}p_{2(Online)}^2 V_1$ $+ V_{p1}p_{2(Online)}^2 + p_{1(TV)}^2 V_{p2} + V_{p1}w_1^2 + V_{p2}w_1^2 + p_{1(TV)}^2 V_1 + p_{2(Online)}^2 V_1 - 2p_{1(TV)}V_1 2p_{2(Online)}V_1$ $+ p_{1(TV)}^2 V_{p2}w_1^2 + V_{p1}p_{2(Online)}^2 w_1^2 + p_{1(TV)}^2 p_{2(Online)}^2 V_1$ $FV_2$ $= V_{p1}V_{p2} + V_{p2}V_2 + V_{p1}V_{p2}V_2 - 2V_{p1}V_{p2}w_2 - 2p_{1(TV)}V_{p2}V_2 + 2p_{1(TV)}V_{p2}w_2$ $+ V_{p1}V_{p2}w_2^2 + V_{p1}p_{2(Online)}^2 V_2 + p_{1(TV)}^2 V_{p2}V_2$ $- 2p_{1(TV)}V_{p2}w_2^2 - 2p_{1(TV)}p_{2(Online)}^2 V_2 - 2V_{p1}p_{(Online)}w_2 - 2p_{1(TV)}^2 V_{p2}w_2$ $+ V_{p1}p_{2(Online)}^2 + p_{1(TV)}^2 V_{p2} + V_{p2}w_2^2 + p_{2(Online)}^2 V_2 + V_{p1}p_{2(Online)}^2 w_2^2 + p_{1(TV)}^2 V_{p2}w_2^2 + p_{1(TV)}^2 p_{2(Online)}^2 V_2$ $FV_3$ $= V_{p1}V_{p2} + V_{p1}V_3 + V_{p1}V_{p2}V_3 - 2V_{p1}V_{p2}w_3 - 2V_{p1}p_{2(Online)}V_3 + 2V_{p1}p_{2(online)}w_3$ $+ V_{p1}V_{p2}w_3^2 + V_{p1}p_{2(Online)}^2 V_3 + p_{1(TV)}^2 V_{p2}V_3$ $- 2V_{p1}p_{2(Online)}w_3^2 - 2p_{1(TV)}p_{2(Online)}V_3 - 2V_{p1}p_{2(Online)}^2 w_3 - 2p_{1(TV)}V_{p2}w_3$ $+ V_{p1}p_{2(Online)}^2 + p_{1(TV)}^2 V_{p2} + V_{p1}w_3^2 + p_{1(TV)}^2 V_3 + V_{p1}p_{2(Online)}^2 w_3^2 + p_{1(TV)}^2 V_{p2}w_3^2 + p_{1(TV)}^2 p_{2(Online)}^2 V_3$ $FV_4$ $= V_{p1}V_{p2}V_4 + V_{p1}V_{p2}w_4^2 + V_{p1}p_{2(Online)}^2 V_4 + p_{1(TV)}^2 V_{p2}V_4 + V_{p1}p_{2(Online)}^2 w_4^2 + p_{1(TV)}^2 V_{p2}w_4^2 + p_{1(TV)}^2 p_{2(Online)}^2 V_4$ In the above equations, $V_{p1}=Var[p_{1(TV)}]$ is calculated in terms of TV panelists (e.g., stored in the television panel database 112 of FIG. 1), and $V_{p2}=Var[p_{2(Online)}]$ is calculated in terms of online campaigns ratings (e.g., stored in the OCR database 204 of FIG. 2). In addition, the following definitions are used for the above equations in the illustrated example.

$$V_1 = \frac{\alpha\gamma + \alpha\delta + \gamma\delta + \delta^2}{N(\alpha^3 + 3\alpha^2\gamma + 3\alpha\gamma^2 + \gamma^3)} +$$

$$\frac{1}{N(\alpha+\gamma)^3}\left\{\frac{1}{(\alpha+\beta)}(-2\alpha^2\gamma - 2\alpha^2\delta + 2\alpha\gamma^2 + 6\alpha\gamma\delta + 4\alpha\delta^2 - 2\alpha\delta + 2\gamma^2\delta + 4\gamma\delta^2 - 2\gamma\delta + 2\delta^3 - 2\delta^2) + \right.$$

$$\frac{1}{(\alpha+\beta)^2}(\alpha^3\gamma + \alpha^3\delta - 3\alpha^2\gamma^2 - 9\alpha^2\gamma\delta - 6\alpha^2\delta^2 + 2\alpha^2\delta + \alpha\gamma^3 + 5\alpha\gamma^2\delta + 10\alpha\gamma\delta^2 - 4\alpha\gamma\delta + 6\alpha\delta^3 - 7\alpha\delta^2 + \alpha\delta +$$

$$\gamma^3\delta + 4\gamma^2\delta^2 - 2\gamma^2\delta + 4\gamma\delta^3 - 5\gamma\delta^2 + \gamma\delta + \delta^4 - 2\delta^3 + \delta^2) -$$

$$\frac{1}{(\alpha+\beta)^3}(\delta + \alpha\gamma + \alpha\delta - \gamma\delta - \delta^2)$$

$$\left. (-\alpha^2\gamma - \alpha^2\delta + \alpha\gamma^2 + 4\alpha\gamma\delta + 3\alpha\delta^2 - 3\alpha\delta + \gamma^2\delta + \gamma\delta^2 - \gamma\delta)\right]$$

$$V_2 = \frac{1}{N(\alpha+\beta)^3(\beta+\delta)^3}\{\beta^4(\gamma+\delta) + \beta^3(\gamma^2 + 5\gamma\delta + 4\delta^2 - 2\delta) +$$

$$\beta^2(3\gamma^2\delta + 9\gamma\delta^2 - 4\gamma\delta + 6\delta^3 - 7\delta^2 + \delta) +$$

$$\beta(3\gamma^2\delta^2 + 7\gamma\delta^3 - 6\gamma\delta^2 + 4\delta^4 - 7\delta^3 + 3\delta^2) +$$

$$\alpha[\beta^3(\gamma+\delta) + \beta^2(3\gamma\delta - 2\delta + 3\delta^2) + \beta(\delta + 3\gamma\delta^2 - 3\delta^2 + 3\delta^3) +$$

$$\gamma\delta^3 - \delta^3 + \delta^4] - 2\gamma\delta^3 + 2\gamma\delta^4 + \delta^3 - 2\delta^4 + \delta^5 + \gamma^2\delta^3\}$$

$$V_3 = \frac{1}{N(\alpha+\gamma)^3(\gamma+\delta)^3}\{\gamma^4(\beta+\delta) + \gamma^3(\beta^2 + 5\beta\delta + 4\delta^2 - 2\delta) +$$

$$\gamma^2(3\beta^2\delta + 9\beta\delta^2 - 4\beta\delta + 6\delta^3 - 7\delta^2 + \delta) +$$

$$\gamma(3\beta^2\delta^2 + 7\beta\delta^3 - 6\beta\delta^2 + 4\delta^4 - 7\delta^3 + 3\delta^2) +$$

$$\alpha[\gamma^3(\beta+\delta) + \gamma^2(3\beta\delta - 2\delta + 3\delta^2) + \gamma(\delta + 3\beta\delta^2 - 3\delta^2 + 3\delta^3) +$$

$$\beta\delta^3 - \delta^3 + \delta^4] - 2\beta\delta^3 + 2\beta\delta^4 + \delta^3 - 2\delta^4 + \delta^5 + \beta^2\delta^3\}$$

$$V_4 = \frac{1}{N(\beta+\delta)^4(\gamma+\delta)^4}\left[\delta^2(\gamma+\delta)^2\beta(1-\beta) + \delta^2(\beta+\delta)^2\gamma(1-\gamma) + (\beta\gamma-\delta^2)^2\delta(1-\delta) - 2\delta^2(\gamma+\delta)(\beta+\delta)\beta\gamma + 2\delta(\gamma+\delta)(\beta\gamma-\delta^2)\beta\delta + 2\delta(\beta+\delta)(\beta\gamma-\delta^2)\gamma\delta\right]$$

$$w_1 = \frac{\delta - (\beta+\delta)(\gamma+\delta)}{(\alpha+\beta)(\alpha+\gamma)}$$

$$w_2 = \frac{\delta - (\beta+\delta)(\gamma+\delta)}{(\alpha+\beta)(\beta+\delta)}$$

$$w_3 = \frac{\delta - (\beta+\delta)(\gamma+\delta)}{(\alpha+\gamma)(\gamma+\delta)}$$

$$w_4 = \frac{\delta}{(\beta+\delta)(\gamma+\delta)}$$

In the above definitions, 'N' is the raw count of the members of the CPH panel 110b for the subject demographic group.

In the illustrated example, the standard deviation of duplicated reach is determined using Equation 44 below.

$\sigma_{p12} = \sqrt{Var(p_{12})}$      Equation 44

Sub-Section 4.2—Uncertainty of Duplicated Reach at Campaign Level

In the illustrated examples, the campaign level variance for duplicated reach is determined using Equation 45 below.

$$Var(p_{12}) = Var\left(\frac{1}{UE_{US}}\sum_{d=1}^{24} UE_{US}^{(d)} p_{12}^{(d)}\right) = \frac{1}{UE_{US}^2}\sum_{d=1}^{24} \left(UE_{US}^{(d)}\right)^2 Var\left(p_{12}^{(d)}\right), \quad \text{Equation 45}$$

In Equation 45 above, $p_{12}^{(d)}$ represents the duplicated reach for the demographic group 'd', $Var(p_{12}^{(d)})$ represents the variance of the duplicated reach for the demographic group 'd' computed in sub-section 4.1, $UE_{US}^{(d)}$ represents the population universe for the demographic group 'd' in the US, and $UE_{US}$ represents the total population in the US.

In the illustrated example, the standard deviation of the campaign-level duplicated reach is determined using Equation 46 below.

$$\sigma_{p12} = \sqrt{Var(p_{12})} = \frac{1}{UE_{US}}\sqrt{\sum_{d=1}^{24} \left(UE_{US}^{(d)}\right)^2 Var\left(p_{12}^{(d)}\right)} \quad \text{Equation 46}$$

Sub-Section 4.3—Uncertainty of Correlation

In some examples, an uncertainty of the correlation may be determined. In such examples, the correlation is initially computed from the CPH audience panel 110b, then adjusted to accommodate the reach difference between the CPH audience panel 110b and the TV audience panel 110a, and to accommodate the reach difference between the CPH audience panel 110b and the OCR database 204. The following operations (1)-(4) are used to perform the offline bootstrapping, which in turn calculates a standard deviation of the correlation.

(1) Create tables using the below pseudo code:
For a=0 to 1000 do
  For b=0 to 1000−a do
    For c=0 to 1000−a−b do
      d=1000−a−b−c
      Create a table with two binary variables X and Y. In this table, there are a records where (X,Y)=(0,0), b records where (X,Y)=(0,1), c records where (X,Y)=(1,0), and d records where (X,Y)=(1,1). Hence the total number of records is 1000. The order of these records does not matter.
    End
  End
End In the above pseudo code, assume there are totally Z permutations of a, b, c, and d. Therefore, Z tables are created.

(2) For each of the Z tables created using the above pseudo code, calculate the metrics $(p_X)$, $(p_Y)$, and $(\rho_{XY})$ using Equations 47-49 below.

$$p_X = \frac{c+d}{1000} \quad \text{Equation 47}$$

$$p_Y = \frac{b+d}{1000} \quad \text{Equation 48}$$

$$\rho_{XY} = \frac{ad - bc}{\sqrt{(a+b)(c+d)(a+c)(b+d)}} \quad \text{Equation 49}$$

(3) For each of the Z tables created at operation (1), make 1000 re-sampling tables, each of which has 1000 records. To make a re-sampling table, randomly select 1000 records out of the original table with replacement. A correlation is then computed between X and Y for each of the 1000 re-sampling tables. After that, the standard deviation $\sigma_{XY}$ of these 1000 correlations is computed. Based on this approach, the standard deviation of correlation for all Z tables created at operation (1) can be determined.

(4) A table with Z records is constructed based on the elements $p_X$, $p_Y$, $\rho_{XY}$ determined at operation (2) above and the standard deviation $\sigma_{XY}$ determined at operation (3) above. This is used as the offline standard deviation look up table ('Table SD').

In some examples, assume for one particular campaign that TV reach $(p_{1(CPH)})$, Internet/online reach $(p_{2(CPH)})$, and correlation $(\rho_{(CPH)})$ are determined from the CPH audience panel 110b. In addition, assume the number of CPH unified panelists is 'N'. To estimate the standard deviation of $(\rho_{(CPH)})$, the Table SD is searched for a record where:

$p_X$=round($p_{1(CPH)}$,0.001), $p_Y$=round($p_{2(CPH)}$,0.001), and $\rho_{XY} \approx \rho_{(CPH)}$.

In such examples, the standard deviation of the initial correlation $(\rho_{(CPH)})$ for the specific campaign is shown in Equation 50 below.

$$\sigma_{(CPH)} = \sigma_{XY}\sqrt{\frac{1000}{N}} \quad \text{Equation 50}$$

Also in such examples, $p_{1(CPH)}$ and $p_{2(CPH)}$ are assumed to be constant, and the standard deviation of the TV_AnyInternet universe based correlation $(\rho_{(TV\_AnyInternet)})$ for the specific campaign is shown in Equation 51 below.

$$\sigma_{(TV\_AnyInternet)} = \sigma_{(CPH)}\sqrt{\frac{[1-p_{1(CPH)}][1-p_{2(CPH)}]p_{1(TV)}p_{2(Online)}}{p_{1(CPH)}p_{2(CPH)}[1-p_{1(TV)}][1-p_{2(Online)}]}} \quad \text{Equation 51}$$

Sub-Section 4.4—Minimum Campaign Size for TV and Online

As discussed in earlier sections, the audience duplication is estimated using Danaher's formula shown in Equation 1 above. Equation 1 requires three inputs: TV reach, Internet/online reach, and correlation. Therefore, the reliability of the estimate depends on the reliabilities of these three inputs, which in turn are determined by three systems. The reliability of the TV reach is determined based on the TV audience panel 110a, the OCR database 204 specifies the reliability of the Internet/online reach, and the de-duplication methodology determines the accuracy of the correlation.

Here, the reported reaches corresponding to the TV audience members 110a and the OCR database 204 are confirmed or assumed to have passed minimum reporting requirements specified by these two audience panel systems. Therefore, only minimum requirements are specified below for computing the correlation.

In the illustrated example, let:
A_Raw=raw count of unique CPH panelists who are exposed to neither internet nor TV ad,
B_Raw=raw count of unique CPH panelists who are exposed to internet ad but not TV ad,
C_Raw=raw count of unique CPH panelists who are exposed to TV ad but not internet ad, and
D_Raw=raw count of unique CPH panelists who are exposed to both internet and TV ad To compute a reliable correlation, the following two conditions must preferably, but not necessarily, be met.
Condition 1: A_Raw+B_Raw+C_Raw+D_Raw>=100
Condition 2: Out of the four cells (A_Raw, B_Raw, C_Raw, and D_Raw), at least three of them is greater than or equal to 1

At the campaign level, the above requirements are also preferably, but not necessarily, met.

In some examples, an estimated duplication of more than 1% is a strong indicator of good reliability.

Sub-Section 4.5—Minimum Exposure for Audience Segment (Demographic, Timeframe, Network, Publisher)

To report duplication for an audience segment, the same requirements descried in section 4.4 must preferably, but not necessarily, be met, except that A_Raw, B_Raw, C_Raw, and D_Raw are now calculated for each segment. For any particular segment, random duplication can be used to estimate the duplicated audiences when the above requirements are not met. In some examples, when the minimum requirements are not met, standard deviation of random duplication is not computed. In some examples, once the requirements are met, Danaher's formula of Equation 1 is applied. Once Equation 1 is applied, reversion back to random duplication should not occur for that particular segment. Based on the above, in some examples, some segments use Danaher's formula while other segments use random duplication at one or more points in time.

Section 5—Validating Results

Sub-Section 5.1—Breaking Out Online Video as Separate "Platform" vs. Display Videos In some examples, online video and display ads are broken out separately if:
1. An ad tag can be created to distinguish video and display so that they can be separated in the CPH panel 110b; and
2. The data provider (e.g., the Internet service database proprietor 122 of FIG. 1) can provide data by online video and display separately.

In the illustrated examples, to report online and display separately, the de-duplication techniques are performed based on these two types of ads.

Sub-Section 5.2—Approaches for Different Ratings Streams (Live, Live+SD, Live+3, Live+7)

Changes in the above-described techniques are not required when estimating duplications under different ratings streams (e.g., Live, Live+SD, Live+3, Live+7), as long as the TV metrics are consistently computed using the same rating definition. For example, to compute a duplicated audience between Internet and Live TV viewing, the operations disclosed in section 2 are computed based on a live viewing definition, including TV metrics and correlation calculations. In other words, not only TV metrics, but also correlations are recomputed when switching between rating streams.

Sub-Section 5.3—Unification Rules for CPH and TV Ratings

In the XCR examples disclosed herein, metrics are reported on a cumulative base (e.g., a quantity of unique audience members that are exposed to a campaign from day 1 of the campaign to the reported date). Since a campaign can run for months, common samples (e.g., unified samples) are used to compute these metrics.

The unified samples are defined by cumulative week with a 75% intab rule. For example, cumulative week 1 unified samples are those panelists who are intab for at least 75% of the days during week 1. Cumulative week 2 unified samples are those panelists who are intab for at least 75% of the days during week 1 and week 2, etc.

As used herein, a week starts on Monday and ends on Sunday. If a campaign does not start from Monday, week 1 would be the remainder of the week during which the campaign starts. Cumulative week 2 would be the first (partial) week plus the following full week. If a campaign does not end on Sunday, the last cumulative week would end on the day when the campaign ends.

In some instances, TV campaigns and online campaigns do not start and end on the same day. In the illustrated examples, the following definitions are used.
TV_START_DT represents TV campaign start date
TV_END_DT represents TV campaign end date
ONLINE_START_DT represents online campaign start date
ONLINE_END_DT represents online campaign end date
In the illustrated examples, the XCR campaign start date and end date are defined as follows.
XCR_START_DT=Min (TV_START_DT, ONLINE_START_DT)
XCR_END_DT=Max (TV_END_DT, ONLINE_END_DT)

In the illustrated examples, the unified samples for the TV audience panel 110a are determined using the below process. These unified samples are used to determine TV metrics.

Operation 1. Obtain the daily intab information for members of the TV panel 110a that corresponds to the duration between TV_START_DT and TV_END_DT, and start counting cumulative week 1, 2, etc. from TV_START_DT until TV_END_DT.

Operation 2. Determine cumulative weekly unified sample between TV_START_DT and TV_END_DT using the 75% rule.

Operation 3. Treat all members of the TV panel 110a as a unified sample between TV_START_DT and XCR_START_DT if TV_STARTv DT is later than XCR_START_DT. Treating the TV panel 110a members in this manner, does not affect TV metric calculations because no TV metrics are computed prior to TV_START_DT.

Operation 4. If TV_END_DT is earlier than XCR_END_DT, the unified sample between TV_END_DT and XCR_END_DT is the same as the one on TV_END_DT (i.e., if a panelist is in a unified sample on the last day of the TV campaign, the panelist continues to be a TV unified sample until the end of the XCR campaign). If the panelist is not in a unified sample on the last day of the TV campaign, the panelist continues to be out of the TV unification until the end of the XCR campaign.

In the illustrated examples, the unified samples for the CPH panel 110b are primarily used to compute correlation. In some examples, the unified samples for the CPH panel 110b may be implemented using the following two operations, where a panelist's TV daily intab flag may be used as the panelist's CPH panel intab flag.

Operation 1. Obtain the daily TV intab information for members of the CPH panel 110b that correspond to the duration between XCR_START_DT and XCR_END_DT, and start counting cumulative week 1, 2, etc. from XCR_START_DT until XCR_END_DT.

Operation 2. Determine the cumulative weekly unified samples between XCR_START_DT and XCR_END_DT using the 75% rule.

In some examples, the unified samples for the CPH panel 110b may be implemented using the following three operations.

Operation 1. Determine TV campaign unified sample using the same approach as disclosed above for determining the TV unification. In the illustrated example, because the CPH panel 110b is a subset of the TV panel 110a, the TV campaign unified sample in the CPH panel 110b is also a subset of the unified sample in the TV panel 110a.

Operation 2. Determine online campaign unified sample. To do this, a daily online intab flag is created for each member of the CPH panel 110b. The intab flags are created as follows: if there is at least one log generated for a panelist between day x-30 and day x, the panelist is considered as online intab on day x. When the daily online intab flag is created, the online campaign unified sample is determined using a similar approach as disclosed above for TV unification, except that TV_START_DT and TV_END_DT are replaced with ONLINE_START_DT and ONLINE_END_DT, respectively.

Operation 3. Determine CPH unified sample: if a CPH panelist is intab for both TV and online in the same cumulative week, the panelist becomes a unified sample for that cumulative week. Otherwise, he or she is out of unification for that cumulative week.

FIG. 14 is an example table for determining whether a particular CPH panelist qualifies for unified sample for TV portion of the XCR campaign. In the illustrated example of FIG. 14, the TV campaign starts on Day 1 and ends on Day 10, and the online campaign starts on Day 6 and ends on Day 13.

In the illustrated example of FIG. 14, the first XCR cumulative week is the same as the first TV cumulative week, which comprises 4 days from Day 1 to Day 4. Since out of these 4 days, the CPH panelist is only intab on TV for 2 days, the panelist is not considered as a TV unified sample for the first cumulative week. The second XCR cumulative week is one day (Day 11) longer than the second TV cumulative week, which comprises 10 days from Day 1 to Day 10. During these 10 days, the panelist is in tab on TV for 8 days. Therefore, the panelist is considered as unified sample for the second TV cumulative week (till Day 10). Since the panelist is unified sample on the last day of TV campaign (Day 10), the panelist continues to be a unified TV sample for the rest of the campaign (Day 11 onwards). Therefore, the panelist is considered as a TV unified sample in the second and third XCR cumulative weeks.

FIG. 15 is an example table for determining whether the same particular CPH panelist from FIG. 14 qualifies for a unified sample for an online portion of the XCR campaign. In the illustrated example of FIG. 15, in the first XCR campaign week, the online campaign has not started yet. Therefore, the panelist is considered a unified online sample in the first XCR cumulative week. During the second XCR cumulative week, the online campaign starts the first online cumulative week, which comprises 6 days from Day 6 to Day 11, during which period the panelist is intab on internet for 4 days. Therefore, the panelist is not considered as an online unified sample in the first online cumulative week. Therefore, the panelist is not considered as an online unified sample in the second XCR cumulative week. The third XCR cumulative week corresponds to the second online cumulative week, which comprises 8 days from Day 6 to Day 13, during which period the panelist is in tab on internet for 6 days. Therefore, the panelist is considered a unified online sample in the third XCR cumulative week.

FIG. 16 is an example table for determining whether the same particular CPH panelist from FIGS. 14 and 15 qualifies for the XCR campaign CPH unified sample. In the illustrated example, to be an XCR campaign CPH unified sample, a CPH panelist must be in tab in both TV and online. According to the TV unified sample and the online unified sample columns from the example tables of FIGS. 14 and 15, the particular CPH panelist represented in the example table of FIG. 16 is not a CPH unified sample in the first and second XCR cumulative weeks, but the CPH panelist is a CPH unified sample in the third XCR cumulative week.

After unified samples are determined, regular weighing process are applied to reassign a weight for each unified panelist. This is done for the TV audience panel 110a and the CPH audience panel 110b separately. All subsequent calculations (e.g., unique audience, reach, frequency, correlation, duplication, etc. . . . ) are computed from the unified samples.

Sub-Section 5.4—Other Validations

FIG. 3 depicts example media exposure data for a cross-platform campaign. Without adjusting correlation values as disclosed herein for use with Danaher's model, using Danaher's model alone gives an estimate of 3% audience duplication. This is significantly different from the true duplication of 12.5%. However, using adjusted correlation values disclosed herein with Danaher's model of Equation 1 above, the model estimated duplication of unique audience is the same as the true duplication of 12.5%.

Figure 4:
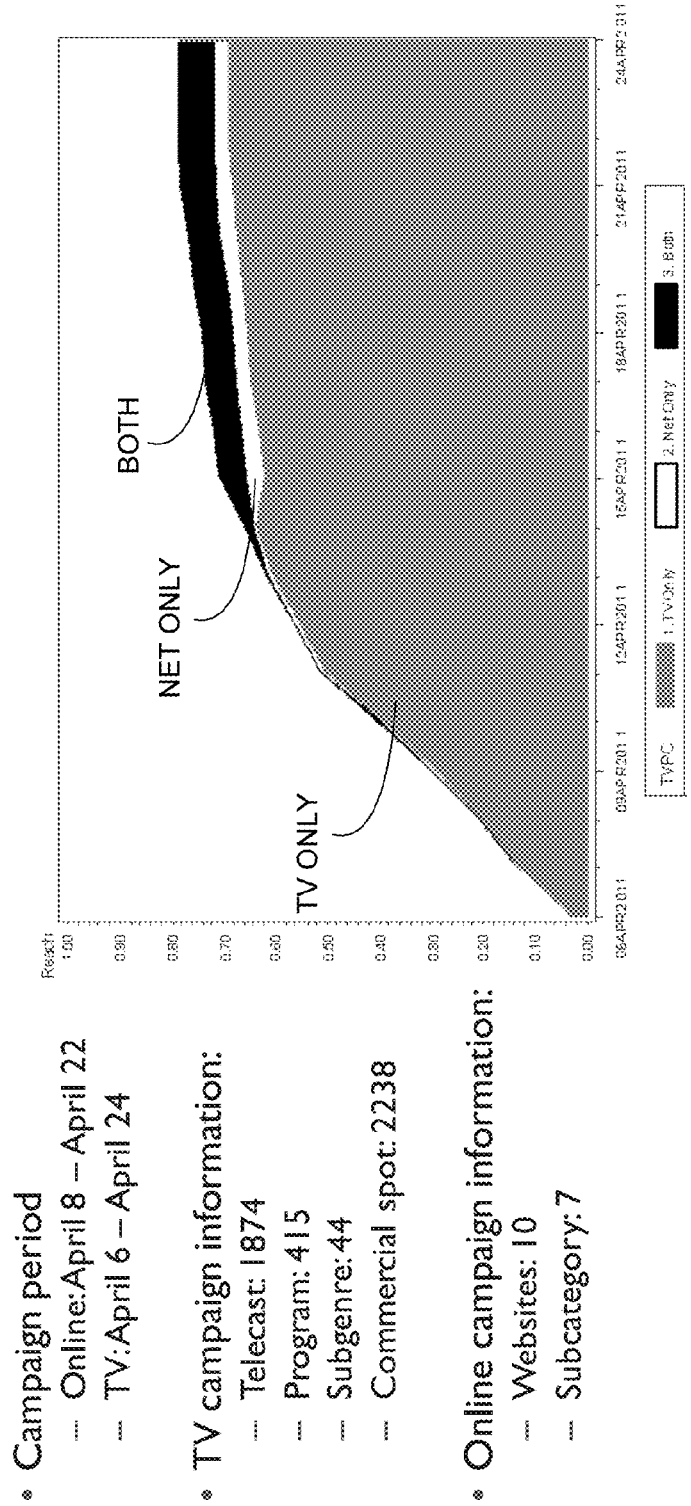
FIG. 4 depicts example test results based on television and online ad campaigns.

FIG. 4 depicts example test results using examples disclosed herein based on television and online ad campaigns. The example graph of FIG. 4 compares modeled duplication vs. observed duplication. The test results of FIG. 4 are based on the CPH panel 110c (FIG. 1) for which TV viewing and Internet viewing were tracked for all members of the CPH panel 110c. Therefore, the TV reach, Internet reach, and duplication shown in FIG. 4 are determined based on the CPH panel 110c.

Figure 5:
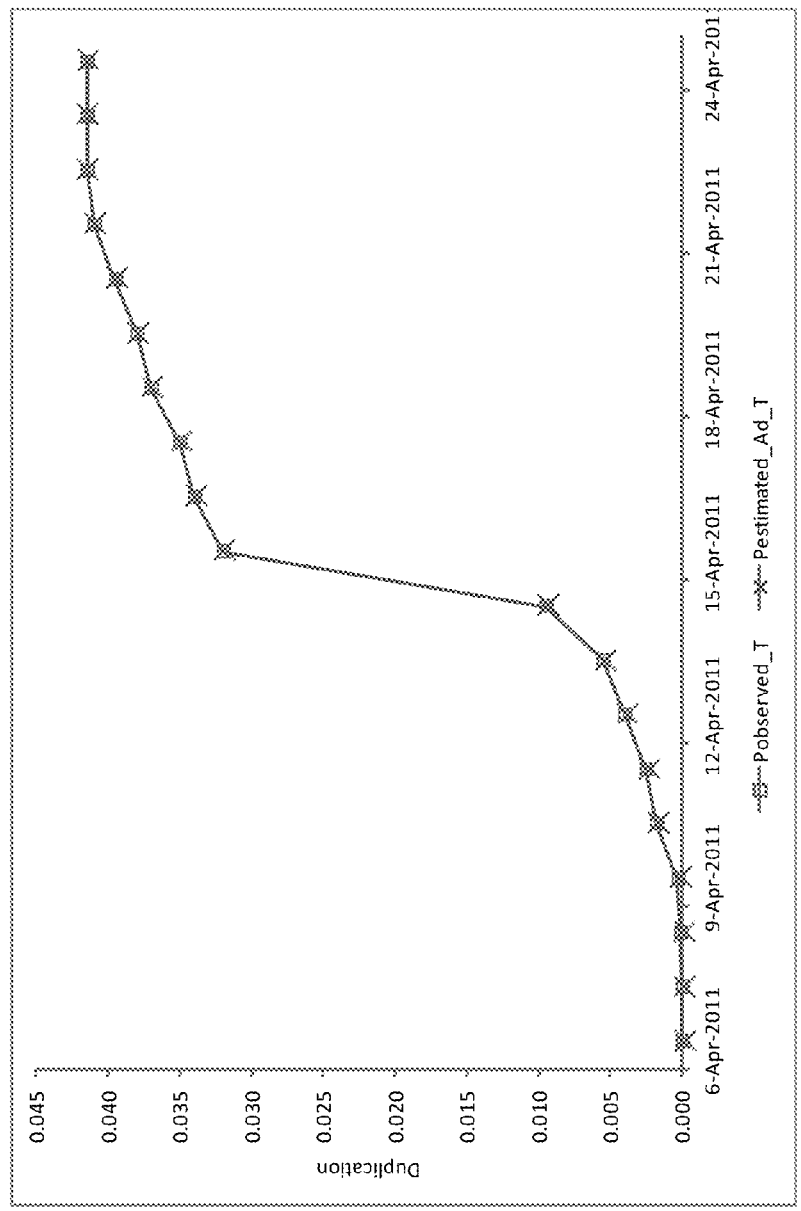
FIG. 5 depicts an example result for estimated audience duplication based on the test results of FIG. 4 for the television and online ad campaigns.

FIG. 5 depicts an example result for estimated audience duplication based on the test results of FIG. 4 for the television and online ad campaigns. FIG. 5 shows that an estimated duplication (PEstimated_AD_T) is the same as observed duplication (PObserved_T) from the CPH panel data for the tested campaign of FIG. 4.

Figure 6:
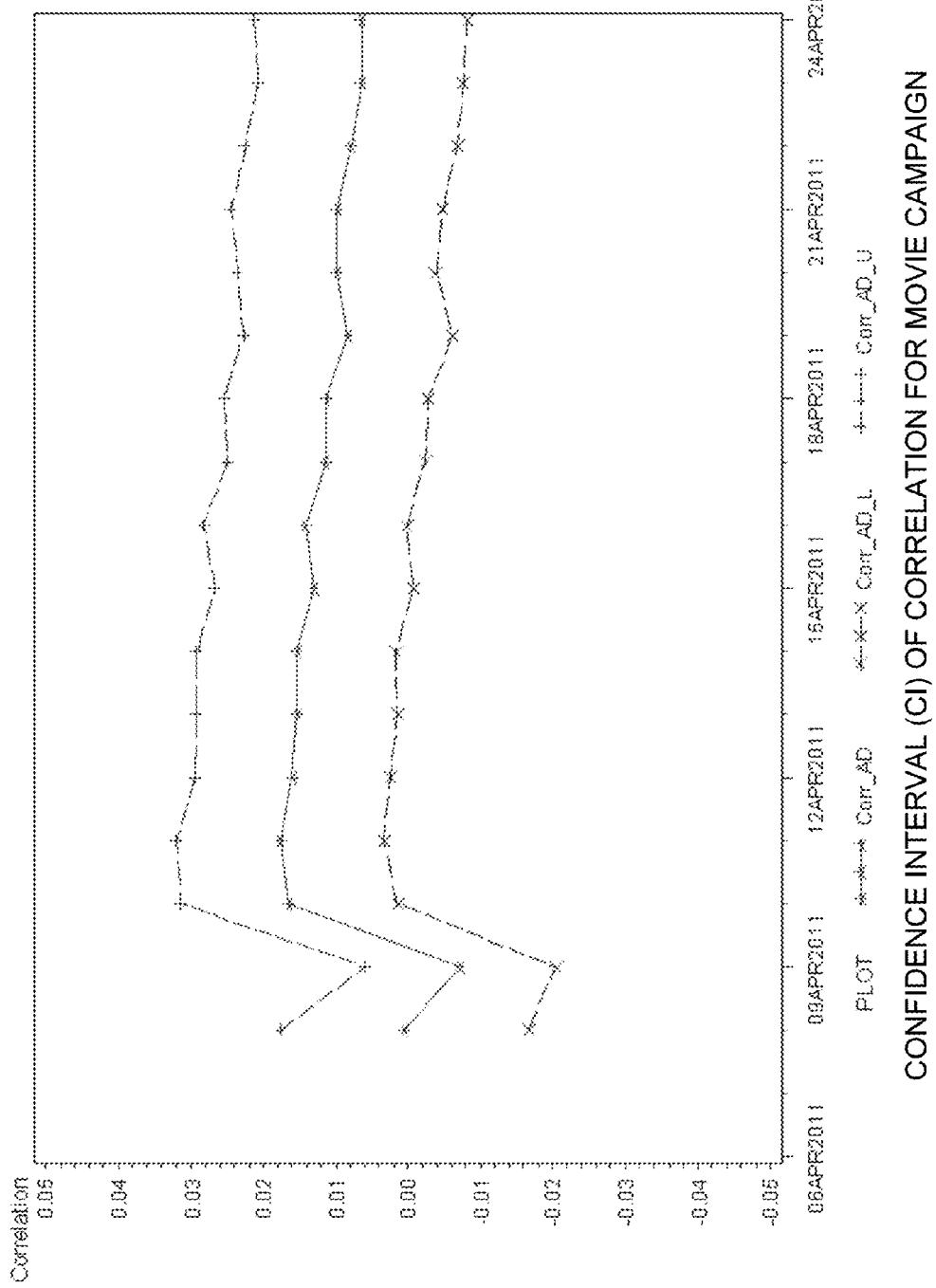
FIG. 6 depicts an example confidence interval (CI) of correlation for the television and online ad campaigns of FIG. 4.

FIG. 6 depicts an example confidence interval (CI) of correlation for the television and online ad campaigns of FIG. 4.

Figure 7:
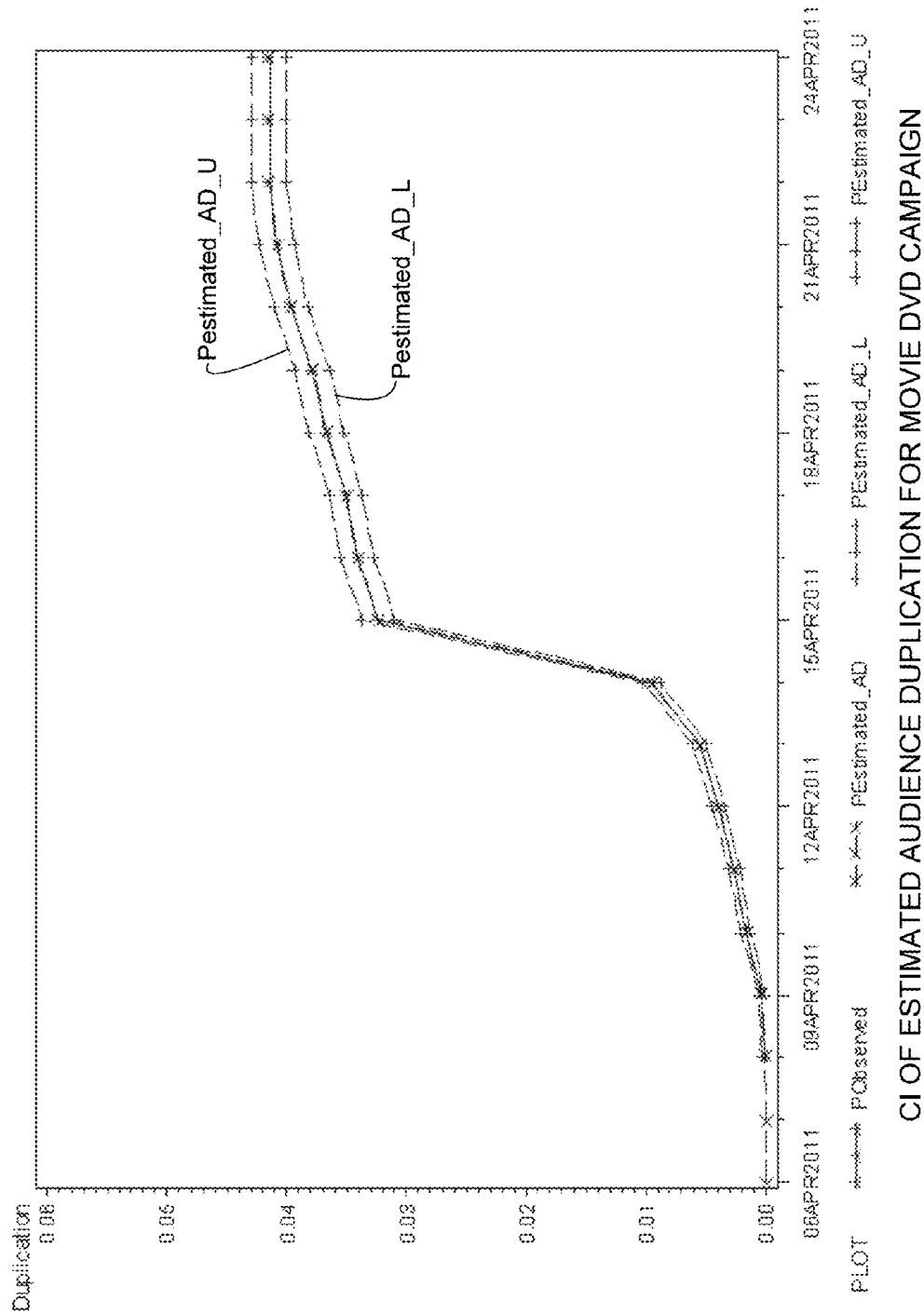
FIG. 7 depicts an example CI of estimated audience duplication for the television and online ad campaigns of FIG. 4.

FIG. 7 depicts an example CI of estimated audience duplication for the television and online ad campaigns of FIG. 4. In the illustrated example of FIG. 7, PEstimated_AD_L is a lower bound of the estimated duplication, and PEstimated_AD_U is an upper bound of estimated duplication.

FIG. 8 depicts example test results for different television and online ad campaigns using examples disclosed herein.

FIGS. 9, 11-14, and 17A-17E are flow diagrams representative of example machine readable instructions that may be executed to determine audience duplication in cross-media campaigns. In these examples, the machine readable instructions comprise one or more programs for execution by a processor such as the processor 1012 shown in the example processor platform 1000 discussed below in connection with FIG. 10. The program(s) may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program(s) is/are described with reference to the flow diagrams illustrated in FIGS. 9, 11-14, and 17A-17E, other methods of implementing examples disclosed herein may alternatively be used. For example, the order of execution of the blocks may be changed, and/or some of the blocks described may be changed, eliminated, or combined.

As mentioned above, the example processes of FIGS. 9, 11-14, and 17A-17E may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9, 11-14, and 17A-17E may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Figure 9:
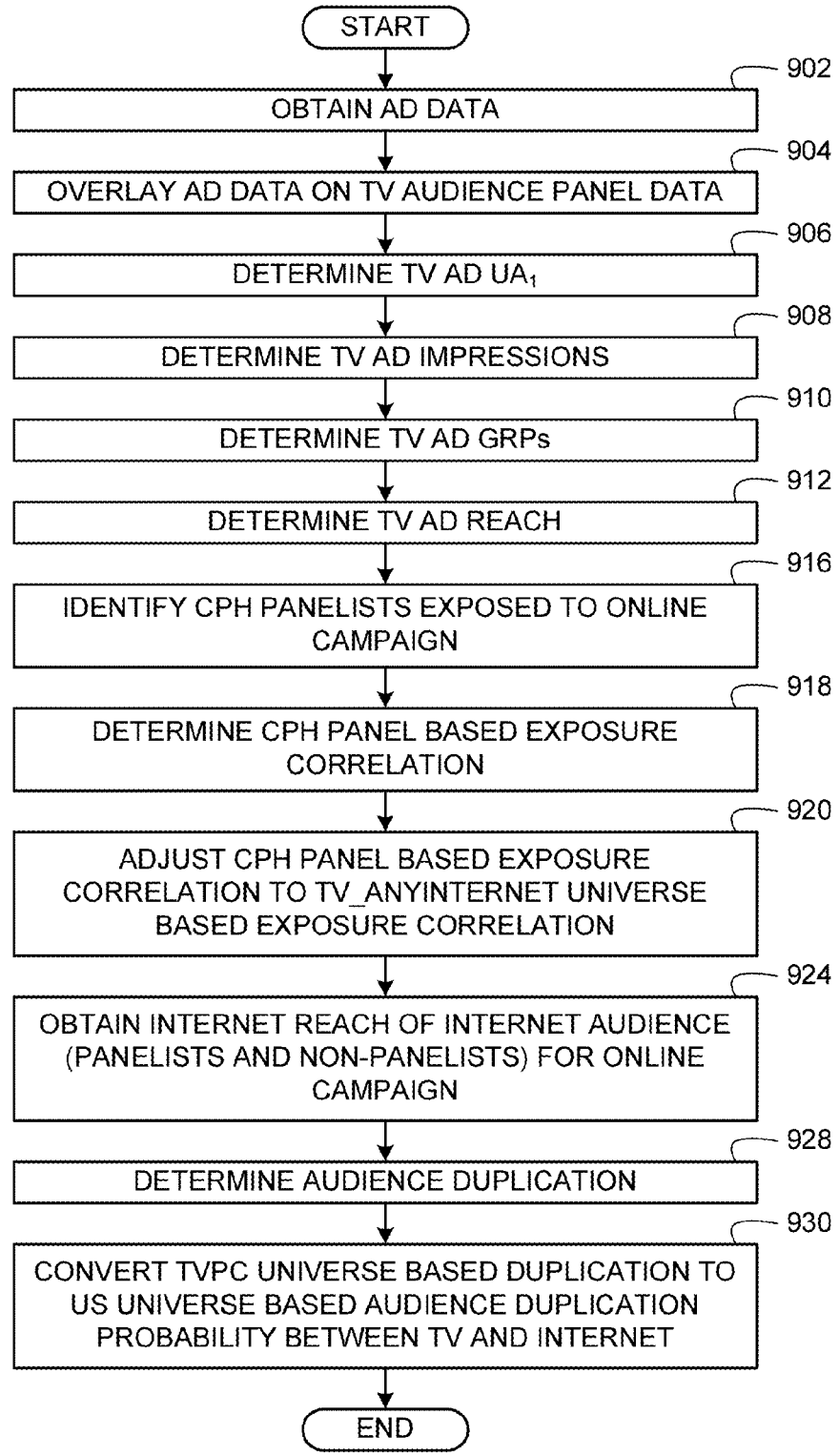
FIG. 9 is a flow diagram representative of example machine readable instructions that may be executed to determine audience duplication in cross-media campaigns.

Turning in detail to FIG. 9, initially, the processor 1012 (FIG. 10) obtains ad data (block 902). In some examples, the ad data includes campaign IDs and airing schedules of advertisements for a campaign of interest. The processor 1012 overlays the ad data on viewing data collected for the TV audience panel 110a (FIG. 1) (block 904). The processor 1012 determines a TV advertisement unique audience ($UA_1$) for the campaign (block 906). The processor 1012 determines the TV ad impressions for the campaign (block 908). The processor 1012 determines the TV ad GRPs for the campaign (block 910). The processor 1012 determines the TV advertisement reach ($p_{1(TV)}$) (e.g., the TV universe advertisement reach ($P_{1(TV)}$) 240 of FIG. 2) for the campaign (block 912).

The processor 1012 identifies CPH panelists exposed to a corresponding online campaign (block 916). The processor 1012 determines the CPH panel based exposure correlation value ($Rho_{(CPH)}(\rho_{(CPH)})$) 258 of FIG. 2 (block 918). The processor 1012 adjusts the CPH panel based exposure correlation value ($Rho_{(CPH)}(\rho_{(CPH)})$) 258 to the TV_AnyInternet universe based exposure correlation ($Rho_{(TV\_AnyInternet)}(\rho_{(TV\_AnyInternet)})$) 260 of FIG. 2 (block 920). The processor 1012 obtains an Internet/online reach ($p_{2(Online)}$) (e.g., the online universe advertisement reach ($P_{2(online)}$) 250 of FIG. 2) of an Internet audience for the online campaign (block 924) from, for example, the OCR database 204 (FIG. 2). The processor 1012 determines the reach parameter ($p_{12(TV\_AnyInternet)}$) (e.g., the TV_AnyInternet universe based audience duplication probability between TV and internet ($P_{12(TV\_AnyInternet)}$) 264 of FIG. 2) representative of the audience duplication between TV and internet reach (block 928) using, for example, Equation 1 above. The processor 1012 converts the TV_AnyInternet universe based duplication ($P_{12(TV\_AnyInternet)}$) to the US universe based audience duplication probability between TV and internet ($P_{12}$) (block 930) using, for example, Equation 7 above. The example process of FIG. 9 then ends.

Figure 10:
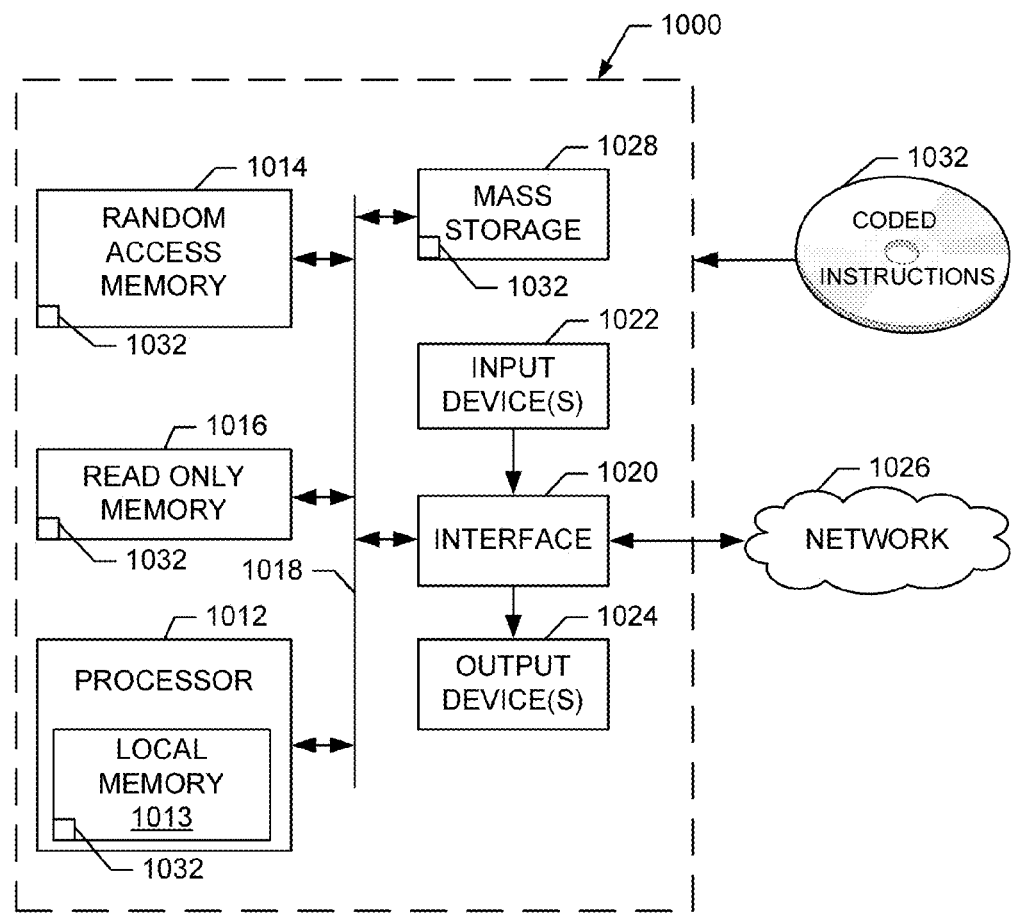
FIG. 10 is an example processor system that can be used to execute the example instructions of FIGS. 9, 11-13, and 17A-17E to implement the example apparatus and systems of FIGS. 1 and 2.
Figure 11:
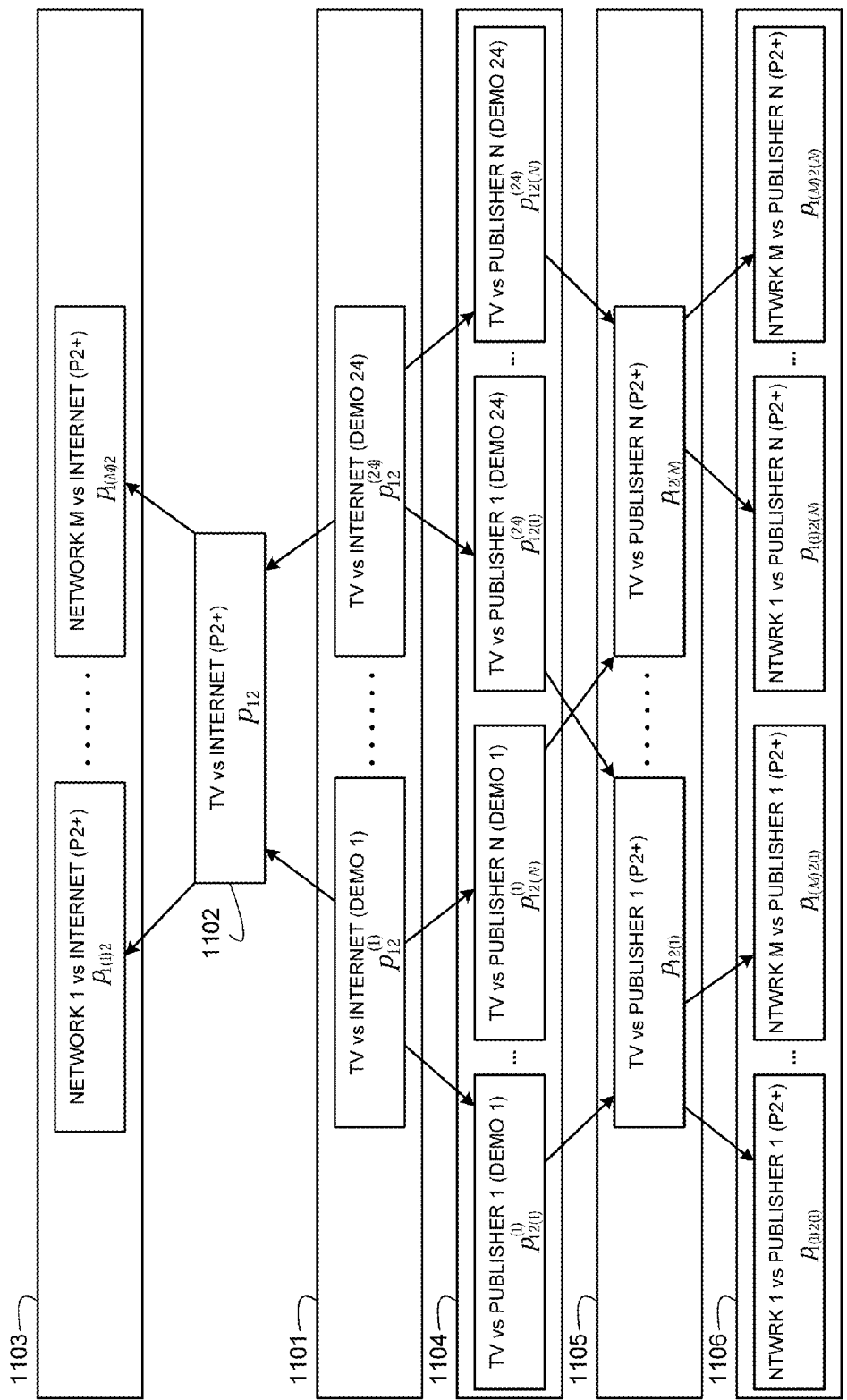
FIG. 11 is a flow diagram representative of example machine readable instructions that may be executed to determine duplicated audience reach.

FIG. 10 is a block diagram of an example processor platform 1000 capable of executing the instructions of FIGS. 9, 11-13, and 17A-17E to implement examples disclosed herein. The processor platform 1000 can be, for example, a server, a personal computer, an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Instructions of FIGS. 9, 11-13, and 17A-17E may be stored as coded instructions 1032 in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine audience duplication in cross-media campaigns, the method comprising:
   determining a first duplicated audience reach between a total television audience and an internet publisher audience for a demographic group, the total television audience representative of audience members across a plurality of television networks, and the internet publisher audience representative of audience members across one of a plurality of internet publishers;
   determining a second duplicated audience reach between the total television audience and the internet publisher audience for a media campaign based on the first duplicated audience reach;
   determining a third duplicated audience reach between a television network audience and the internet publisher audience for the media campaign based on the second duplicated audience reach, the television network audience representative of audience members exposed to the media campaign via one of the plurality of television networks;
   determining a fourth duplicated audience reach between the total television audience and a total internet audience for the demographic group, the total internet audience representative of audience members exposed to the media campaign via the plurality of internet publishers, the fourth duplicated audience reach is determined based on a television-to-internet universe based exposure correlation value ($\rho_{(TV\_AnyInternet)}$) according to:

$$\rho_{(TV\_AnyInternet)} = \begin{cases} \rho_{(CPH)}\sqrt{\dfrac{p_{1(CPH)}p_{2(CPH)}[1-p_{1(TV)}][1-p_{2(Online)}]}{[1-p_{1(CPH)}][1-p_{2(CPH)}]p_{1(TV)}p_{2(Online)}}} & p_{1(CPH)} \le p_{1(TV)} \\ & p_{2(CPH)} \le p_{2(Online)} \\[6pt] \rho_{(CPH)}\sqrt{\dfrac{p_{1(CPH)}[1-p_{2(CPH)}][1-p_{1(TV)}]p_{2(Online)}}{[1-p_{1(CPH)}]p_{2(CPH)}p_{1(TV)}[1-p_{2(Online)}]}} & p_{1(CPH)} \le p_{1(TV)} \\ & p_{2(CPH)} > p_{2(Online)} \\[6pt] \rho_{(CPH)}\sqrt{\dfrac{[1-p_{1(CPH)}]p_{2(CPH)}p_{1(TV)}[1-p_{2(Online)}]}{p_{1(CPH)}[1-p_{2(CPH)}][1-p_{1(TV)}]p_{2(Online)}}} & p_{1(CPH)} > p_{1(TV)} \\ & p_{2(CPH)} \le p_{2(Online)} \\[6pt] \rho_{(CPH)}\sqrt{\dfrac{[1-p_{1(CPH)}][1-p_{2(CPH)}]p_{1(TV)}p_{2(Online)}}{p_{1(CPH)}p_{2(CPH)}[1-p_{1(TV)}][1-p_{2(Online)}]}} & p_{1(CPH)} > p_{1(TV)} \\ & p_{2(CPH)} > p_{2(Online)} \end{cases}$$

wherein the value $\rho_{(CPH)}$ is a cross-platform home audience universe based television-internet media exposure correlation, wherein the value $p_{1(CPH)}$ is a cross-platform home audience universe based television reach, wherein the value $p_{2(CPH)}$ is a cross-platform home audience universe based internet reach, wherein the value $p_{1(TV)}$ is a television universe media reach, and wherein the value $p_{2(Online)}$ is an internet universe media reach; and using the fourth duplicated audience reach to determine the first duplicated audience reach between the total television audience and the internet publisher audience for the demographic group.

2. A method as defined in claim 1, wherein the first duplicated audience reach is indicative of audience members of both the total television audience and the internet publisher audience for the demographic group exposed to the media campaign via the plurality of television networks and via the one of the plurality of internet publishers.

3. A method as defined in claim 1, wherein the second duplicated audience reach is indicative of audience members of both the total television audience and the internet publisher audience exposed to the media campaign via the plurality of television networks and via the one of the plurality of internet publishers.

4. An apparatus to determine audience duplication in cross-media campaigns, the apparatus comprising:
   a processor; and
   a memory having instructions stored thereon that, when executed, cause the processor to perform operations comprising:
   determining a first duplicated audience reach between a total television audience and an internet publisher audience for a demographic group, the total television audience representative of audience members across a plurality of television networks, and the internet publisher audience representative of audience members across one of a plurality of internet publishers;
   determining a second duplicated audience reach between the total television audience and the internet publisher audience for a media campaign based on the first duplicated audience reach; and
   determining a third duplicated audience reach between a television network audience and the internet publisher audience for the media campaign based on the second duplicated audience reach, the television network audience representative of audience members exposed to the media campaign via one of the plurality of television networks;
   determining a fourth duplicated audience reach between the total television audience and a total internet audience for the demographic group, the total internet audience representative of audience members exposed to the media campaign via the plurality of internet publishers, the fourth duplicated audience reach is determined based on a television-to-internet universe based exposure correlation value ($\rho_{(TV\_AnyInternet)}$) according to:

$$\rho_{(TV\_AnyInternet)} =$$

$$\begin{cases} \rho_{(CPH)}\sqrt{\dfrac{p_{1(CPH)}p_{2(CPH)}[1-p_{1(TV)}][1-p_{2(Online)}]}{[1-p_{1(CPH)}][1-p_{2(CPH)}]p_{1(TV)}p_{2(Online)}}} & p_{1(CPH)} \leq p_{1(TV)} \\ & p_{2(CPH)} \leq p_{2(Online)} \\ \rho_{(CPH)}\sqrt{\dfrac{p_{1(CPH)}[1-p_{2(CPH)}][1-p_{1(TV)}]p_{2(Online)}}{[1-p_{1(CPH)}]p_{2(CPH)}p_{1(TV)}[1-p_{2(Online)}]}} & p_{1(CPH)} \leq p_{1(TV)} \\ & p_{2(CPH)} > p_{2(Online)} \\ \rho_{(CPH)}\sqrt{\dfrac{[1-p_{1(CPH)}]p_{2(CPH)}p_{1(TV)}[1-p_{2(Online)}]}{p_{1(CPH)}[1-p_{2(CPH)}][1-p_{1(TV)}]p_{2(Online)}}} & p_{1(CPH)} > p_{1(TV)} \\ & p_{2(CPH)} \leq p_{2(Online)} \\ \rho_{(CPH)}\sqrt{\dfrac{[1-p_{1(CPH)}][1-p_{2(CPH)}]p_{1(TV)}p_{2(Online)}}{p_{1(CPH)}p_{2(CPH)}[1-p_{1(TV)}][1-p_{2(Online)}]}} & p_{1(CPH)} > p_{1(TV)} \\ & p_{2(CPH)} > p_{2(Online)} \end{cases}$$

wherein the value $\rho_{(CPH)}$ is a cross-platform home audience universe based television-internet media exposure correlation, wherein the value $p_{1(CPH)}$ is a cross-platform home audience universe based television reach, wherein the value $p_{2(CPH)}$ is a cross-platform home audience universe based internet reach, wherein the value $p_{1(TV)}$ is a television universe media reach, and wherein the value $p_{2(Online)}$ is an internet universe media reach; and using the fourth duplicated audience reach to determine the first duplicated audience reach between the total television audience and the internet publisher audience for the demographic group.

5. An apparatus as defined in claim 4, wherein the first duplicated audience reach is indicative of audience members of both the total television audience and the internet publisher audience for the demographic group exposed to the media campaign via the plurality of television networks and via the one of the plurality of internet publishers.

6. An apparatus as defined in claim 4, wherein the second duplicated audience reach is indicative of audience members of both the total television audience and the internet publisher audience exposed to the media campaign via the plurality of television networks and via the one of the plurality of the internet publishers.

7. A tangible machine readable storage medium comprising instructions that, when executed, cause a machine to at least:

determine a first duplicated audience reach between a total television audience and an internet publisher audience for a demographic group, the total television audience representative of audience members across a plurality of television networks, and the internet publisher audience representative of audience members across one of a plurality of internet publishers;

determine a second duplicated audience reach between the total television audience and the internet publisher audience for a media campaign based on the first duplicated audience reach;

determine a third duplicated audience reach between a television network audience and the internet publisher audience for the media campaign based on the second duplicated audience reach, the television network audience representative of audience members exposed to the media campaign via one of the plurality of television networks;

determine a fourth duplicated audience reach between the total television audience and a total internet audience for the demographic group, the total internet audience representative of audience members exposed to the media campaign via the plurality of internet publishers, the fourth duplicated audience reach is determined based on a television-to-internet universe based exposure correlation value ($\rho_{(TV\_AnyInternet)}$) according to:

$$\rho_{(TV\_AnyInternet)} =$$

$$\begin{cases} \rho_{(CPH)}\sqrt{\dfrac{p_{1(CPH)}p_{2(CPH)}[1-p_{1(TV)}][1-p_{2(Online)}]}{[1-p_{1(CPH)}][1-p_{2(CPH)}]p_{1(TV)}p_{2(Online)}}} & p_{1(CPH)} \leq p_{1(TV)} \\ & p_{2(CPH)} \leq p_{2(Online)} \\ \rho_{(CPH)}\sqrt{\dfrac{p_{1(CPH)}[1-p_{2(CPH)}][1-p_{1(TV)}]p_{2(Online)}}{[1-p_{1(CPH)}]p_{2(CPH)}p_{1(TV)}[1-p_{2(Online)}]}} & p_{1(CPH)} \leq p_{1(TV)} \\ & p_{2(CPH)} > p_{2(Online)} \\ \rho_{(CPH)}\sqrt{\dfrac{[1-p_{1(CPH)}]p_{2(CPH)}p_{1(TV)}[1-p_{2(Online)}]}{p_{1(CPH)}[1-p_{2(CPH)}][1-p_{1(TV)}]p_{2(Online)}}} & p_{1(CPH)} > p_{1(TV)} \\ & p_{2(CPH)} \leq p_{2(Online)} \\ \rho_{(CPH)}\sqrt{\dfrac{[1-p_{1(CPH)}][1-p_{2(CPH)}]p_{1(TV)}p_{2(Online)}}{p_{1(CPH)}p_{2(CPH)}[1-p_{1(TV)}][1-p_{2(Online)}]}} & p_{1(CPH)} > p_{1(TV)} \\ & p_{2(CPH)} > p_{2(Online)} \end{cases}$$

wherein the value $\rho_{(CPH)}$ is a cross-platform home audience universe based television-internet media exposure correlation, wherein the value $p_{1(CPH)}$ is a cross-platform home audience universe based television reach, wherein the value $p_{2(CPH)}$ is a cross-platform home audience universe based internet reach, wherein the value $p_{1(TV)}$ is a television universe media reach, and wherein the value $p_{2(Online)}$ is an internet universe media reach; and use the fourth duplicated audience reach to determine the first duplicated audience reach between the total television audience and the internet publisher audience for the demographic group.

8. A tangible machine readable storage medium as defined in claim 7, wherein the first duplicated audience reach is indicative of audience members of both the total television audience and the internet publisher audience for the demographic group exposed to the media campaign via the plurality of television networks and via the one of the plurality of the internet publishers.

9. A tangible machine readable storage medium as defined in claim 7, wherein the second duplicated audience reach is indicative of audience members of both the total television audience and the internet publisher audience exposed to the media campaign via the plurality of television networks and via the one of the plurality of the internet publishers.

* * * * *